(12) United States Patent
Kimura

(10) Patent No.: US 6,288,829 B1
(45) Date of Patent: Sep. 11, 2001

(54) LIGHT MODULATION ELEMENT, ARRAY-TYPE LIGHT MODULATION ELEMENT, AND FLAT-PANEL DISPLAY UNIT

(75) Inventor: Koichi Kimura, Fujinomiya (JP)

(73) Assignee: Fuji Photo Film, Co., Ltd., Shizuoka (JP)

( * ) Notice: Subject to any disclaimer, the term of this patent is extended or adjusted under 35 U.S.C. 154(b) by 0 days.

(21) Appl. No.: 09/412,401

(22) Filed: Oct. 5, 1999

(30) Foreign Application Priority Data

| Oct. 5, 1998 | (JP) | 10-282812 |
| Oct. 27, 1998 | (JP) | 10-305791 |
| Jan. 20, 1999 | (JP) | 11-012033 |
| Jan. 20, 1999 | (JP) | 11-012457 |

(51) Int. Cl.⁷ ............ G02B 26/00; G02B 26/08; G02F 1/29
(52) U.S. Cl. .................. 359/291; 359/209; 359/320
(58) Field of Search ................ 359/291, 209, 359/224, 298, 320

(56) References Cited

U.S. PATENT DOCUMENTS

| 5,061,049 | * | 10/1991 | Hornbeck | 359/224 |
| 5,311,360 | * | 5/1994 | Bloom | 359/572 |
| 5,416,631 | * | 5/1995 | Yagi | 359/254 |
| 5,501,900 | * | 3/1996 | Harada | 428/323 |
| 5,768,003 | * | 6/1998 | Gobeli | 359/254 |

* cited by examiner

Primary Examiner—Georgia Epps
Assistant Examiner—Gary O'Neill
(74) Attorney, Agent, or Firm—Sughrue, Mion, Zinn, Macpeak & Seas, PLLC

(57) ABSTRACT

A light modulation element which has a transparent substrate 111 transparent for modulated light, a moving grid 114 comprising a plurality of slits 113 formed by arranging a plurality of grid plates 112 each having a shield property and spaced from each other, the moving grid 114 having at least a part having electrical conductivity, elastic support members for placing the moving grid 114 with a predetermined spacing on the transparent substrate 111 and supporting the moving grid 114 movably in an arrangement direction of the grid plates 112, shield films 119 formed at the positions of the transparent substrate 111 overlapping the slit positions of the moving grid 114, and moving grid move means for moving the moving grid 114 in the arrangement direction of the grid plates 112 by an electrostatic force generated by applying predetermined drive voltages to fixed electrodes placed on the transparent substrate 111 and the moving grid 114.

47 Claims, 34 Drawing Sheets

[SHIELD]

[PASS THROUGH]

APPLIED VOLTAGE TO SCAN SIGNAL LINE IS 0[V]
APPLIED VOLTAGE TO IMAGE SIGNAL LINE IS $V_a$[V]

APPLIED VOLTAGE TO SCAN SIGNAL LINE IS 0[V]
APPLIED VOLTAGE TO IMAGE SIGNAL LINE IS $V_a$[V]

GLASS SUBSTRATE 301

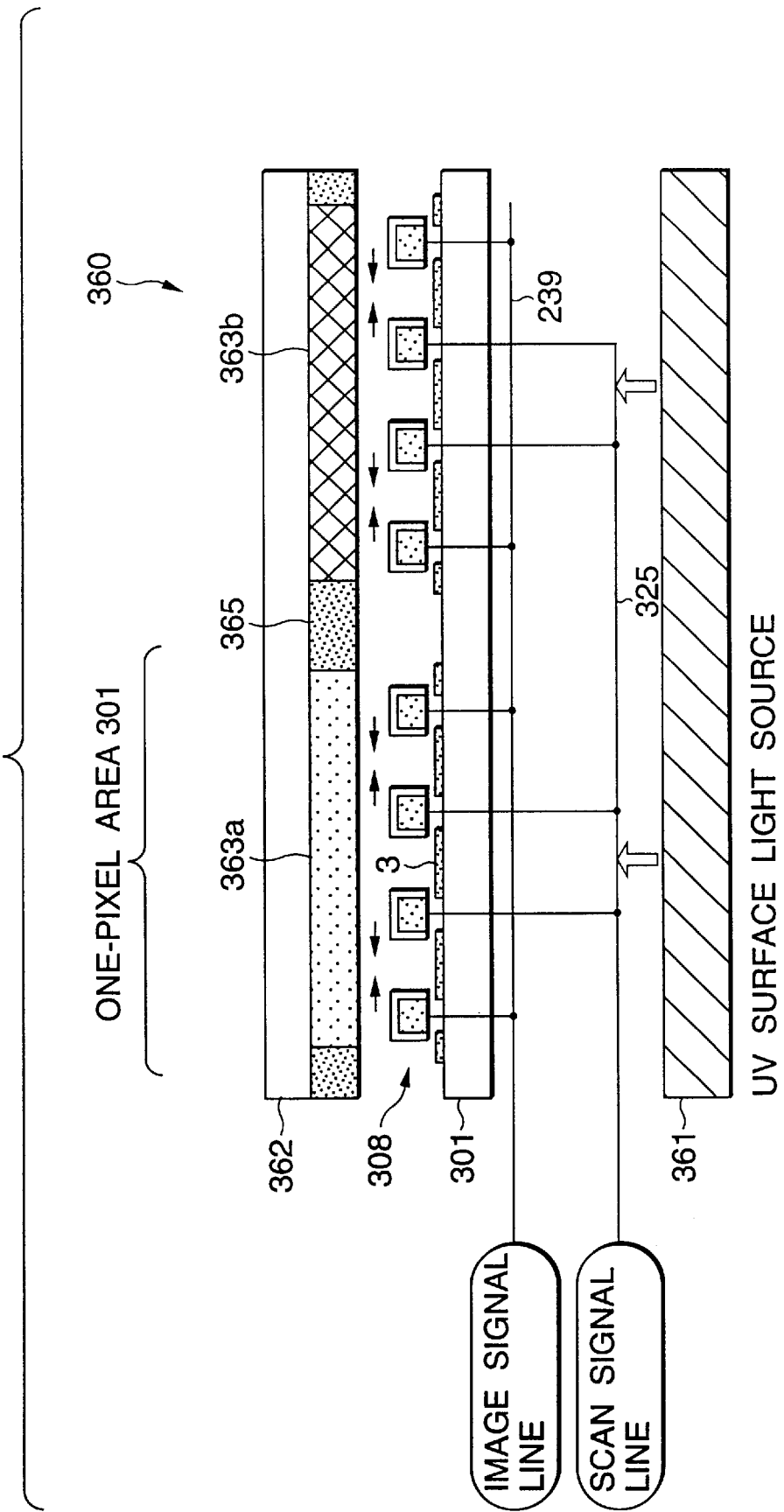

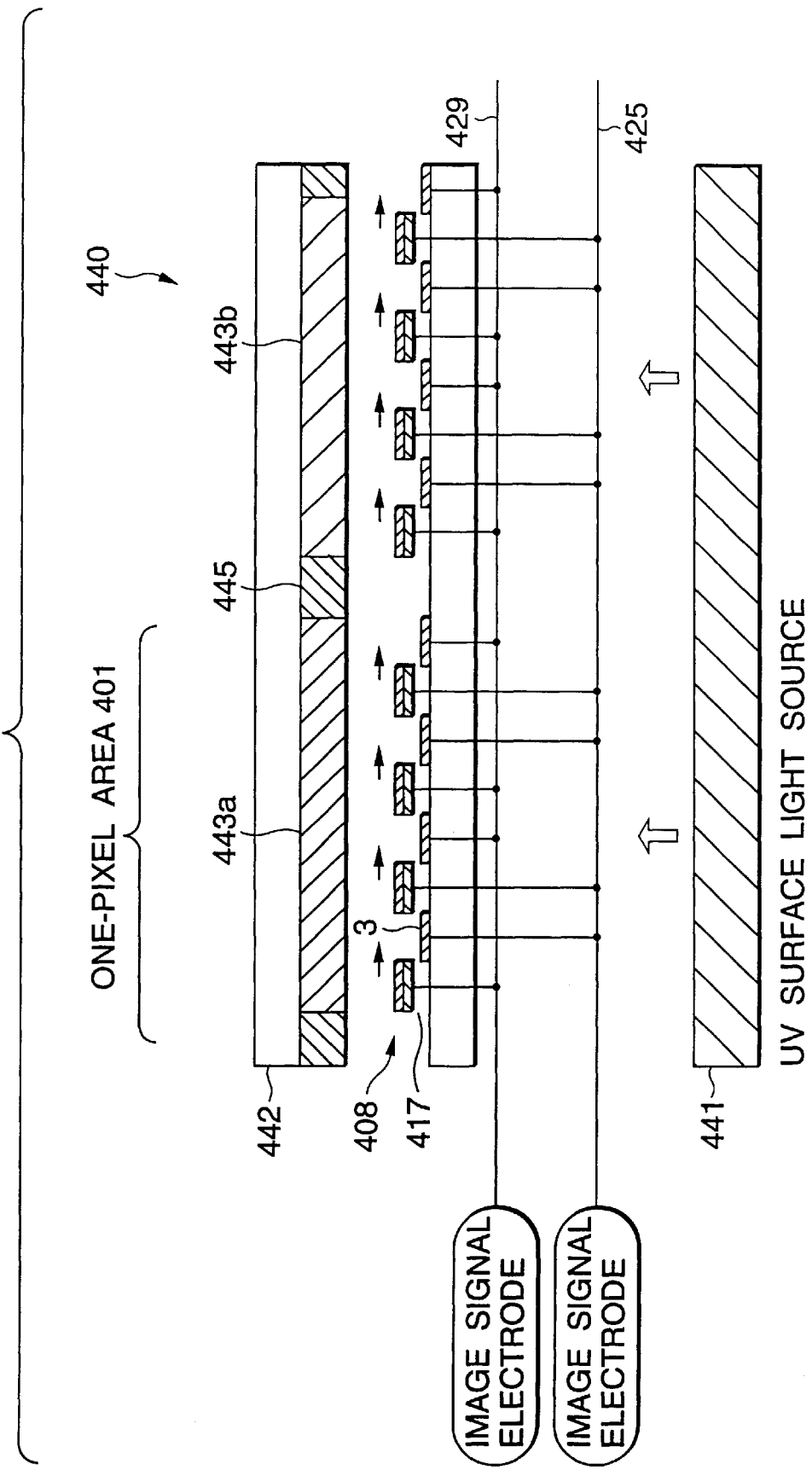

LIGHT MODULATION ELEMENT, ARRAY-TYPE LIGHT MODULATION ELEMENT, AND FLAT-PANEL DISPLAY UNIT

BACKGROUND OF THE INVENTION

1. Field of the Invention

This invention relates to a light modulation element for changing the position of a moving grid by an electrostatic force for executing light modulation, an array-type light modulation element, and a flat-panel display unit.

2. Description of the Related Art

A light modulation element is available for controlling the amplitude (strength), phase, travel direction, etc., of incident light for processing and displaying an image, pattern data, etc. With the light modulation element, the refractive index of a substance allowing light to pass through is changed by the outer field applied to the substance and finally the strength of light passing through or reflecting on the substance is controlled through optical phenomena such as refraction, diffraction, absorption, dispersion, etc. One of the light modulation elements is a liquid crystal light modulation element using the electro-optic effect of liquid crystal. The liquid crystal light modulation element preferably is used with a liquid crystal display of a thin flat-panel display unit.

The liquid crystal display has a structure wherein nematic liquid crystal oriented in parallel with substrates forming a pair of conductive transparent films and twisted 90 degrees between the substrates is placed between the substrates and is sealed, then sandwiched between perpendicular deflecting plates. The liquid crystal display produces display using the fact that the liquid crystal molecules are oriented in the long axis direction perpendicular to the substrate by applying a voltage to the conductive transparent film and the transmission factor of light from a backlight. An active-matrix liquid crystal panel using TFTs (thin-film transistors) is used to provide the liquid crystal display with good responsivity to a moving image.

A plasma display has a structure wherein a large number of electrodes in a perpendicular direction arranged regularly corresponding to discharge electrodes are placed between two glass plates sealed with rare gas of neon, helium, xenon, etc., and the intersecting points of the counter electrodes are used as unit pixels.

The plasma display produces display by selectively applying a voltage to the counter electrode specifying each intersecting point based on image information for causing the intersecting point to discharge and emit light and exciting phosphor for emitting light by generated ultraviolet rays.

FED has a structure wherein a pair of panels is placed facing each other with a minute spacing between and a flat display tube for sealing the surroundings of the panels is provided. The panel on the display surface side is formed on the inner face with a fluorescent film and field emission cathodes are arranged in a one-to-one correspondence with unit light emission areas on the rear panel. A typical field emission cathode has a field emission type microcathode like a drill projection called an emitter tip of minute size.

The FED produces display by using the emitter tip to take out an electron and accelerating and applying the electron to a phosphor for exciting the phosphor.

However, the flat-panel display units in the related arts described above involve the following various problems:

In the liquid crystal display, light from the backlight is allowed to pass through multiple layers of the deflecting plates, the transparent electrodes, and color filter, thus the light use efficiency lowers. The high-grade liquid crystal display requires that TFTs and liquid crystal must be sealed between two substrates and be oriented, thus it is difficult to provide a large area. This is a disadvantage of the liquid crystal display. Further, since light is allowed to pass through the oriented liquid crystal molecules, the viewing angle becomes narrow. This is another disadvantage of the liquid crystal display.

In the plasma display, partition formation for generating plasma for each pixel results in an increase in manufacturing costs and large weight. This is a disadvantage of the plasma display. A large number of electrodes corresponding to discharge electrodes must be arranged regularly for each unit pixel. Thus, as the definition becomes high, the discharge efficiency lowers and the light emission efficiency of the phosphor by vacuum ultraviolet ray excitation is low, thus it is hard to provide a high-definition, high-brightness image in high power efficiency. This is another disadvantage of the plasma display. Further, the drive voltage is high and a drive IC is expensive. This is also a disadvantage of the plasma display.

In the FED, ultrahigh vacuum needs to be produced in the panel to make discharge highly efficient and stable, and the manufacturing costs increase as with the plasma display. This is a disadvantage of the FED. Since field emission electron is accelerated and applied to the phosphor, high voltage becomes necessary. This is also a disadvantage of the FED.

SUMMARY OF THE INVENTION

It is therefore an object of the invention to provide a light modulation element, an array-type light modulation element, and a flat-panel display unit adopting low drive voltage, being able to produce a large area at low costs, having a simple configuration easily manufactured, and providing high image quality and high-speed responsivity.

It is further object of the invention to provide a light modulation element providing good light use efficiency, eliminating the need for producing high vacuum, being able to produce a large area at low costs, providing high image quality, and adopting low drive voltage, an array-type light modulation element, and a flat-panel display unit using it.

To the end, according to one of embodiments of the invention, there is provided a light modulation element comprising a transparent substrate transparent for modulated light, a moving grid comprising a plurality of slits formed by arranging a plurality of grid plates each having a shield property and spaced from each other, the moving grid having at least a part having electrical conductivity, elastic support members for placing the moving grid with a predetermined spacing on the transparent substrate and supporting the moving grid movably in an arrangement direction of the grid plates, shield films formed at the positions of the transparent substrate overlapping the slit positions of the moving grid, and moving grid move means for moving the moving grid in the arrangement direction of the grid plates by an electrostatic force generated by applying predetermined drive voltages to fixed electrodes placed on the transparent substrate and the moving grid, characterized in that as the moving grid is moved, a transmission factor of light passing through the slits is changed for executing light modulation.

In the light modulation element, the moving grid comprising a plurality of belt-like grid plates placed side by side which is supported on the elastic support members on the transparent substrate and the moving grid is moved in the arrangement direction of the grid plates by the electrostatic force, whereby the relative positional relationship between the slits of the moving grid and the shield films on the transparent substrate changes and the transmission factor of light passing through the slits can be changed for executing light modulation.

That is, when the moving grid is moved to the position where the slits and the shield films on the transparent substrate overlap each other with respect to the incidence direction of the light, the incident light is emitted from roughly all area of the slits. On the other hand, when the moving grid is moved to the position where the slits and the shield films do not overlap, light is shielded by means of the moving grid (grid plates) and the shield films on the transparent substrate, and the incident light does not pass through the light modulation element.

Further, according to another embodiment of the invention, there is provided a light modulation element comprising a transparent substrate transparent for modulated light, a fixed wall being placed upright on the transparent substrate and having electrical conductivity, a shield film being placed with an opening as a light modulation area left outside the area where the fixed wall is placed upright on the transparent substrate, a needle being supported movably in a roughly horizontal direction above the opening and having a shield property and electrical conductivity, and needle move means for applying a voltage to a space between the fixed wall and the needle, thereby moving the needle by an electrostatic force for changing the shield area covering the opening, characterized in that as the needle is moved, a transmission factor of light passing through the light modulation area is changed for executing light modulation.

In the light modulation element, each needle is displaced in roughly parallel to the transparent substrate by the action of static electricity and the relative position of each needle to the light passing-through area or the shield area on the transparent substrate is changed, whereby light incident on the transparent substrate is modulated.

That is, each needle is moved to the position overlapping the light modulation area on the transparent substrate, whereby the light introduced into the transparent substrate is shielded; on the other hand, each needle is moved to the position overlapping the shield film on the transparent substrate, whereby the light introduced into the transparent substrate can be emitted to the top of the light modulation element.

Further, in this invention, there is provided a light modulation element comprising a transparent substrate transparent for modulated light, a plurality of belt-like needles having electric conductivity being placed with a predetermined spacing on a plane opposed to the transparent substrate, parts of the needles being supported on the transparent substrate, first shield portions each being provided for each of the needles, second shield portions being placed with openings left in light modulation areas overlapping the needles above the transparent substrate, and needle move means for applying voltage to the needles, thereby attracting and moving the adjacent needles by an electrostatic force, characterized in that as the needles are moved, the transmission factor of light passing through the light modulation area is changed for executing light modulation.

In the light modulation element, each needle is displaced in roughly parallel to the transparent substrate by the action of static electricity and the relative position of each needle to the light passing-through area or the shield area on the transparent substrate is changed, whereby light incident on the transparent substrate is modulated.

That is, each needle is moved to the position overlapping the light modulation area on the transparent substrate, whereby the light introduced into the transparent substrate is shielded; on the other hand, the needles are attracted to each other and are moved, whereby the light introduced into the transparent substrate can be emitted from the light modulation areas to the top of the light modulation element.

The displacement amount of the needle can be lessened and the needle can also be reduced in size and weight, so that high-speed light modulation can be stably executed at low voltage.

BRIEF DESCRIPTION OF THE DRAWINGS

FIG. 27 is a sectional view of the main part to show the configuration of a flat-panel display unit according to the invention.

FIG. 35 is a sectional view of the main part of a flat-panel display unit according to the invention.

DESCRIPTION OF THE PREFERRED EMBODIMENTS

Preferred embodiments of a light modulation element, an array-type light modulation element, and a flat-panel display unit according to the invention will be discussed in sequence in detail with reference to the accompanying drawings.

Figure 1A:
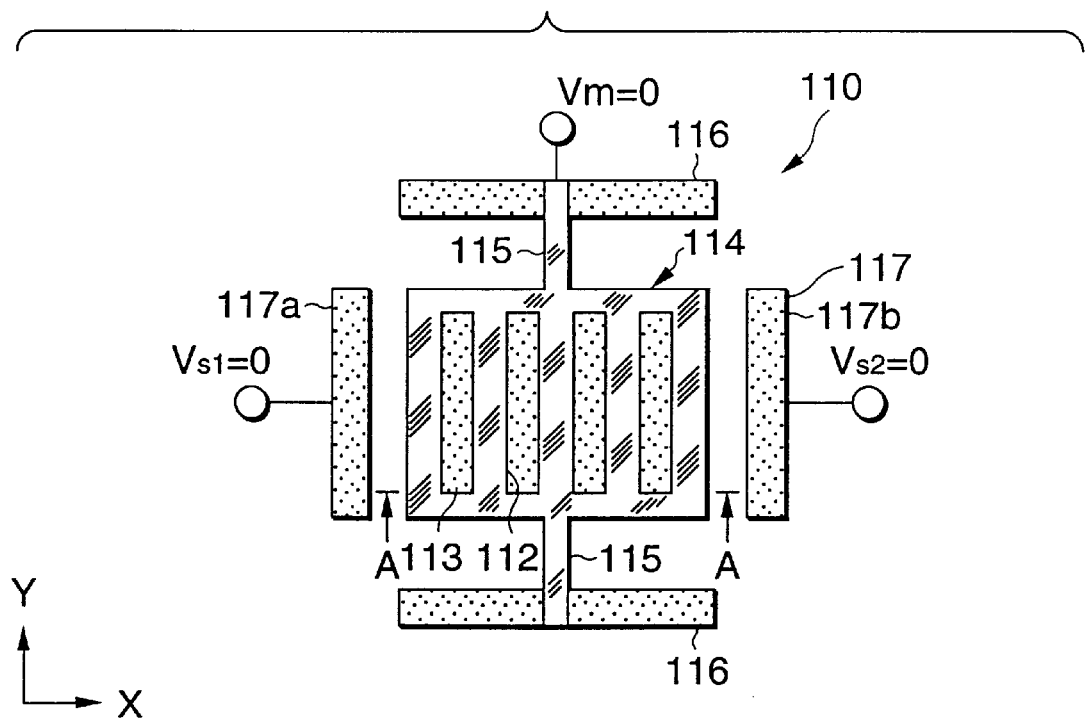
FIGS. 1A and 1B are plan views of a light modulation element in a first embodiment of the invention to show a shield state and a light passing-through state.
Figure 1B:
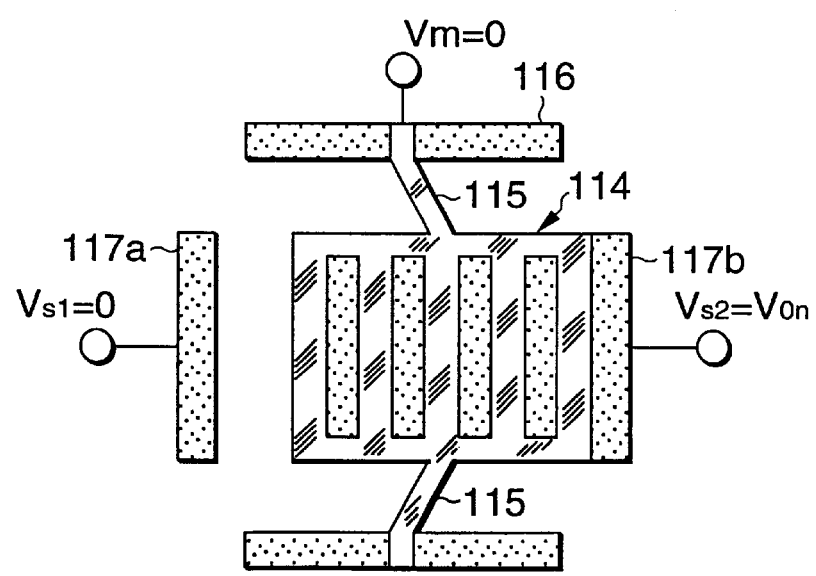
Figure 2:
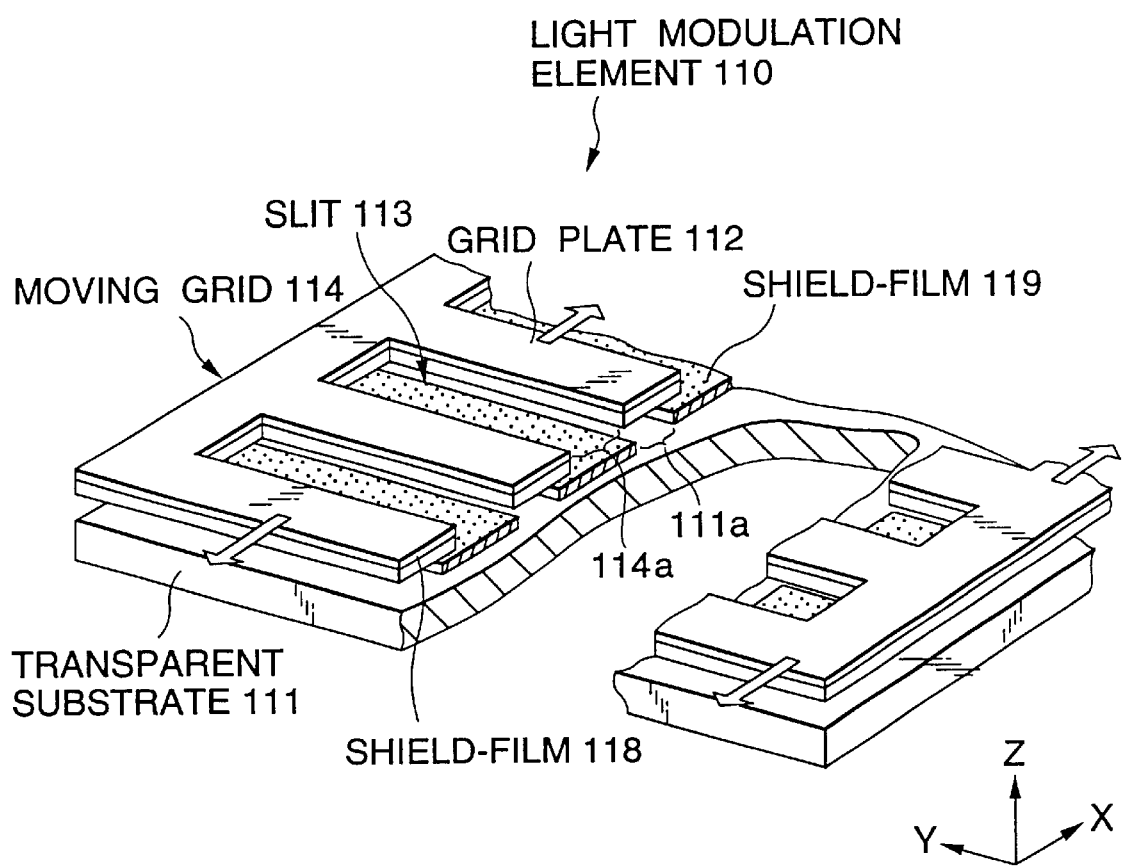
FIG. 2 is an enlarged perspective view of the main part of the light modulation element in FIG. 1

FIGS. 1A and 1B are plan views to show a first embodiment of a light modulation element according to the invention. FIG. 2 is an enlarged perspective view of the main part of the light modulation element in FIG. 1.

Referring to FIGS. 1 and 2, a light modulation element 110 comprises main members of a transparent substrate 111 made of a transparent base material such as a glass plate, a moving grid 114 which is placed facing the transparent substrate 111, comprises grid plates 112 placed side by side with a predetermined spacing for forming slits 113, and also functions as an electrode, supports 116 for supporting the moving grid 114 on the transparent substrate 111 via a beam 115 made of an elastic member, and fixed electrodes 117 for driving the moving grid 114.

The moving grid 114 is connected to one end of the beam 115 and the beam 115 is fixed at an opposite end to the support 116 placed on the transparent substrate 111. According to this support structure, the moving grid 114 is supported movably in the X direction of the arrangement direction of the grid plates 112.

A pair of a first fixed electrode 117a and a second fixed electrode 117b is placed on the transparent substrate 111 with the moving grid 114 between in the X direction. Each of the fixed electrodes 117a and 117b is shaped as a belt-like cubic structure at least having the same width as the moving grid 114 in the Y direction thereof and the same height as a conduction section of the moving grid 114 so as to efficiently increase the electrostatic force in the X direction. Drive voltage Vs1 is applied to the first fixed electrode 117a, drive voltage Vs2 is applied to the second fixed electrode 117b, and drive voltage Vm is applied to the moving grid 114 and the beam 115.

The moving grid 114 and the fixed electrodes 117a and 117b make up an electrostatic actuator, corresponding to moving grid move means. The beam 115 and the supports 116 make up an elastic support member.

Next, the structures of the transparent substrate 111 and the moving grid 114 will be discussed in detail. As shown in FIG. 2, the moving grid 114 is a grid-like member comprising grid plates 112 placed side by side with a predetermined spacing in a frame and a slit 113 is formed between the adjacent grid plates 112. The moving grid 114 is supported on the beam 115 movable in the arrow direction a predetermined distance away from the transparent substrate 111.

The moving grid 114 is formed on the whole surface with a shield film 118 for making it possible to shield light introduced from the side of the transparent substrate 111 in areas other than the slits 113. A plurality of shield films 119 are formed matching the positions on the transparent substrate 111 overlapping the positions of the slits 113 of the moving grid 114 in a neutral state (stable state), namely, the arrangement spacing of the grid plates 112 of the moving grid 114.

The shield film 119 has a width equal to or larger than a slit width 114a of the moving grid 114 and is not formed on the transparent substrate 111 overlapping a gap 111a between the adjacent shield films 119. Therefore, the areas formed with the shield films 119 become shield areas of the light modulation element 110 and the areas 111a not formed with the shield films 119 become light modulation areas where light is allowed to pass through or is shielded in response to the positions of the slits 113 of the moving grid 114.

The shield films 118 and 119 on the transparent substrate 111 and the moving grid 114 can be formed by depositing thin films on the outer surfaces of the transparent substrate 111 and the moving grid 114 (top faces in FIG. 2), for example, by a vacuum evaporation method, etc.

Figure 3:
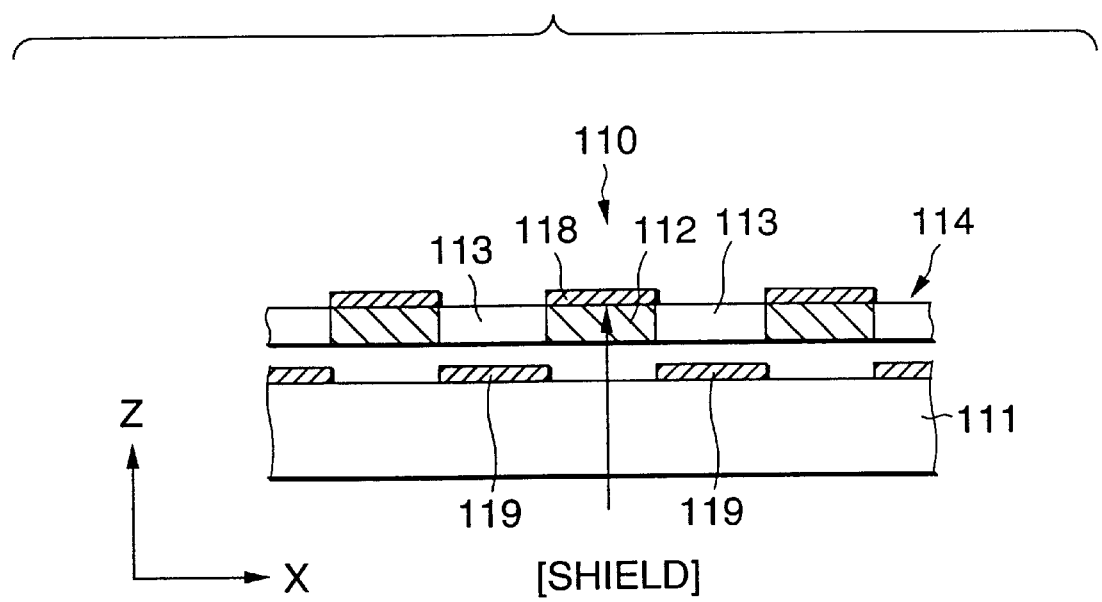
FIG. 3 is a sectional view taken on line A—A in FIG. 1 to show the shield state of the light modulation element.

That is, thin films are evaporated on the moving grid 114 and the transparent substrate 111 from the Z direction in a state in which the moving grid 114 is made still so as to become the shield state position as shown in FIG. 3, whereby the transparent substrate 111 and the moving grid 114 are formed with the shield films at the same time. This eliminates the need for accurate alignment between the shield films 118 on the moving grid 114 and the shield films 119 on the transparent substrate 111 and enables so-called self-alignment; the shield films 118 and 119 can be formed with high accuracy by executing a simple process. Thus, while the manufacturing costs are reduced, a light modulation element having a good shield characteristic can be provided.

Preferably, the shield films 118 and 119 are, for example, metal films of aluminum, chromium, etc., conductive polymeric materials, etc., or may be insulation material of carbon-dispersed resin, etc. Further, the grid plate 112 itself may be formed of a shield material.

Preferably, the first and second fixed electrodes 117a and 117b and the moving grid 114 have electrical conductivity and are electric conductors. Specifically, metal, highly doped semiconductors, conductive polymeric materials, etc., can be named as preferred examples. The first and second fixed electrodes 117a and 117b and the moving grid 114 may comprise each an electric conductor deposited surrounding an insulator. Specifically, a structure wherein a metal thin film is deposited surrounding an inorganic insulator of silicon oxide, silicon nitride, etc., or insulation polymeric material of polyimide, etc., or the like can be named as a preferred example.

The grid part of the moving grid 114 need not necessarily have electrical conductivity and only a part of the frame containing the fixed electrode 117a, 117b side may have electrical conductivity.

Generally, the fixed electrodes 117a and 117b can be formed of metal oxide having electrical conductivity. As the metal, for example, gold, copper, aluminum, titanium, tungsten, molybdenum, tantalum, chromium, nickel, etc., can be used. Crystalline silicon, polycrystalline silicon, amorphous silicon, etc., can be used as the highly doped semiconductor.

The described light modulation element 110 can move the moving grid 114 in the arrow directions shown in FIGS. 1 and 2 by an electrostatic force generated by applying a voltage to the first and second electrodes 117a and 117b and the moving grid 114. As the moving grid 114 is moved, light modulation is executed.

That is, as shown in FIG. 3, when the slits 113 of the moving grid 114 are at the positions overlapping the shield films 119 on the transparent substrate 111, light from a surface light source (not shown), for example, incident from below the light modulation element 110 is shielded by the shield films 118 and 119 and is not emitted toward the top of the light modulation element 110 (shield state).

Figure 4:
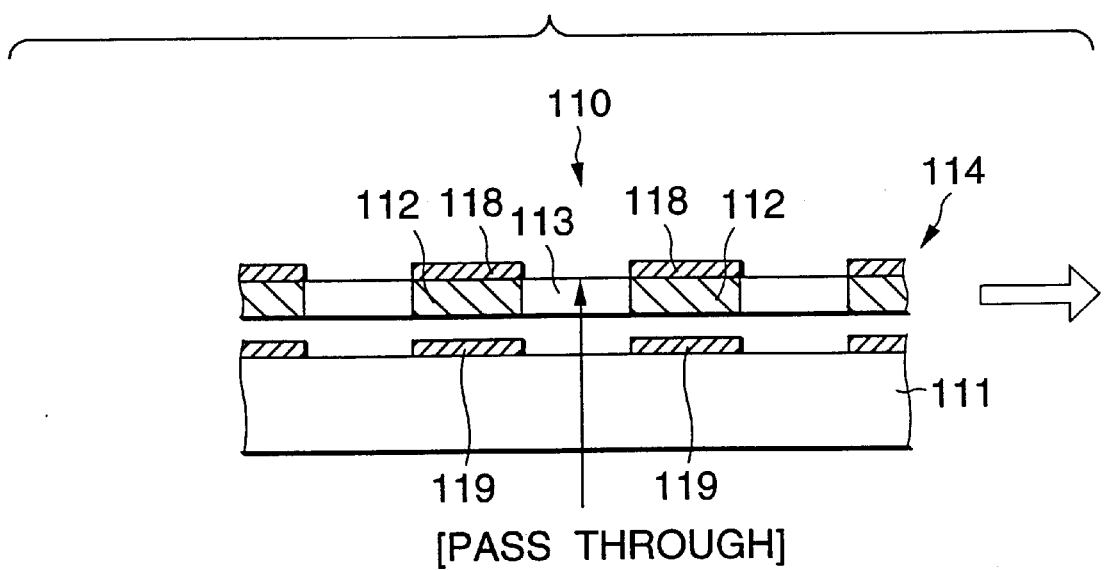
FIG. 4 is a sectional view taken on line A—A in FIG. 1 to show the light passing through state of the light modulation element.

On the other hand, as shown in FIG. 4, when the slits 113 of the moving grid 114 are at the positions not overlapping the shield films 119 on the transparent substrate 111, namely, when the grid plates 112 are at the positions overlapping the shield films 119, light emitted from below the light modulation element 110 is shielded at the positions of the shield films 119, but is emitted toward the top of the light modulation element 110 at the positions of the slits 113 (pass-through state).

Next, the specific light modulation operation of the light modulation element 110 in the embodiment will be discussed.

As shown in FIG. 1A, in a state in which a voltage of 0 V is applied to the moving grid 114 and the first and second fixed electrodes 117a and 117b of the light modulation element 110 (Vs1=Vs2=Vm=0), an electrostatic force does not act on the moving grid 114 and the moving grid 114 stands still at the shield position by an elastic force of the beam 115 (shield state shown in FIG. 3). This shield position becomes a neutral state. In this case, light emitted from the surface light source and passing through the light transmission areas on the transparent substrate 111 is shielded by the shield films 118 and 119.

As shown in FIG. 1B, if a voltage of 0 V is applied to the first fixed electrode 117a, voltage of Von is applied to the second fixed electrode 117b, and a voltage of 0 V is applied to the moving grid 114 (Vs1=Vm=0, Vs2=Von), the moving grid 114 moves to the side of the second fixed electrode 117b in the X direction by the action of static electricity and stands still at the positions where the shield films 118 and 119 overlap (pass-through state in FIG. 4). Thus, the light emitted from the surface light source and passing through the light transmission areas 111a on the transparent substrate 111 passes through the slits 113 of the moving grid 114 and is emitted toward the top of the light modulation element 110.

Likewise, Von is applied to the first fixed electrode 117a and a voltage of 0 V is applied to the second fixed electrode 117b and the moving grid 114, whereby the moving grid 114 can be moved to the side of the first fixed electrode 117a in the −X direction.

If the voltage applied to the second fixed electrode 117b is changed to 0 V from the state shown in FIG. 1B, the moving grid 114 is restored to the shield position of the initial position by the elastic restoring force of the beam 115. The voltage applied to the second fixed electrode 117b and the moving grid 114 is changed to 0 V and the voltage applied to the first fixed electrode 117a is set to Von instantaneously at the restoring time, whereby the moving grid 114 can be restored by the resultant force of the electrostatic force of the first fixed electrode 117a and the elastic restoring force of the beam 115, and higher-speed responsivity and highly stable operation can be provided.

Further, although not shown, if the electromechanical operation is performed with drive sources in both directions, the stepwise operation is also enabled wherein when the moving grid 114 is moved in one direction, transparency is set, when the moving grid 114 is moved in an opposite direction, opacity is set, and when the moving grid 114 is in a neutral state, semitransparency is set; the light transmission factor of the element can be set more finely.

Another drive technique of the light modulation element 110 may be adopted wherein the applied voltages to the fixed electrodes and the moving grid in the above-described drive technique, Von and 0 V, are replaced with each other, namely, the polarity is inverted. If the polarity is inverted, similar operation to that described above can be executed.

Only either of the fixed electrodes may be placed, in which case the electrostatic absorption operation only in one direction is performed and the configuration and the drive technique can be simplified.

Thus, light modulation can be executed according to the simple structure wherein the moving grid 114 formed with a plurality of the slits 113 is moved by performing the electromechanical operation, and the light modulation operation can be executed by moving the moving grid 114 by the slit width, so that the displacement amount of the moving grid 114 can be shortened drastically and therefore the drive voltage can be lessened. Thus, the manufacturing process is facilitated and the manufacturing costs can be reduced; in addition, the light modulation element excellent in high-speed responsivity and stability can be provided.

For example, the light modulation elements 110 are arranged in one dimension or two dimensions on the substrate 111 and are driven and controlled by a simple matrix drive method, an active matrix drive method, etc., whereby it is made possible to execute light modulation on the one-dimensional or two-dimensional array.

The light modulation element 110 is set so as to enter the shield state in the neutral state, but may be set so as to enter the light passing-through state in the neutral state in response to the use purpose.

Next, a second embodiment of a light modulation element according to the invention will be discussed.

Figure 5A:
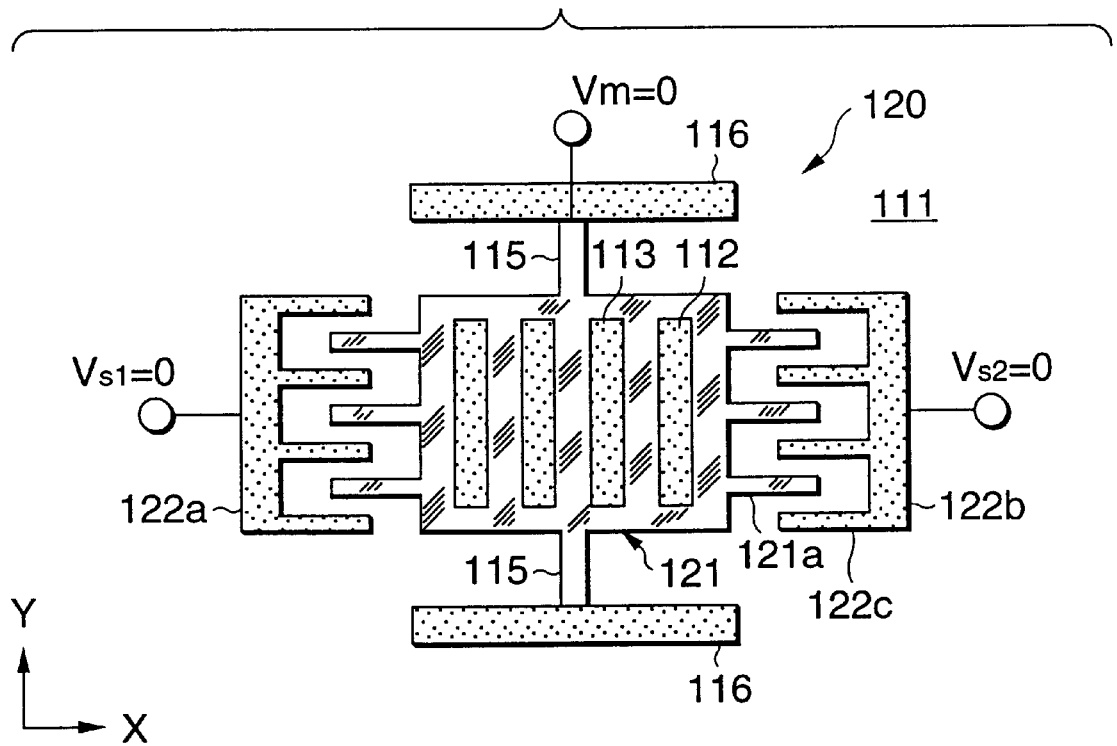
FIGS. 5A and 5B are plan views of a light modulation element in a second embodiment of the invention to show a shield state and a light passing-through state.
Figure 5B:
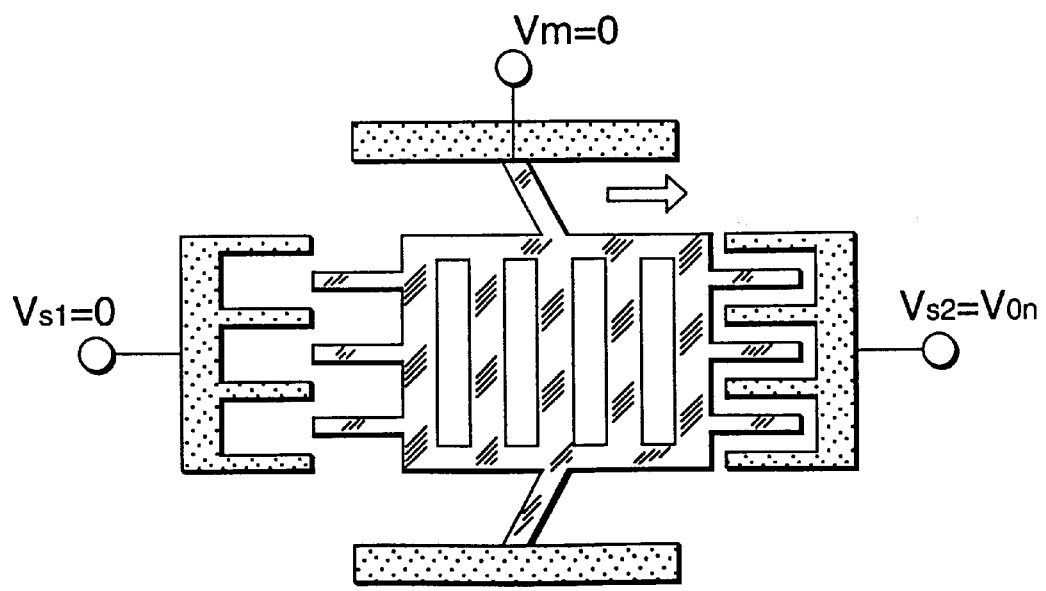

FIGS. 5A and 5B are plan views to show a light modulation element 120 in the second embodiment of the invention. The light modulation element 120 in the second embodiment is the same as the light modulation element 110 in the first embodiment except fixed electrodes or moving grid. Parts identical with those previously described with reference to the figures are denoted by the same reference numerals in FIGS. 5A and 5B and will not be discussed again.

In the second embodiment, a pair of a first fixed electrode 122a and a second fixed electrode 122b is placed on a transparent substrate 111 with a moving grid 121 between in the Y direction. As in the first embodiment, the moving grid 121 is fixed to supports 116 on the transparent substrate 111 via a beam 115 so that it can move in the X direction.

The moving grid 121 is shaped like comb teeth on the fixed electrode sides and the fixed electrodes 122a and 122b are shaped like comb teeth on the moving grid 121 sides. Fixed electrode teeth 122c and moving grid teeth 121a mesh with each other.

In the light modulation operation of the light modulation element 120, as in the first embodiment, as shown in FIG. 5A, when voltages applied to the first and second fixed electrodes 122a and 122b and the moving grid 121 are 0 V, the moving grid 121 enters a neutral state, providing an opaque condition because of the shield effect of shield films 118 and 119.

As shown in FIG. 5B, the applied voltage to the second fixed electrode 122b, Vs2, is changed to Von, whereby electrostatic attraction acts between the comb teeth 121a of the moving grid 121 on the second fixed electrode 122b side and the comb teeth 122c of the second fixed electrode 122b, causing the moving grid 121 to move in the X direction. Thus, the shield films 118 and 119 overlap each other and the light transmission factor of the moving grid 121 is raised.

If the applied voltage to the second fixed electrode 122b, Vs2, is set to 0 V from the state, the moving grid 121 is elastically restored to the state in FIG. 5A.

Likewise, if the applied voltage to the first fixed electrode 122a, Vs1, is changed to Von, the moving grid 121 moves in the −X direction, and the light transmission factor of the moving grid 121 is raised.

Thus, the fixed electrodes and the moving grid are shaped like comb teeth, whereby the displacement amount of the moving grid can be increased and position control based on voltages can be facilitated. Each of the moving grids in the first and second embodiments comprises grid plates placed side by side with a predetermined spacing in the frame, but a plurality of grid plates may be connected every predetermined spacing at the centers of the grid plates. In this case, the rigidity of the whole moving grid lessens and the moving grid can be driven at lower voltage.

Next, a light modulation element according to a third embodiment of the invention will be discussed.

Figure 6A:
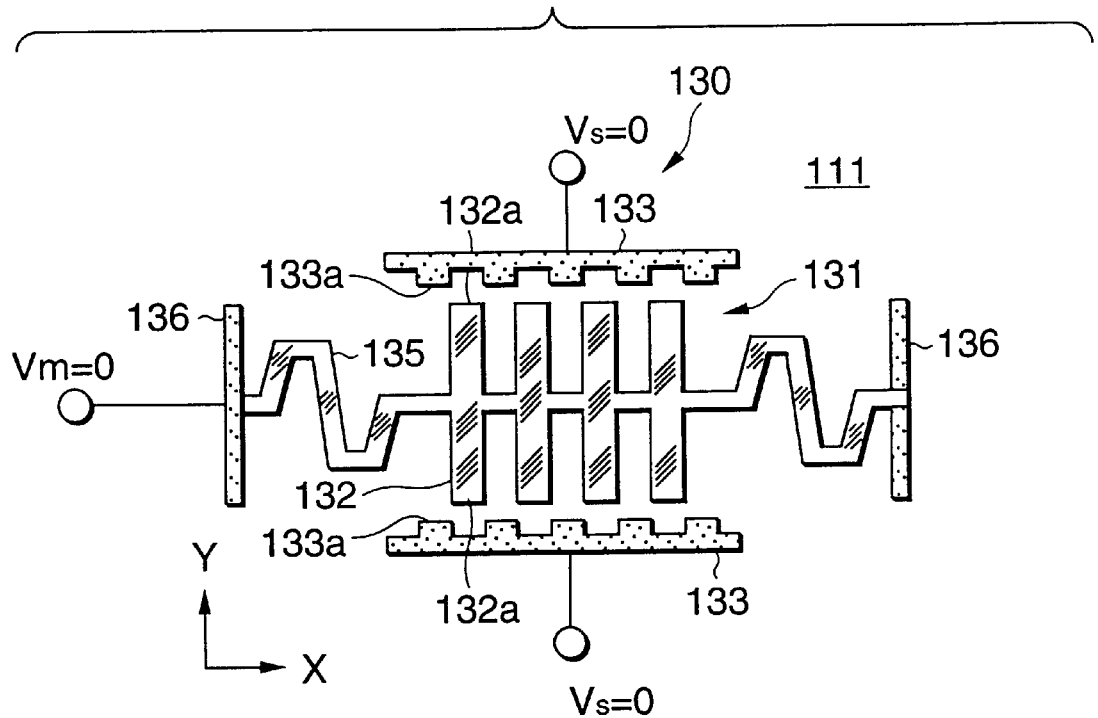
FIGS. 6A and 6B are plan views of a light modulation element in a third embodiment of the invention to show a shield state and a light passing-through state.
Figure 6B:
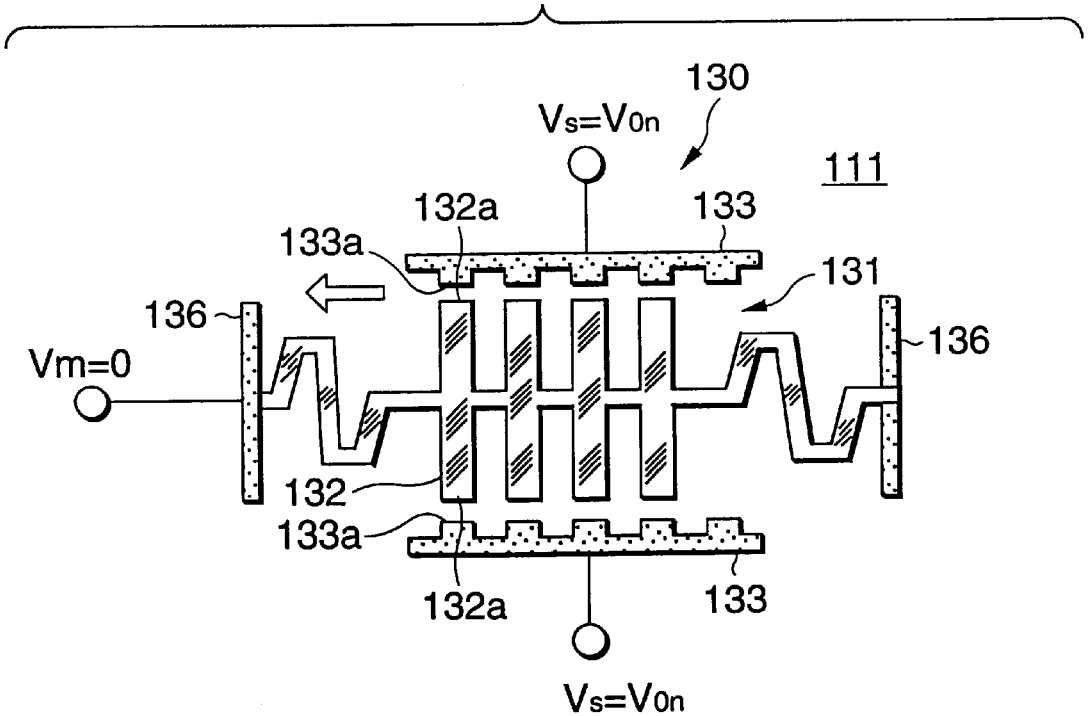

FIGS. 6A and 6B are plan views of a light modulation element 130 in the third embodiment of the invention to show a shield state and a light passing-through state.

The light modulation element 130 in the embodiment has a moving grid 131 comprising a plurality of grid plates 132 connected every predetermined spacing at the centers of the grid plates 132 on a transparent substrate 111. That is, the moving grid 131 is formed by opening both ends in the length direction of the slits 113 made in the moving grid 114 shown in FIG. 1. As in the first and second embodiments, each grid plate 132 is formed on a surface with a shield film and the space between the adjacent grid plates 132 serves as a slit. Although not shown, shield films are formed on the transparent substrate corresponding to the slit positions in a similar manner to that in FIG. 2.

A pair of a first fixed electrode 133a and a second fixed electrode 133b is placed on a transparent substrate 111 with a moving grid 131 between in the Y direction and each of the fixed electrodes 133a and 133b is formed on the moving grid 131 side with a plurality of projections 133a matching the grid plate arrangement pitch of the moving grid 131, whereby the fixed electrodes 133 and the moving grid 131 are substantially formed like comb teeth, making up a so-called electrostatic linear actuator.

The moving grid 131 is connected to a spring-shaped elastic member 135 and the elastic member 135 is fixed to supports 136 installed on the transparent substrate 111. This support structure enables the moving grid 131 to move in the X direction.

In the light modulation element 130 in the embodiment, the moving grid 131 is moved in the X direction by the action of the electrostatic linear actuator as voltages are applied to the fixed electrodes 133 and the moving grid 131.

That is, as shown in FIG. 6A, if applied voltages to the fixed electrodes 133, Vs, and applied voltage to the moving grid 131, Vm, are 0 V, electrostatic attraction does not act, the moving grid 131 enters a neutral state, and the light modulation element 130 enters a shield state.

If the applied voltages to the fixed electrodes 133, Vs, are changed to Von and the applied voltage to the moving grid 131, Vm, is set to 0 V as shown in FIG. 6B from the state, the moving grid 131 is moved in the X direction by electrostatic attraction to the position where end parts 132a of each grid plate 132 become closest to the projections 133a, whereby the shield films and the grid plates 132 on the transparent substrate 111 overlap each other, causing the light modulation element 130 to enter a light passing-through state.

Further, if the applied voltages to the fixed electrodes 133, Vs, are set to 0 V from the state, the electrostatic attraction between the grid plate end parts 132a and the projections 133a disappears and the moving grid 131 is restored to the former position shown in FIG. 6A by the elastic restoring operation of an elastic member 135 and enters the shield state.

In addition to the described control method, for example, the applied voltages to the fixed electrodes 133, Vs, may be set to 0 V and the applied voltage to the moving grid 131, Vm, is set to 0 V or Von for operating the light modulation element 130.

Further, the fixed electrode may be divided into more than one group and the groups may be given an offset by ⅓ pitch mutually, whereby when the electrodes in any group overlap the grid plate end parts of the moving grid, a shift from any other group always occurs, and the moving grid can be moved either left or right by changing the voltage for each group in sequence.

A move of the moving grid 131 can be controlled more precisely and more reliably by such an electrostatic linear actuator.

Next, a fourth embodiment of the invention using the light modulation elements in each embodiment described above to form a flat-panel display unit will be discussed.

Figure 7:
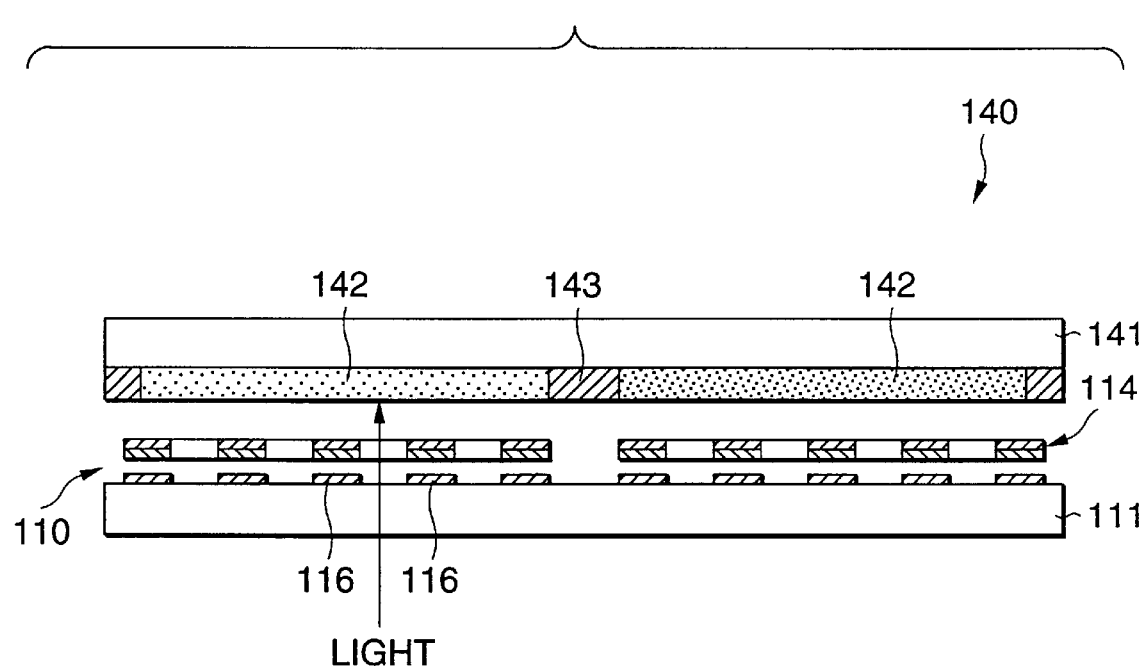
FIG. 7 is a sectional view to show the configuration of a flat-panel display unit of a fourth embodiment of the invention.

FIG. 7 is a sectional view of the main part of a flat-panel display unit 140 formed using the light modulation elements in the first embodiment. The flat-panel display unit 140 modulates light from a surface light source (not shown), for example, ultraviolet rays by means of the light modulation elements 110 and excites phosphors 142 placed on the face of a front panel 141 on the moving grid 114 side by applying light passing through the light modulation elements 110 and emitted to the front panel 141 side for forming a desired image.

The light modulation elements 110 are arranged like a one-dimensional or two-dimensional matrix and the phosphors 142 are arranged in response to the positions of the light modulation elements 110, whereby a desired pattern can be displayed.

FIG. 7 shows the configuration incorporating the light modulation elements 110 in the first embodiment as an example, but the light modulation elements 120 or 130 in the second or third embodiment can also be incorporated likewise, of course.

The front plate 141 is formed of a transparent substrate such as glass, but may be made of a fiber-like substrate, a diffusion film, or the like, for example. Thus, the configuration can be applied not only as a display unit, but also as a contact exposure head to a sensitive material.

If one pixel is formed of one light modulation element, the phosphor 142 is placed in the whole area of the moving grid of the light modulation element; if one pixel is made up of two or more light modulation elements, the phosphor 142 is placed over the whole of the moving grids of the light modulation elements. A black matrix 143 is formed between the adjacent phosphors 142, whereby the contrast of a display image is enhanced.

The luminescent color of each phosphor 142 is made different for each light modulation element, whereby color display with three primary colors of R, G, and B (or Y, M, and C), for example, is enabled.

As the light source, the surface light source is placed on the opposite side of the transparent substrate 111 to the light modulation element 110 side as described above; in addition, light may be introduced from a side end part of the transparent substrate 111. In this case, the configuration of the flat-panel display unit can be simplified and the costs can be reduced.

The flat-panel display unit is thus formed, whereby light from the light source is applied directly to the phosphors while the most of the high-speed responsivity and low-voltage drive characteristic of the light modulation elements is made. Thus, the flat-panel display unit that can display a high-brightness and high-quality image and can produce a large area at low costs can be provided.

Figure 8:
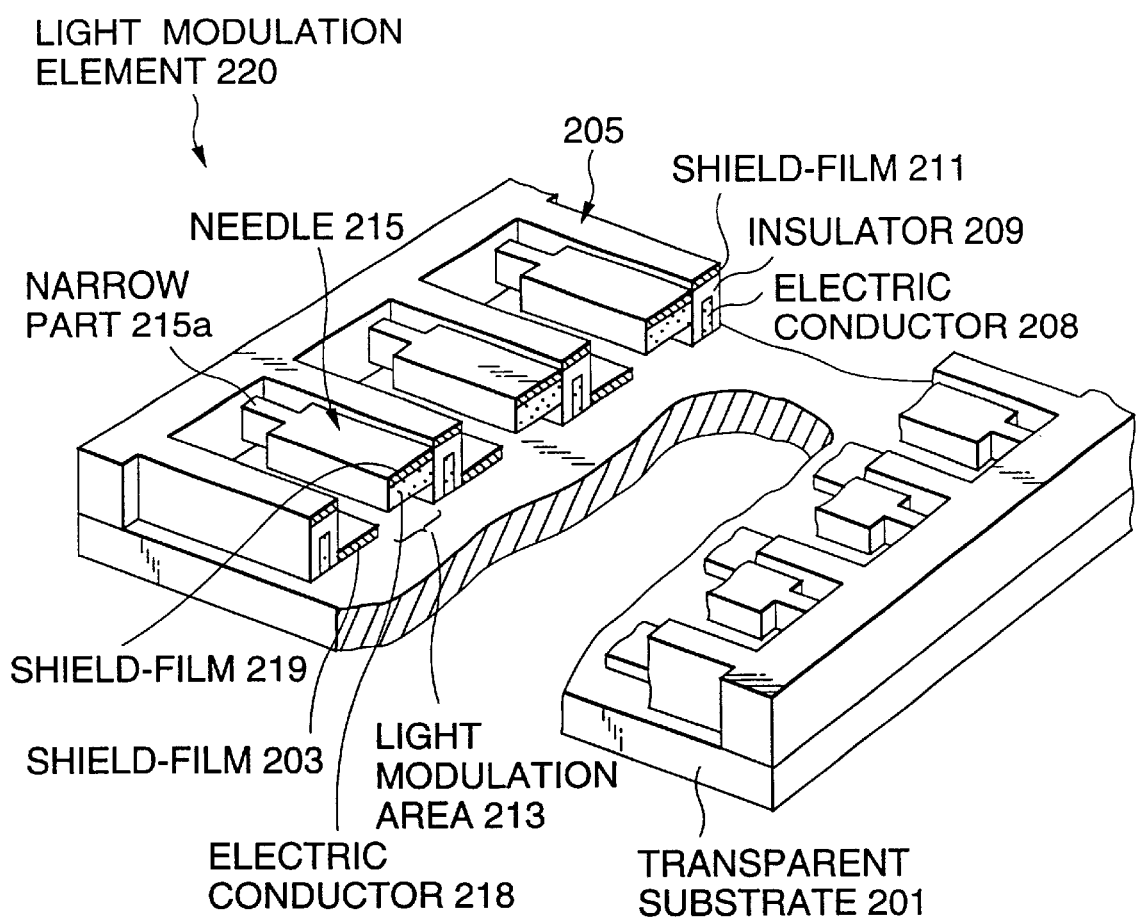
FIG. 8 is a partially cutaway view in perspective of a light modulation element according to the invention.
Figure 9:
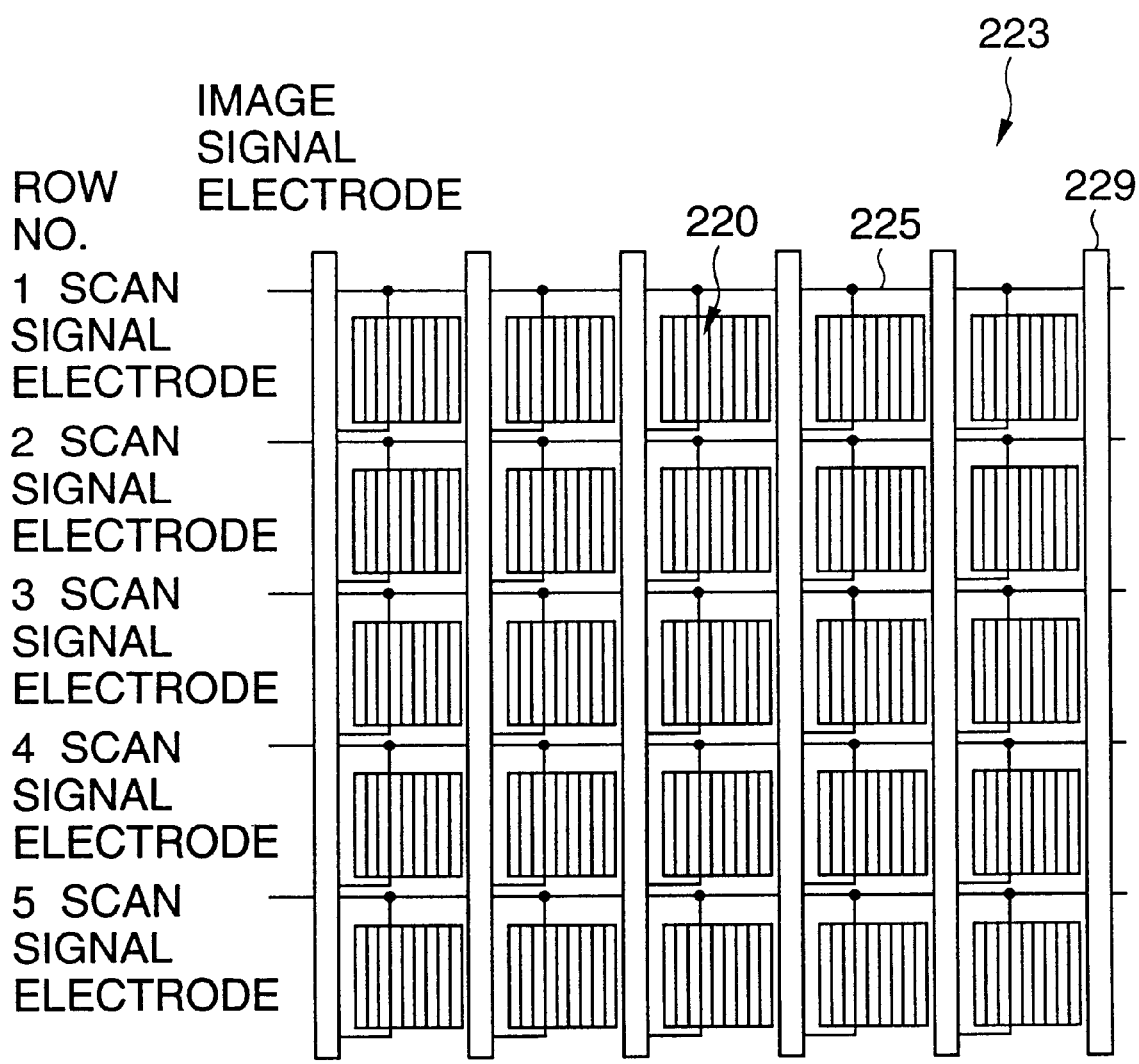
FIG. 9 is a plan view of an array-type light modulation element comprising the light modulation elements in FIG. 8 arranged as a simple matrix.
Figure 10:
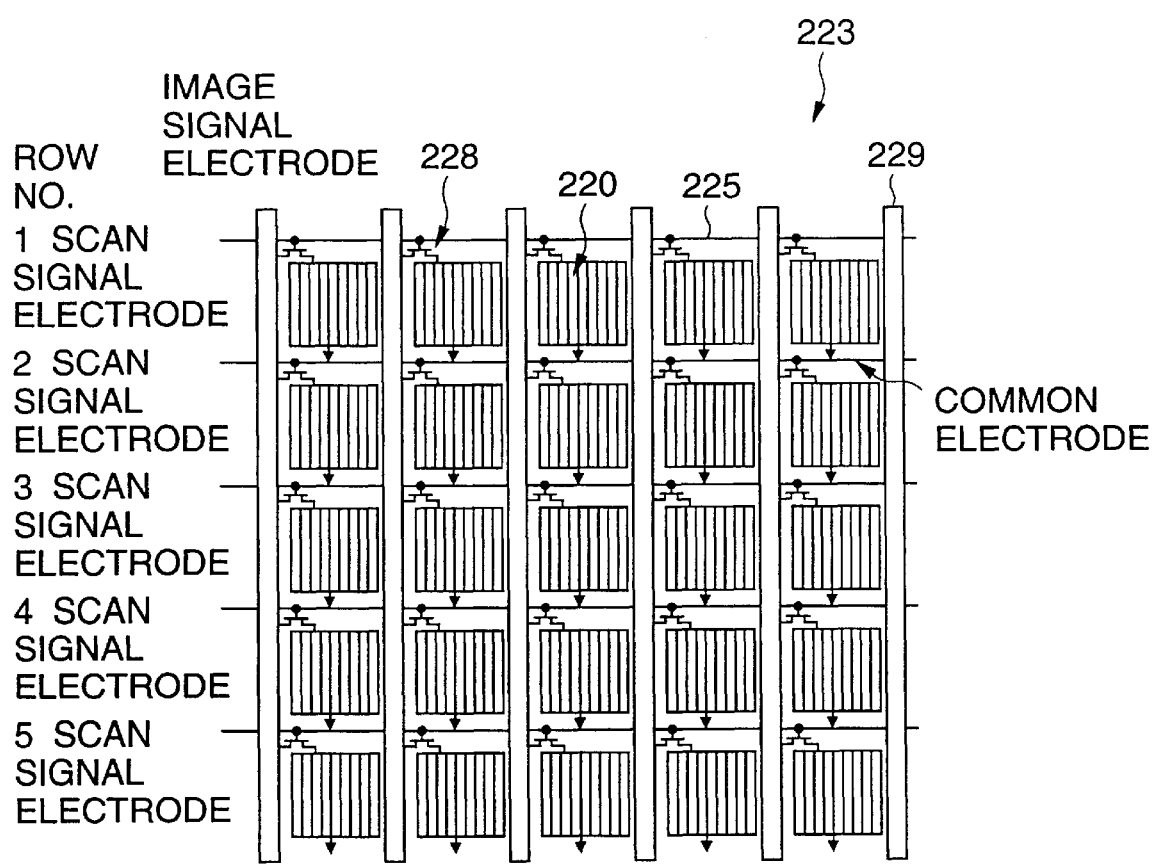
FIG. 10 is a plan view of an array-type light modulation element comprising the light modulation elements in FIG. 8 arranged as an active matrix.

Next, a fifth embodiment of a light modulation element according to the invention will be discussed FIG. 8 is a partially cutaway view in perspective of a light modulation element according to the invention. FIG. 9 is a plan view of an array-type light modulation element comprising the light modulation elements shown in FIG. 8 arranged as a simple matrix. FIG. 10 is a plan view of an array-type light modulation element comprising the light modulation elements shown in FIG. 8 arranged as an active matrix.

As shown in FIG. 8, a plurality of shield films 203 are formed with a given spacing on a transparent substrate 201 having insulation and being transparent for light to be modulated. The shield films 203 shield light emitted from below the transparent substrate and blocks light emission to the top.

Between the two adjacent shield films 203, a grid wall 205 is provided touching one shield film 203 on the transparent substrate 201. A belt-like electric conductor (charged body) 208 is formed inside the grid wall 205 and is coated on the surface with an insulator 209. A shield film 211 is formed on the upper end face of the grid wall 205. Therefore, light introduced from below the transparent substrate 201 is not emitted from the upper end face of the grid wall 205 in the state in FIG. 8. The grid walls 205 can be used as a black matrix for enhancing the contrast ratio for use with a light modulation element or a display unit.

A light modulation area 213 is formed between the grid wall 205 and the other shield film 203 not touching the grid wall 205. Light introduced from below the transparent substrate 201 passes through the light modulation area 213 and is emitted to the top of the transparent substrate 201.

A needle 215 is disposed above the light modulation area 213. It has a narrow part 215a lessening in sectional area at both ends of the needle 215 in the length direction thereof, such that when viewed from the top, the needle has a belt shape. The narrow parts 215a become weak and deformed, whereby the needle 215 can be moved in parallel with the transparent substrate 201. The needle 215 is formed with a belt-like electric conductor (charged body) 218 and a shield film 219 on the top of the electric conductor 218. The electric conductor 218 and the shield film 219 may be formed of a shield-property, conductive film in one piece. For example, the needle 215 can use metal, a metal compound, a high-impurity-doped semiconductor, conductive macromolecule, etc., and may be given a shield property. A conductive film may be formed surrounding the insulator (particularly, the side of the needle).

In a neutral state (the electric conductors are at the same potential and an electrostatic force does not act), the needles 215 are placed above the light modulation areas 213 and block emission of light passing through the light modulation areas 213 to the tops thereof.

The light modulation elements 220 thus formed can provide a two-dimensional array-type light modulation element 223 shown in FIG. 9 as an example. The array-type light modulation element 223 comprises a plurality of scan signal electrodes 225 arranged in parallel and a plurality of image signal electrodes 229 arranged in parallel, orthogonal to the scan signal electrodes 225. Of course, the array-type light modulation element 223 is not limited to the example, and may be an array-type light modulation element comprising light modulation elements arranged in one dimension.

A controller (not shown) for controlling the scan signal electrodes 225, the image signal electrodes 229, and signals output to the electrodes 225 and 229 corresponds to needle move means.

Here, FIG. 9 shows a simple matrix, but an active matrix comprising semiconductor switches 228 such as TFTs provided in a one-to-one correspondence with pixels as shown in FIG. 10 may be adopted or although not shown, an active matrix comprising electromechanical switches operated by the electrostatic operation of flexible thin film having contacts, provided in a one-to-one correspondence with pixels may be adopted.

The light modulation element in FIG. 8 can be formed by various thin-film processes or thick-film processes such as patterning based mainly on photolitho, etching, plating, printing, and transfer.

Next, a pixel section in the simple matrix will be discussed.

The light modulation elements 220 are placed at the intersections of the scan signal electrodes 225 and the image signal electrodes 229

Figure 11A:
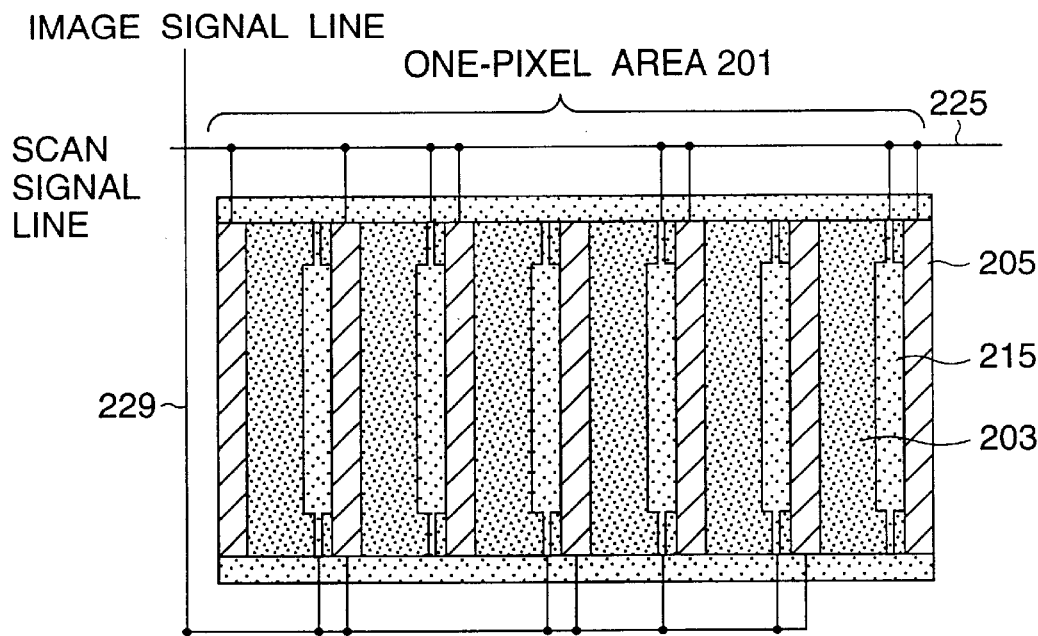
FIGS. 11A and 11B are connection diagrams each to show the connection state of scan signal and image signal lines of the light modulation element.

In each of the light modulation elements 220, one of the two grid walls 205 adjoining one needle 215 is connected to the image signal electrode and the other is connected to the scan signal electrode, as shown in FIG. 11A. The needle is connected to the same electrode as the close grid wall. That is, the needle 215 sandwiched between the two grid walls 205 and the shield film 203 make up one light modulation part.

Figure 11B:
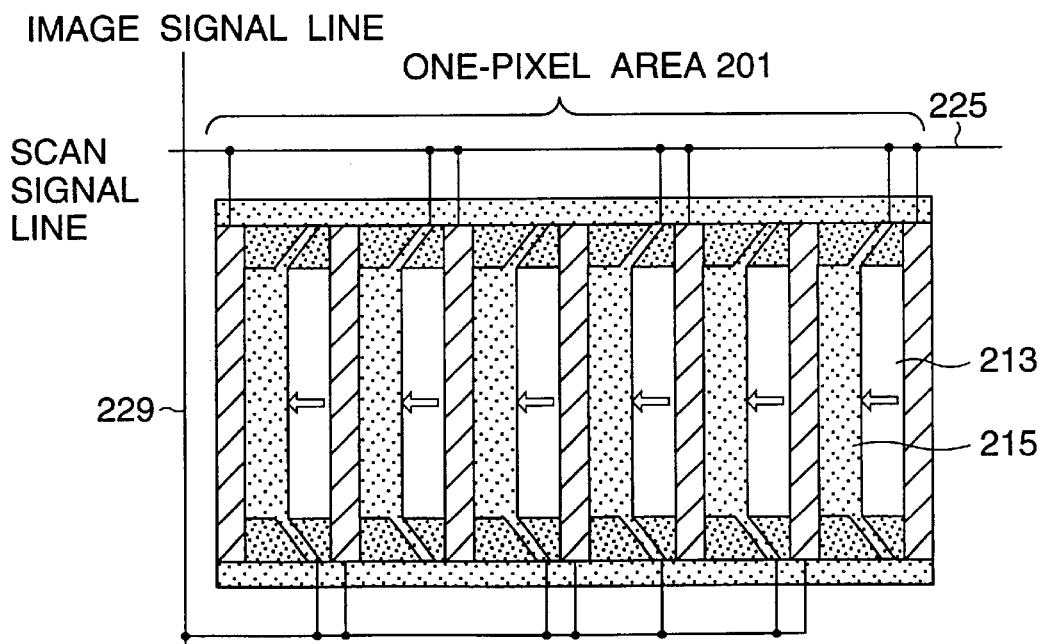

According to the element configuration and electrode connection, when the voltages of the scan signal electrode 225 and the image signal electrode 229 are 0 [V], the needle enters the neutral state (shield state) as shown in FIG. 11A; when the voltage of the image signal electrode 229 is Va [V], the needle is moved by an electrostatic force and enters a light passing-through state as shown in FIG. 11B.

Next, a specific drive method of the light modulation element 220 and the array-type light modulation element 223 described will be discussed.

Figure 12A:
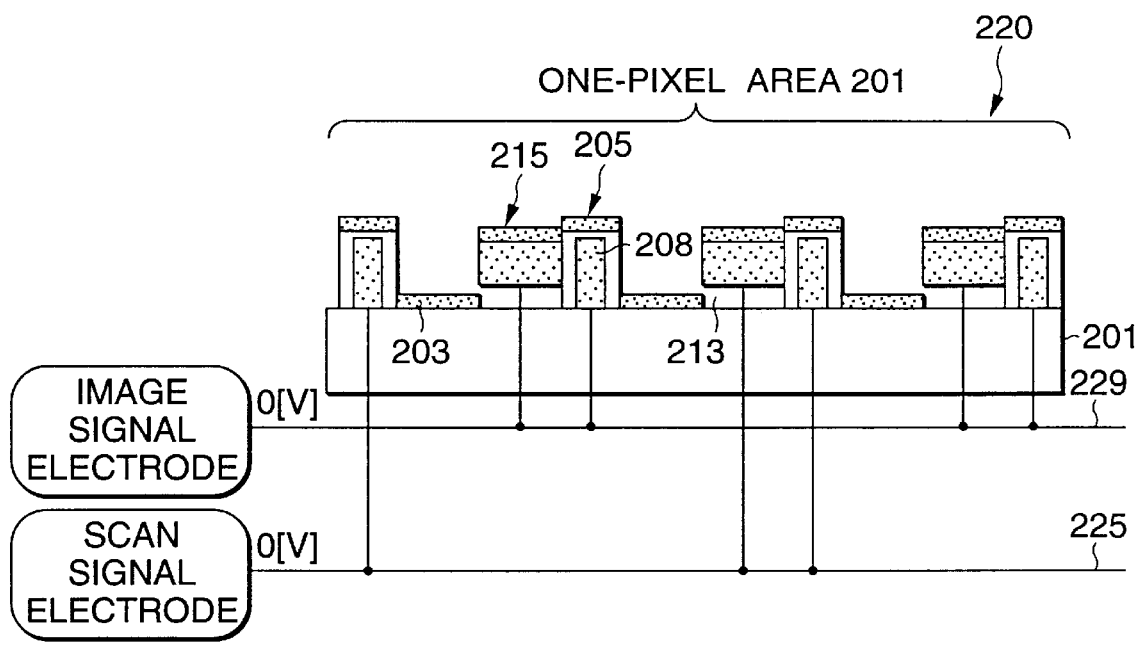
FIGS. 12A and 12B are sectional views of the main part to describe each operation state of light modulation element of first embodiment of the invention.

As shown in FIG. 12A, when the scan signal electrode 225 and the image signal electrode 229 are at the same potential (0 [V]), the needle 215 overlaps the top of the light modulation area 213 and blocks emission of light passing through the light modulation area 213 to the top of the light modulation element 220.

Figure 12B:
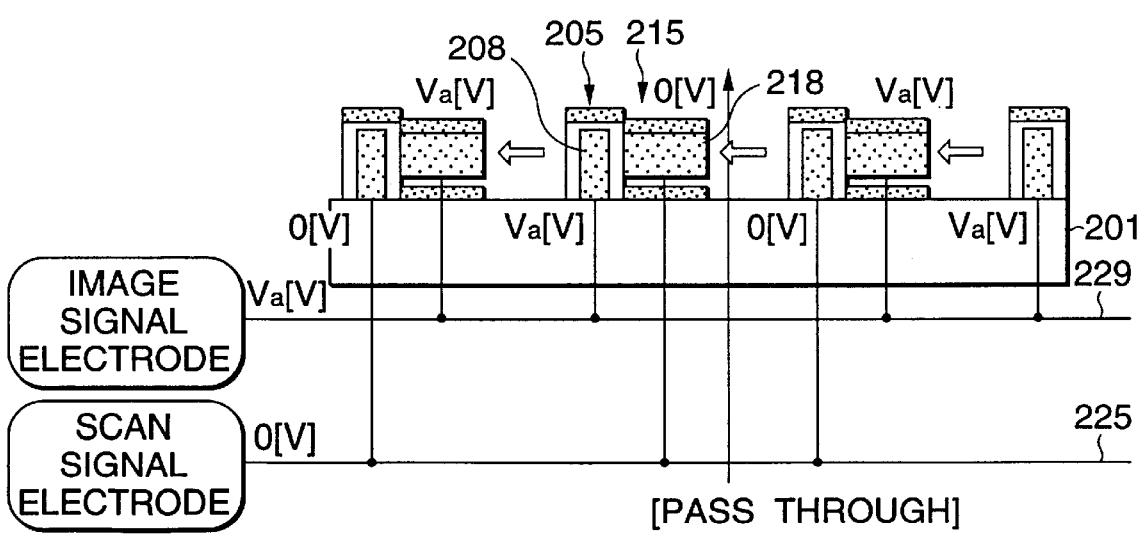

On the other hand, if an image signal voltage Va is applied to the image signal electrode 229 and a voltage of 0 [V] is applied to the scan signal electrode 225 at the scanning time as shown in FIG. 12B, the needles 215 is attracted to the grid wall 205 by the electrostatic attraction force between the charges accumulated in the image signal electrode 229 and the electric conductor 208 of the grid wall 205 and the scan signal electrode 225 and the electric conductor 218 of the needle 215, and is moved in parallel with the transparent substrate 201 as indicated by the arrow in the figure.

Resultantly, the needle 215 does not shield light in the light modulation area 213 and the light passing through the transparent substrate 201 is emitted through light modulation area 213, namely, binary light modulation is enabled.

According to the basic principle, two-dimensional light modulation array can be driven in the simple matrix structure shown in FIG. 9. In the example, the fact that the relationship between the voltages of the scan signal electrode 225 and the image signal electrode 229 and displacement of the needle 215 based on the voltages has a hysteresis characteristic is used and appropriate voltages are applied to the electrodes 225 and 229 in response to the characteristic.

In the first embodiment, if the neutral position applied when all applied voltages are set to 0 [V] is set to the shield position shown in FIG. 11A and binary control is performed between the shield position shown in FIG. 11A and the light passing-through position shown in FIG. 11B, the shield areas of the transparent substrate 201, the grid walls 205, and the needles 215 can be formed at a time by self-alignment.

That is, metal thin film, etc., is evaporated onto the needles 215 and the transparent substrate 201 from above in a state in which the needles 215 are placed at the shield position relative to the transparent substrate 201 (state shown in FIG. 11A), whereby the shield areas of the transparent substrate 201, the grid walls 205, and the needles 215 can be formed at a time. This eliminates the need for alignment of the shield films 219 on the needles 215, the shield films 203 on the transparent substrate 1, and the shield films 211 on the grid walls 205 (because of the self-alignment) and the manufacturing process can be simplified while high formation accuracy is kept, thus the manufacturing costs can be reduced. Shield films with very little leakage light can be provided.

In addition to the example, the wall grids 205, the needles 215, and the shield films 203 may be placed in any form. The electrode connection method and applied voltage involved in the placement may be in any combination if it complies with the gist of the invention.

Figure 13A:
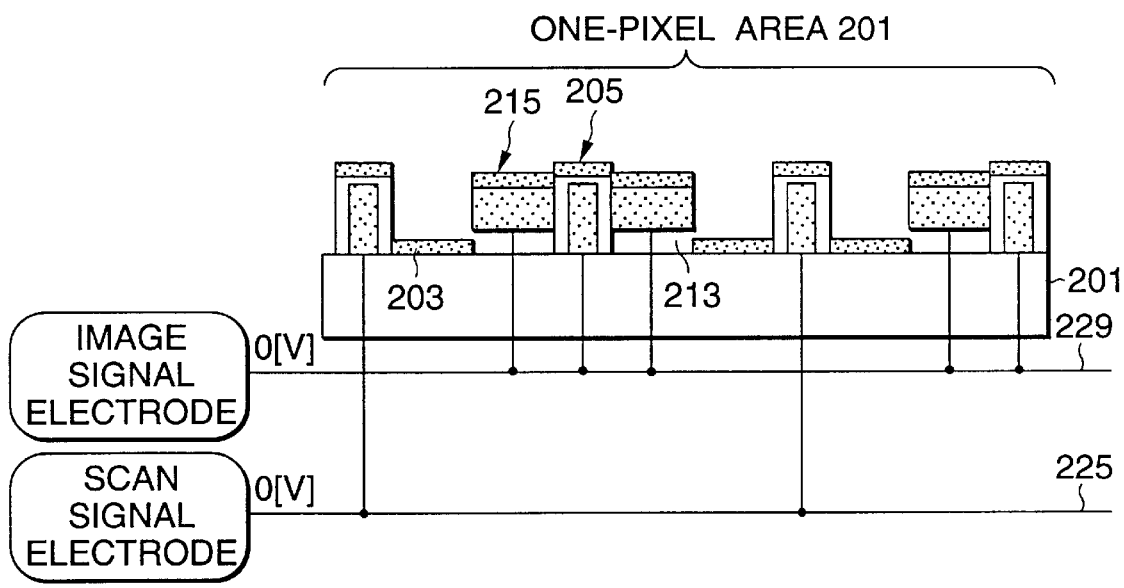
FIGS. 13A and 13B are sectional views of the main part to show a modified embodiment of the light modulation element of the first embodiment of the invention.
Figure 13B:
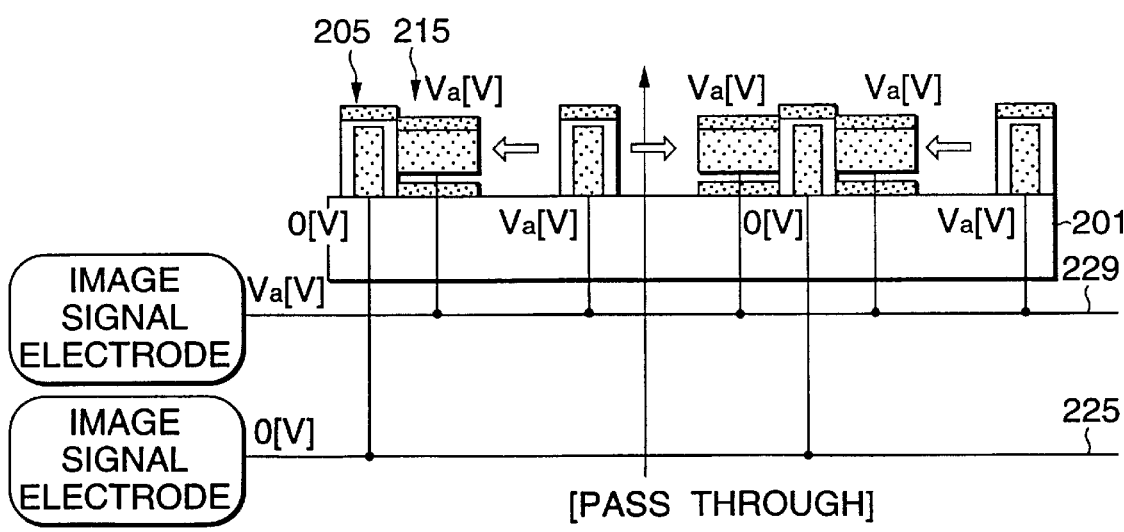

For example, as shown in FIG. 13A as a modified embodiment of the invention, the shield films 203 may be placed alternately at the position where the shield film 203 touches the right of the grid wall and the position where the shield film 203 touches the left of the grid wall, and the needles 215 at the neutral position may be placed so as to overlap the tops of the light modulation areas 213 accordingly.

According to this placement, all needles are connected to the image signal electrodes and only the grid walls are connected to the scan signal electrodes, so that the wiring structure and the formation process are simplified.

Figure 14A:
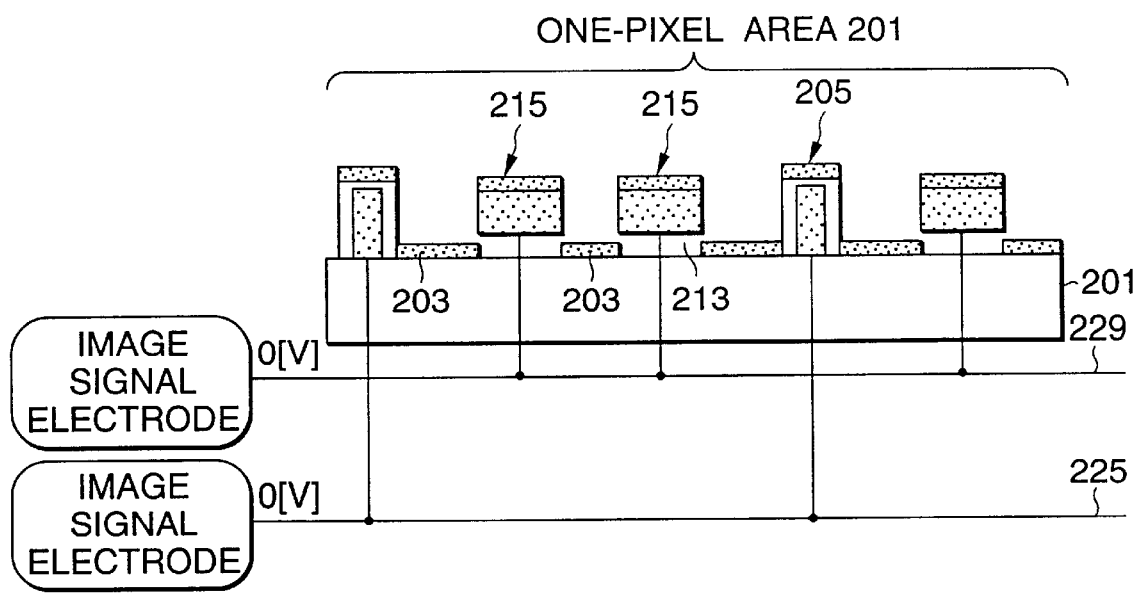
FIGS. 14A and 14B are sectional views of the main part to show a modified embodiment of the light modulation element of the first embodiment of the invention.
Figure 14B:
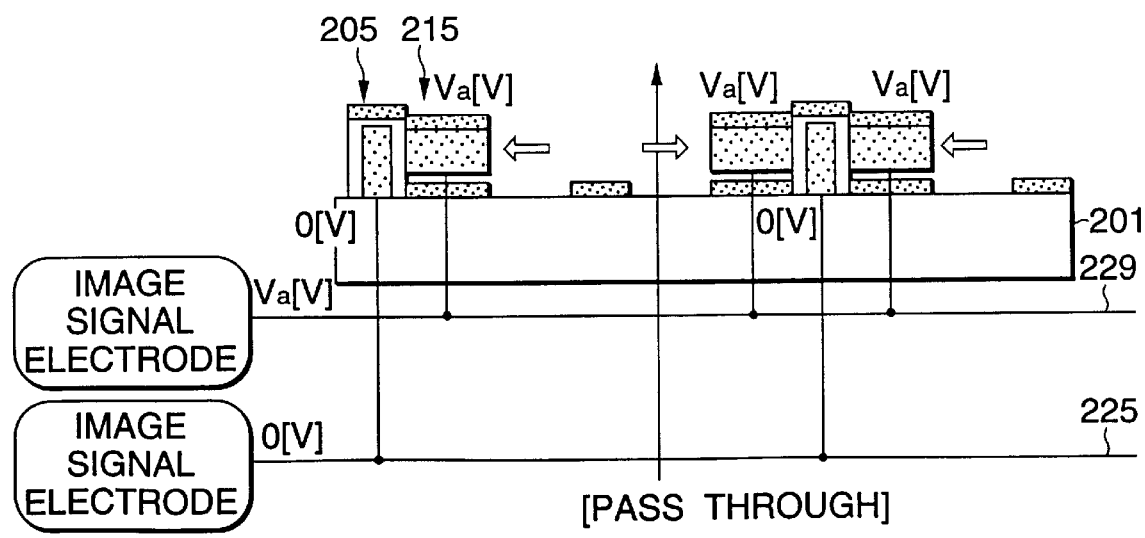

As shown in FIG. 14, the shield film 203 on the transparent substrate 201 may be used in place of the grid wall on the needle side in the neutral state in FIG. 13A, in which case the grid walls can be omitted every other grid wall and the wiring structure and the formation process are furthermore simplified. In the example in FIG. 14, the needles are connected to the image signal electrodes and the grid walls are connected to the scan signal electrodes, but the needles may be connected to the scan signal electrodes and the grid walls may be connected to the image signal electrodes, in which case similar operation can also be performed.

The described light modulation elements can be arranged at a high density on the transparent substrate and a high resolution can be provided easily. One pixel is made like a grid, whereby the displacement amount of each needle required for modulation can be lessened and the needle can also be reduced in size and weight. Therefore, it is made possible to stably execute high-speed light modulation at low voltage.

Further, to drive the light modulation elements of the embodiment as an active matrix as shown in FIG. 10, with the scan signal electrodes as common electrodes, 0 [V], for example, is applied thereto and any desired voltage (for example, 0 [V] to Va [V]) is applied to the image signal electrodes through pixel switch, whereby the light modulation elements can be driven. In this case, a larger contrast ratio can be provided and the applied voltage value, the voltage application time, and the like are set appropriately, whereby continuous tone can be provided.

In the embodiment, six light modulation areas are provided for one pixel, but the scope of the invention is not limited to it. One pixel may be provided with any number of light modulation areas.

The shield films 203 on the transparent substrate 201 may be placed on a different transparent substrate provided as a separate body from the light modulation element 220 and the different transparent substrate and the transparent substrate 201 may be joined while they are aligned. In this case, the manufacturing process of the light modulation element 220 is simplified.

Next, a sixth embodiment of a light modulation element according to the invention will be discussed.

Figure 15A:
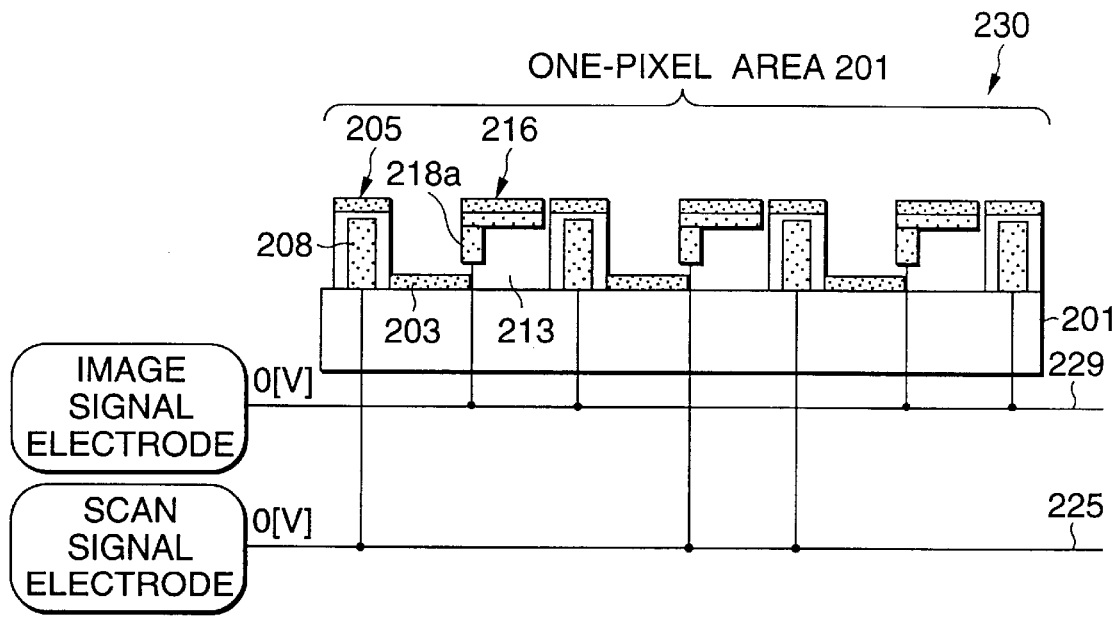
FIGS. 15A and 15B are sectional views of the main part to describe each operation state of a light modulation element of a second embodiment of the invention.
Figure 15B:
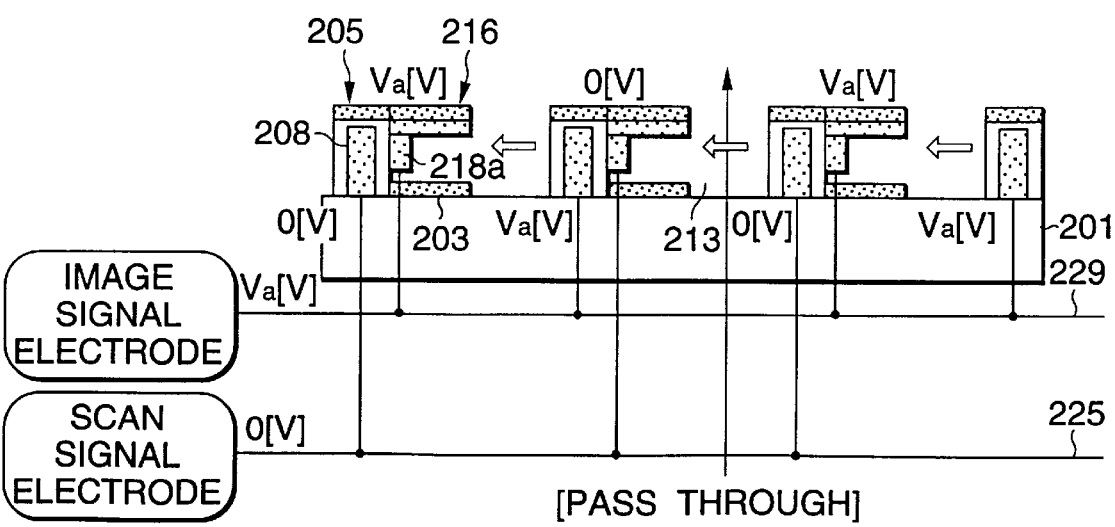

FIGS. 15A and 15B are sectional views of the main part to show a shield state and a light passing-through state of a light modulation element 230 according to the second embodiment of the invention. In the light modulation element 230 of the embodiment, an electric conductor 218a is placed perpendicularly on the opposite side end part of each needle 216 to a grid wall 205. The electric conductor 218a is thus thinned, whereby each needle 216 can be reduced in weight, so that when light modulation is executed, the move operation of the needle 216 can be provided with good high-speed responsivity. A neutral position applied when all applied voltages are set to 0 [V] is set to the shield position shown in FIG. 15A, whereby binary light modulation is enabled.

In each light modulation element 230, as shown in FIG. 15A, one of the two grid walls 205 adjacent to one needle 216 is connected to an image signal electrode and the other is connected to a scan signal electrode. The needle is connected to the same electrode as the grid wall close to the needle. That is, the needle 216 and a shied film 203 sandwiched between the two grid walls 205 make up one light modulation part.

The light modulation operation of the light modulation element 230 will be discussed.

As shown in FIG. 15A, in the neutral state in which the electric conductor 208 of each grid wall 205 and the electric conductor 218a of each needle 216 become 0 [V], the needle 216 stands still above a light modulation area 213 by the elastic force of a narrow part 215a. Thus, the light introduced from below a transparent substrate 201 passes through the light modulation area 213, but is shielded by a shield film 219 of the needle 216 (shield state).

On the other hand, as shown in FIG. 15B, if predetermined drive voltages Va and 0 [V] are applied alternately to the electric conductor 208 of each grid wall 205 and the electric conductor 218a of each needle 216, each needle 216 is attracted and moved to the adjacent grid wall 205 by the action of an electrostatic force, opening the space above the corresponding light modulation area 213, whereby the light introduced from below the transparent substrate 201 passes through the light modulation area 213 and is emitted to the top of the light modulation element 230 (light passing-through state).

If the applied voltages to the electric conductor 208 of each grid wall 205 and the electric conductor 218a of each needle 216 are again set to 0 [V], the needle 216 is restored to the neutral position shown in FIG. 15A by the elastic force of the narrow part 215a.

Figure 16A:
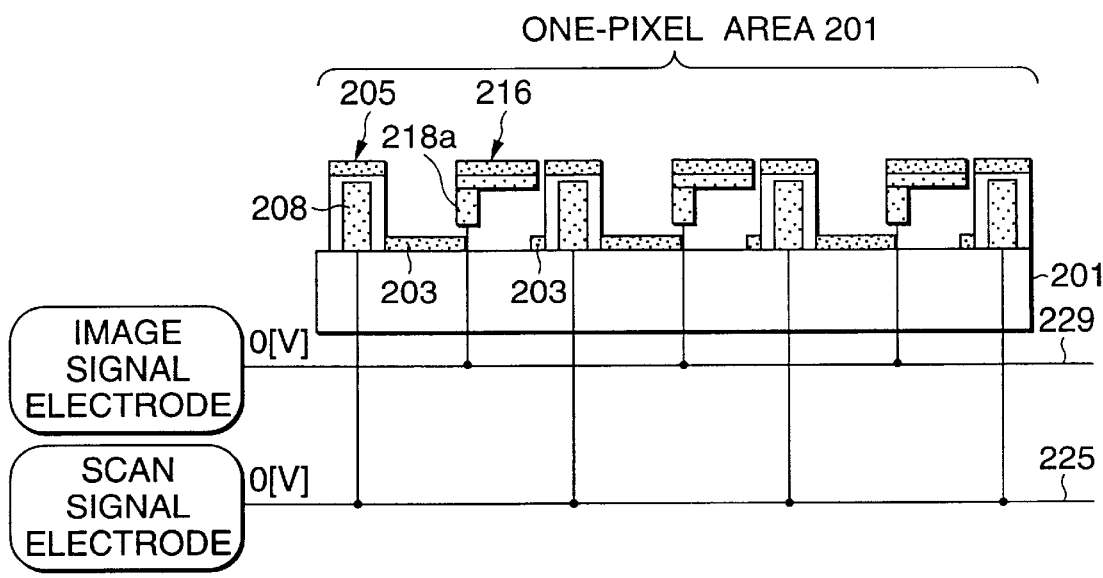
FIGS. 16A and 16B are sectional views of the main part to show a modified embodiment of the light modulation element of the second embodiment of the invention.
Figure 16B:
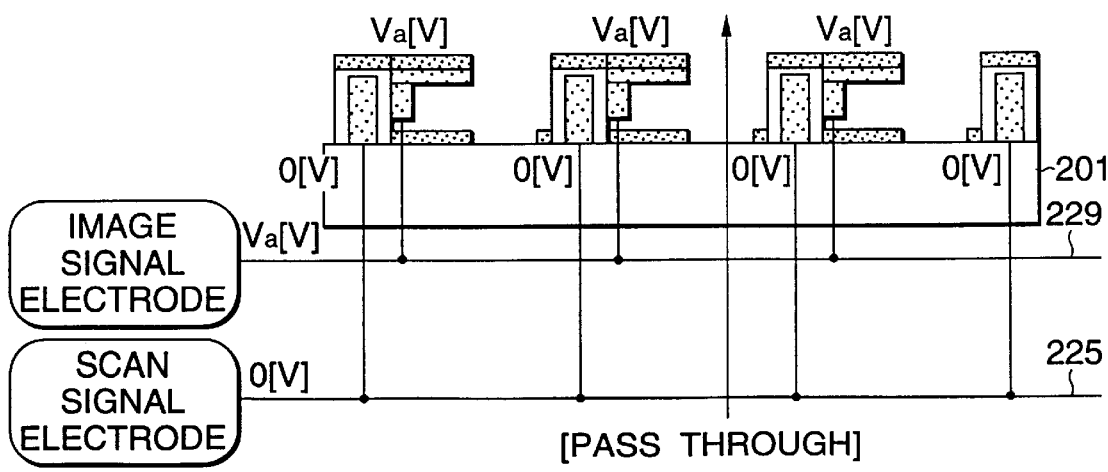

In the embodiment, the electric conductor positions of each grid wall 205 and each needle 216 are placed out of balance as shown in FIGS. 16A and 16B, whereby all voltages applied to the electric conductors 208 of the grid walls 205 can also be set to 0 [V] and all voltages applied to the electric conductors 218a of the needles 216 can also be set to Va. In this case, the wiring process becomes simple and the distance between the electric conductors of the grid wall 205 and the needle 216 becomes shorter, thus high-speed response, as the light modulation element 230 is driven at low voltage; is enabled.

Next, a seventh embodiment of the invention using the above-described light modulation elements to form a flat-panel display unit will be discussed.

Figure 17:
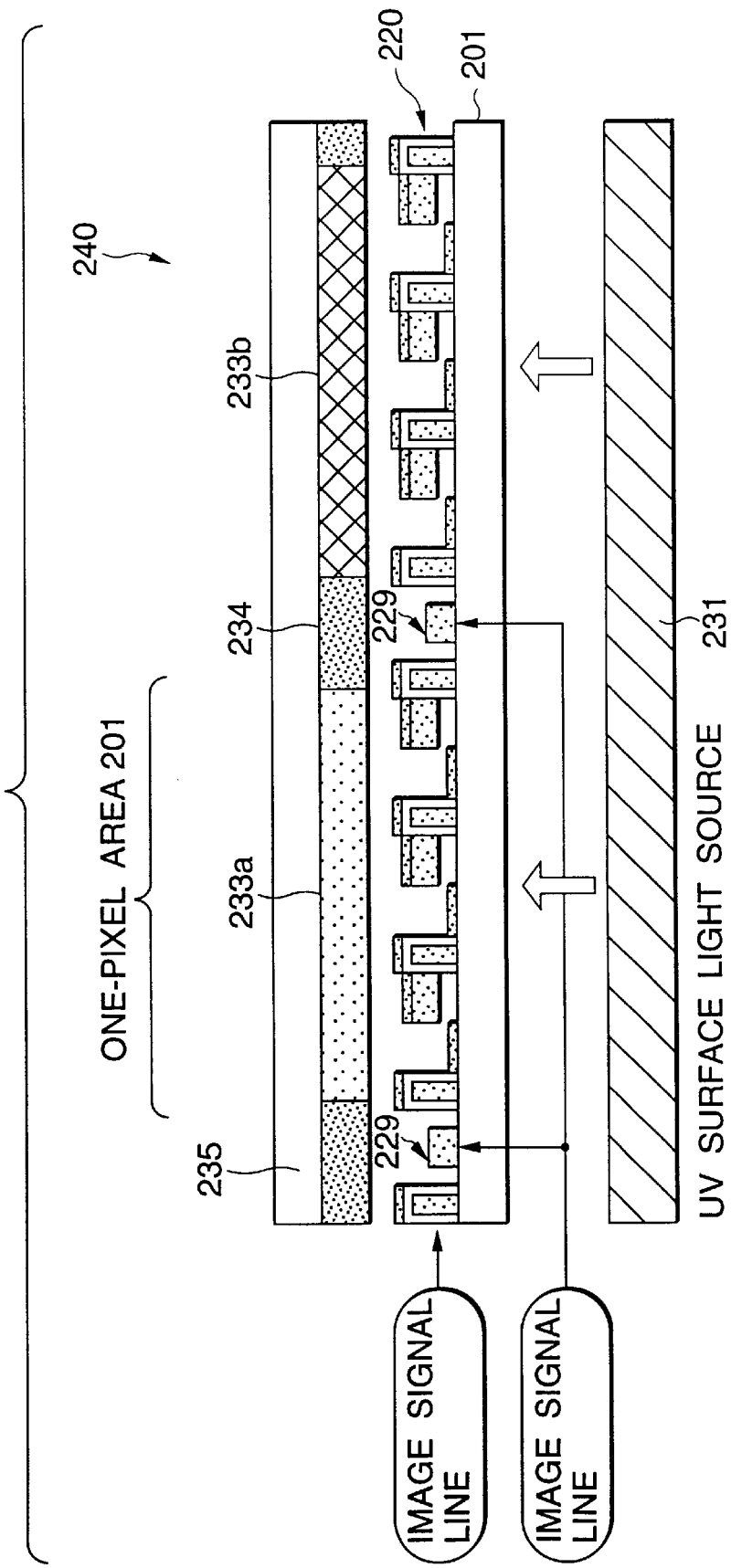
FIG. 17 is a sectional view of the main part to show the configuration of a flat-panel display unit.

FIG. 17 is a sectional view of a flat-panel display unit 240 according to the invention. The light modulation elements 220 of the first embodiment are used as light modulation elements of the second embodiment as an example.

In the flat-panel display unit 240 of the embodiment, an ultraviolet surface light source 231 as an ultraviolet output section is disposed on the lower faces of the transparent substrates 201 of the light modulation elements 220. A front panel 235 is placed above the light modulation elements 220 and phosphors 233a, 233b, . . . are placed on the face of the front panel 235 on the light modulation element 220 side in a one-to-one correspondence with the light modulation elements 220. A black matrix 234 is provided between the phosphors, enhancing the display image contrast.

According to the configuration of the flat-panel display unit 240, light from the ultraviolet surface light source 231 enters the transparent substrate 201 and in the light passing-through mode of the light modulation elements 220, the light is guided into the top face of the transparent 201 in FIG. 17. The light through the light modulation elements 220 is applied to the corresponding phosphors, which then are excited for emitting light for forming any desired image.

As the phosphors, phosphors of three primary colors (for example, R, G, and B) may be placed in order for making it possible to display a color image or only single-color phosphors may be used for displaying a monochrome image.

For the light modulation elements 220 of the flat-panel display unit 40, the space between the transparent substrate 201 and the front panel 235 is deaerated, then rare gas is poured for sealing the whole, thereby preventing the effect of disturbance for stabilization. The light modulation elements 230 in the sixth embodiment can also be applied to the flat-panel display unit 240 in a similar manner.

Next, the operation of the described flat-panel display unit 240 is as follows:

When the scan signal electrode 225 and the image signal electrode 229 are at the same potential, the needle 215 overlaps the light modulation area 213 thereabove and light from the surface light source 231 is blocked by the needle 215 and the shield-property conductive film 203 and does not pass through to the top face of the transparent substrate 201.

If a sufficient voltage is applied between the image signal electrode 229 and the scan signal electrode 225 at the scanning time, all needles 215 in one pixel area are moved toward the grid walls 205 in union by an electrostatic attraction force. Resultantly, the light is not shielded by the needles 215 and the light passing through the transparent substrate 201 is emitted through the light modulation area 213. The emitted light excites the phosphor 233a, 233b for displaying an image based on the image information.

If the light modulation elements undergo binary control, full-color display is enabled by a drive method wherein the field period for displaying one screen is divided into subfields and binary control is performed separately in the subfields for providing continuous tone. According to an active matrix method, light modulation of various continuous tones can be executed and full-color display is enabled.

Thus, according to the above-described flat-panel display unit 240, light emitted through the transparent substrate 201 is applied directly to the phosphor 233a, 233b for exciting the phosphor 233a, 233b, so that the light use efficiency can be enhanced. Since the phosphor emits scattered light, the viewing angle can be widened as compared with a liquid crystal display for allowing light to pass through based on the orientation of liquid crystal molecules. Further, since the light modulation elements are easily put into an array, the manufacturing costs can be reduced. A low elastic material, for example, macromolecule of polyimide, etc., is used as the material of the needles 215 or the shape is optimized, whereby the drive voltage can be sufficiently lowered as compared with a plasma display, etc.

Next, eighth embodiment of the invention to show another configuration of light modulation element will be discussed.

Figure 18:
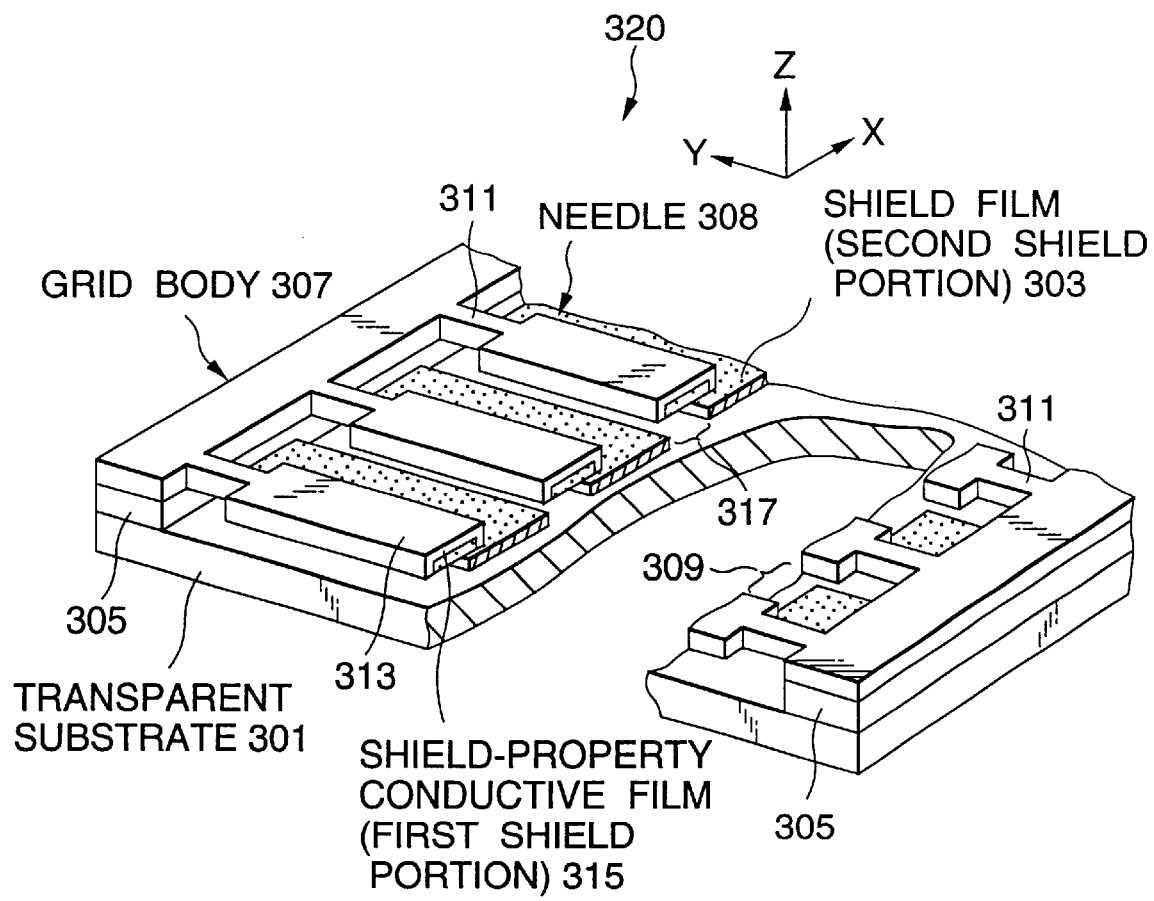
FIG. 18 is a partially cutaway view in perspective of a light modulation element according to the invention.

As shown in FIG. 18, a plurality of shield films 303 (second shield portions) are formed with a given spacing on a transparent substrate 301 having insulation and being transparent for light to be modulated. The shield films 303 shield light introduced from below the transparent substrate and blocks light emission to the top.

A pair of parallel belt-like spacers 305 is formed on the transparent substrate 301 and a flexible thin-film grid body 307 is formed on the tops of the spacers 305. The grid body 307 is formed with a plurality of belt-like needles 308 placed between adjacent shield films 303 above the transparent substrate 301 and supports the needles 308 at both ends in the length direction of the needles 308, thereby forming slits 309. Thus, the transparent substrate 301 and the needles 308 are placed facing each other spaced from each other with a gap as thick as the thickness of the spacer 305.

Each needle 308 has a narrow part 311 lessening in sectional area at both ends of the needle 308 in the length direction thereof. The narrow parts 311 become weak parts and become deformed, whereby the needle 308 can be moved in a roughly parallel direction with the transparent substrate 301.

The needle 308 is rectangular in cross section in the X direction and an insulating film 313 is formed at least on the face of the needle 308 on the side of the adjacent needle 308 for preventing a short caused by contact therebetween. Likewise, an insulating film 313 is also formed on the opposite face on the transparent substrate 301 side.

The cross section of the needle 308 is formed almost by a conductive film having a shield property (first shield portion) 315; the configuration is not limited to the shield-property conductive film 315 and a shield film and a conductive film may be formed separately. For example, the shield-property conductive film 315 can use metal, a metal compound, a high-impurity-doped semiconductor, conductive macromolecule, etc. The needle 308 may be formed of a shield-property insulator and be surrounded by a conductive film.

The shield film 303 is formed as wide as or wider than the slit 309. A light modulation area 317 in which the shield film 303 is not formed is formed between the adjacent shield films 303. Therefore, the light introduced from below the transparent substrate 301 in FIG. 18 is blocked by the shield film 303 at the position corresponding to the slit 309 and is blocked by the shield-property conductive film 315 of the needle 308 at the position corresponding to the light modulation area 317; after all, the light is not allowed to pass through to the top of the light modulation element 320.

Figure 19:
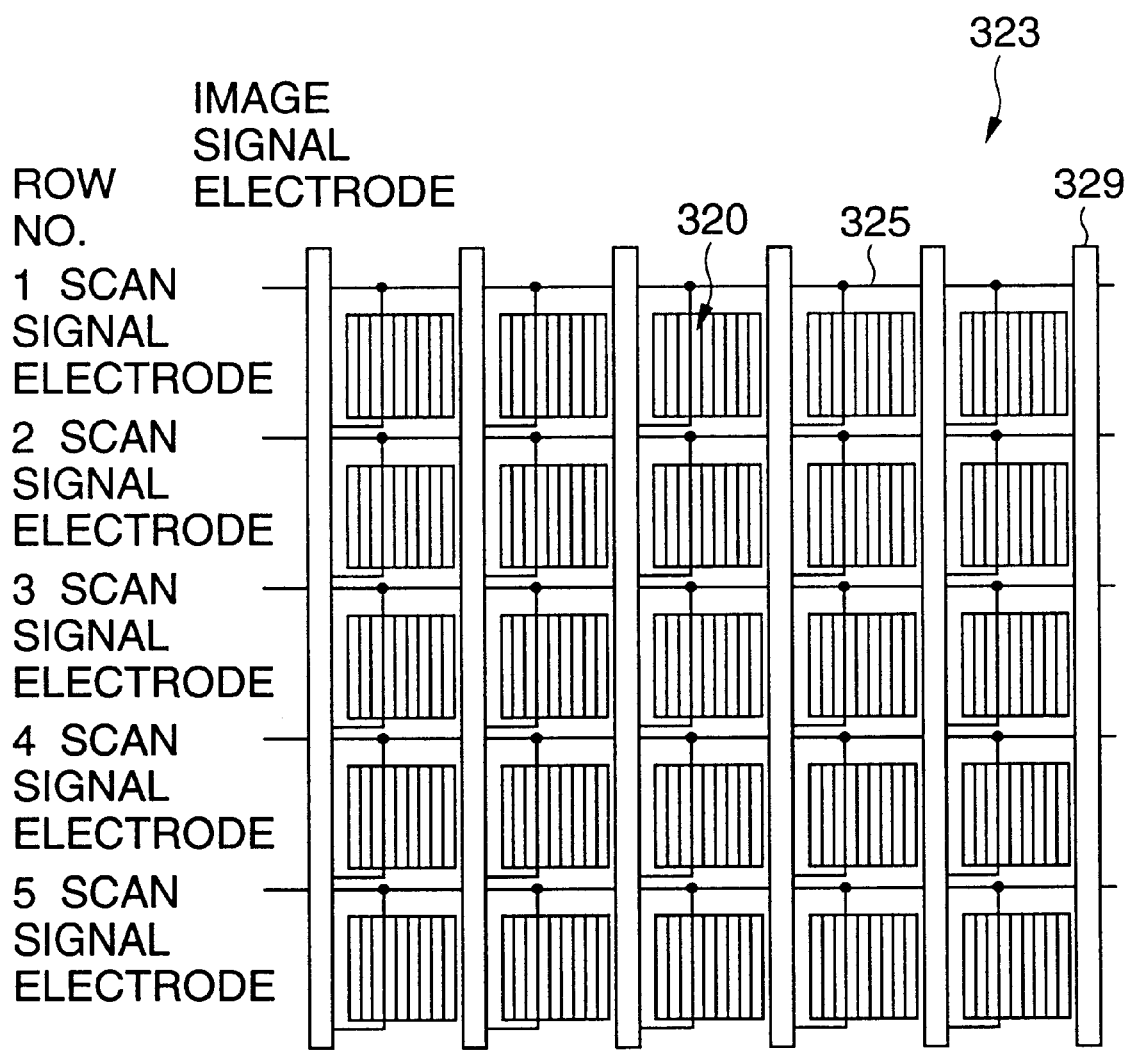
FIG. 19 is a plan view of an array-type light modulation element comprising the light modulation elements in FIG. 18 arranged as a simple matrix.

The described light modulation elements 320 can form an array-type light modulation element 323 of a simple matrix structure shown as an example in FIG. 19. The array-type light modulation element 323 comprises a plurality of scan signal electrodes 325 arranged in parallel and a plurality of image signal electrodes 329 arranged in parallel, orthogonal to the scan signal electrodes 325. Of course, the array-type light modulation element 323 is not limited to the example, and may be an array-type light modulation element comprising light modulation elements arranged in one dimension.

A controller (not shown) for controlling the scan signal electrodes 325, the image signal electrodes 329, and signals output to the electrodes 325 and 329 corresponds to needle move means.

Figure 20:
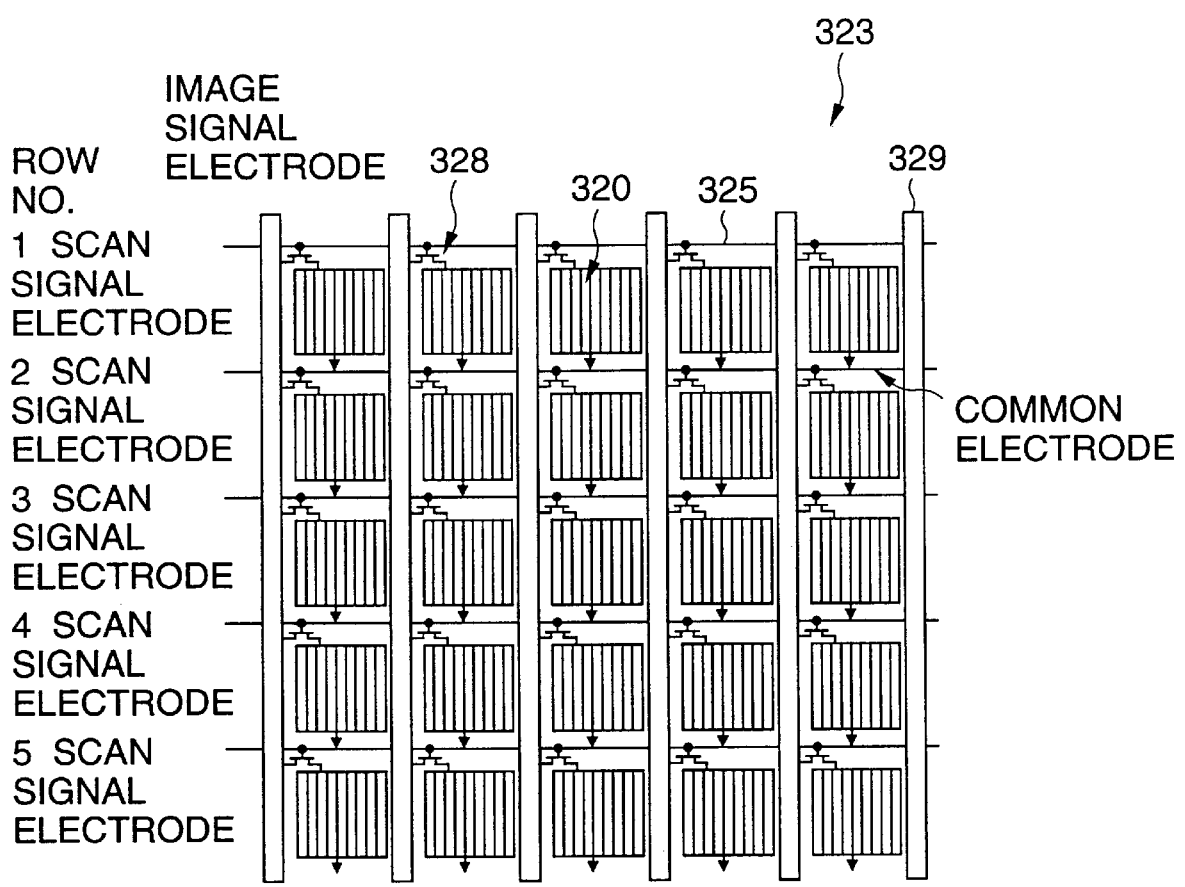
FIG. 20 is a plan view of an array-type light modulation element comprising the light modulation elements in FIG. 18 arranged as an active matrix.

Here, FIG. 19 shows a simple matrix, but an active matrix comprising semiconductor switches 328 such as TFTs provided in a one-to-one correspondence with pixels as shown in FIG. 20 may be adopted or although not shown, an active matrix comprising electromechanical switches operated by the electrostatic operation of flexible thin film having contacts, provided in a one-to-one correspondence with pixels may be adopted.

Here, a pixel section in the simple matrix will be discussed.

Figure 21A:
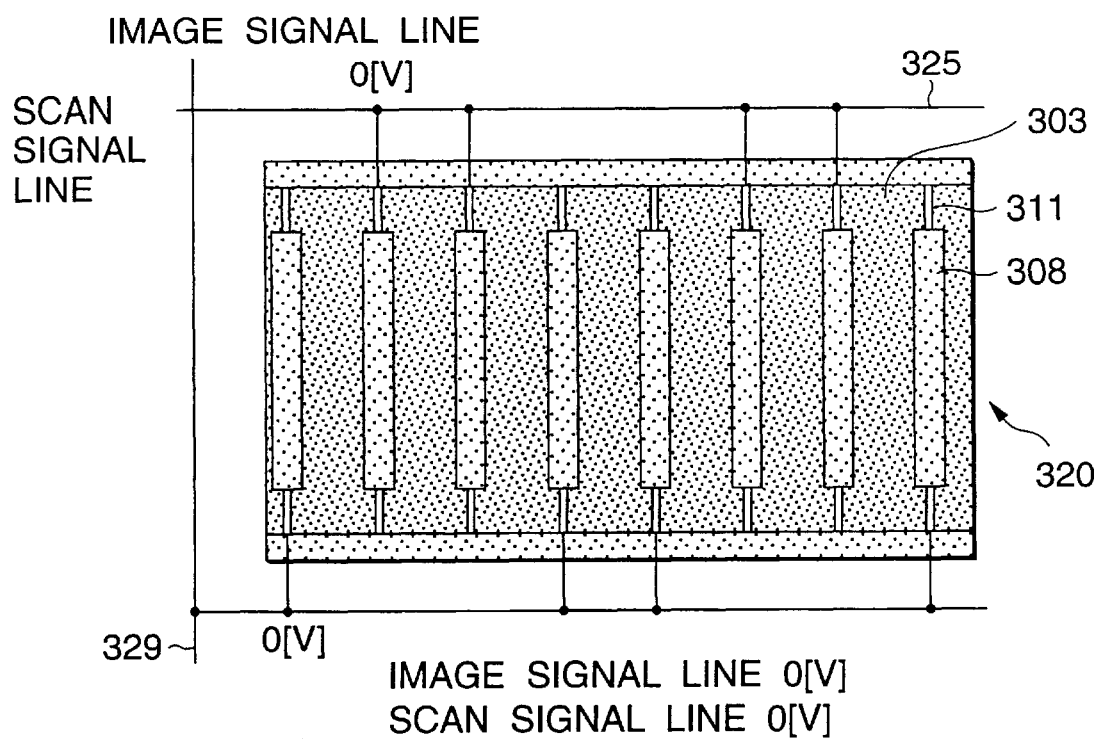
FIGS. 21A and 21B are connection diagrams each to show the connection state of scan signal and image signal lines of the light modulation element.
Figure 21B:
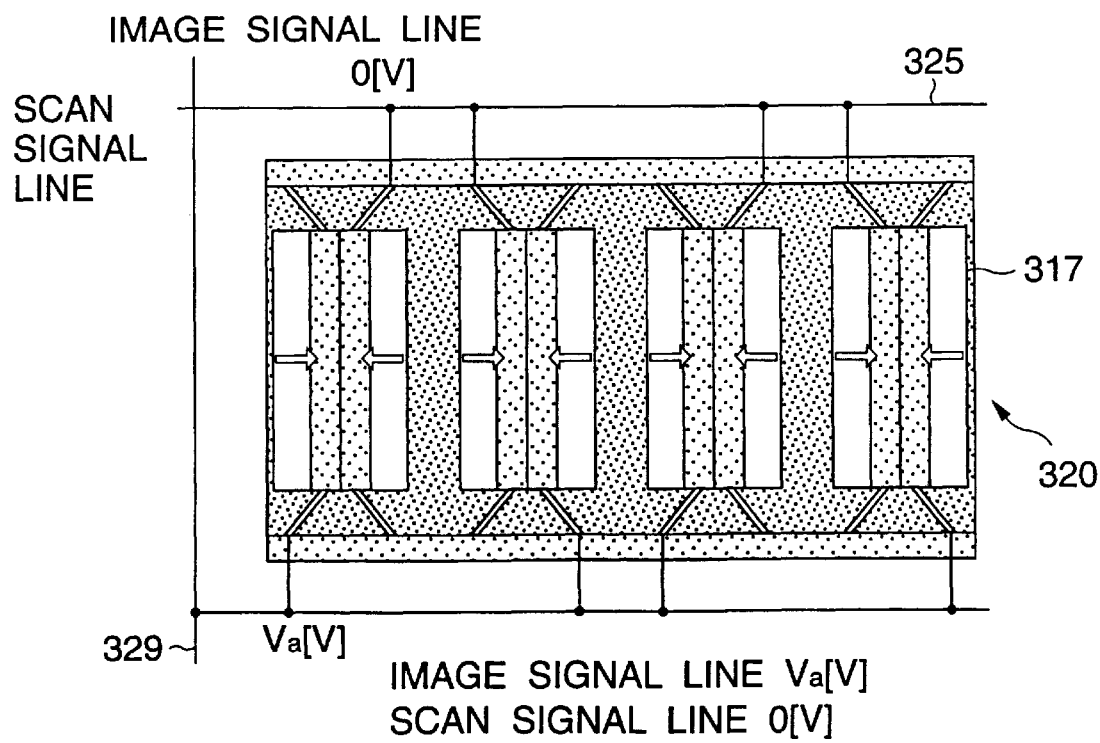

The light modulation elements 320 are placed at the intersections of the scan signal electrodes 325 and the image signal electrodes 329. FIGS. 21A and 21B show wiring for each light modulation elements 320 in the array-type light modulation element 323. According to FIGS. 21A and 21B, the electrodes 325 and 329 and the needles 308 are connected so as to form each pair of a needle connected to the scan signal line and a needle connected to the image signal line; each pair forms one light modulation portion.

According to the element configuration and electrode connection, when the voltages of the scan signal electrode 325 and the image signal electrode 329 are 0 [V], the needle 308 enters the neutral state (shield state) as shown in FIG. 21A; when the voltage of either electrode is drive voltage Va [V], the needle 308 is moved by an electrostatic force and enters a light passing-through state as shown in FIG. 21B.

Next, a specific drive method of the light modulation element 320 and the array-type light modulation element 323 described will be discussed.

Figure 22A:
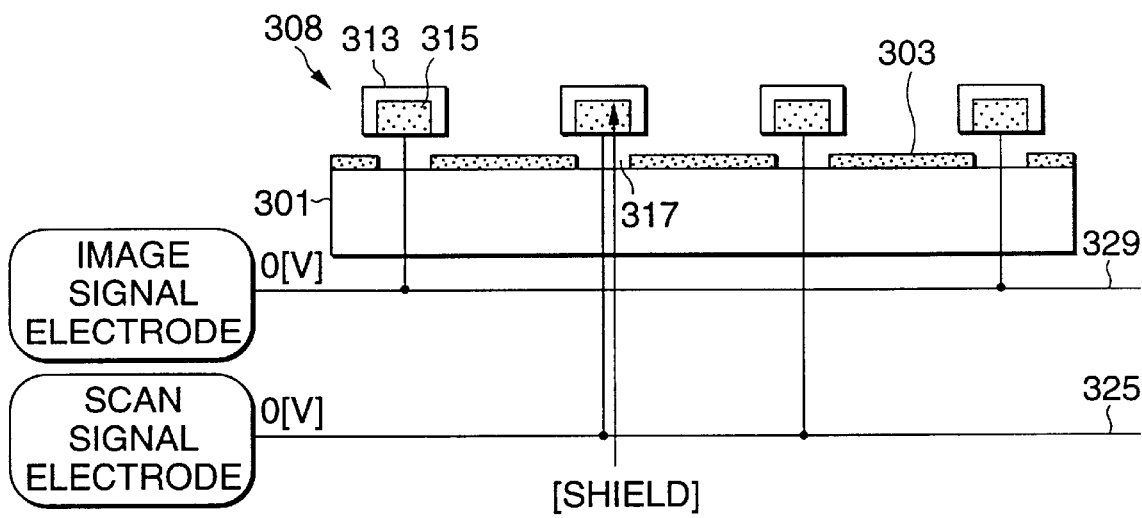
FIGS. 22A and 22B are sectional views of the main part to describe each operation state of light modulation element.

As shown in FIG. 22A, when the scan signal electrode 325 and the image signal electrode 329 are at the same potential (0 [V]), the needle 308 overlaps the top of the light modulation area 317 and blocks emission of light passing through the light modulation area 317 to the top of the light modulation element 320.

Figure 22B:
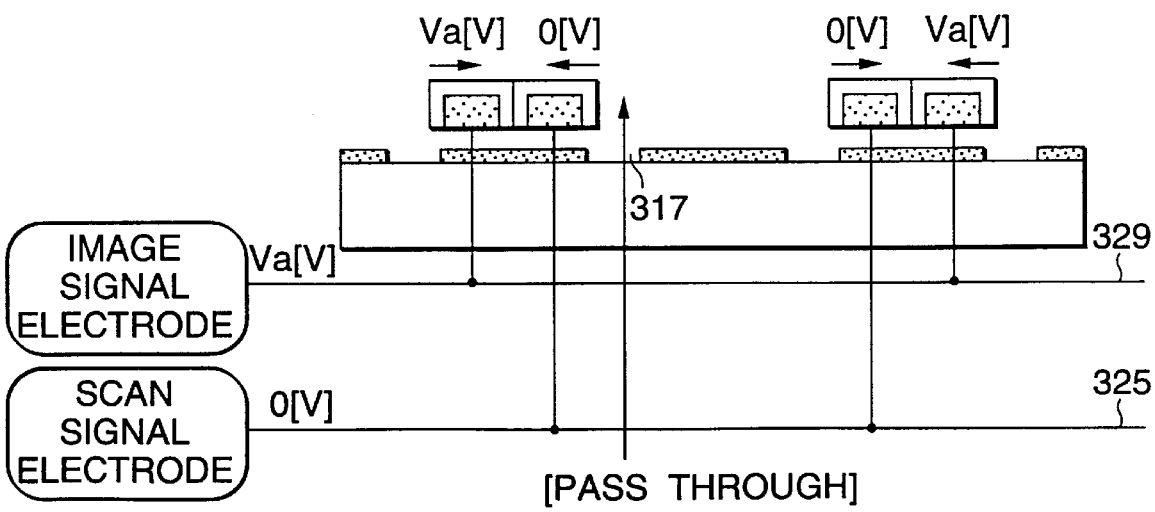

On the other hand, if an image signal voltage Va is applied to the image signal electrode 329 and a voltage of 0 [V] is applied to the scan signal electrode 325 at the scanning time as shown in FIG. 22B, the needles 308 connected to different electrodes are mutually attracted by an electrostatic attraction force and are moved in parallel with the transparent substrate 301 as indicated by the arrows in the figure.

Resultantly, the needle 308 does not shield light in the light modulation area 317 and the light passing through the transparent substrate 301 is emitted through light modulation area 317, namely, binary light modulation is enabled.

According to the basic principle, two-dimensional light modulation array can be driven in the simple matrix structure shown in FIG. 19. In the example, the fact that the relationship between the voltages of the scan signal electrode 325 and the image signal electrode 329 and displacement of the needle 308 based on the voltages has a hysteresis characteristic is used and appropriate voltages are applied to the electrodes 325 and 329 in response to the characteristic.

In the first embodiment, if the neutral position where the needles are not displaced is set to the shield position shown in FIG. 21A and binary control is performed between the shield position shown in FIG. 21A and the light passing-through position shown in FIG. 21B, the shield areas of the transparent substrate 301 and the needles 308 can be formed at a time by self-alignment.

Next, the light modulation element formation method by the self-alignment will be discussed specifically.

The light modulation element in FIG. 18 can be formed by various thin-film processes or thick-film processes such as patterning based mainly on photolithography, etching, selective plating, printing, and transfer. According to the formation processes, the light modulation portions can be arranged at high density. Then, as an example of the light modulation element formation method, a method using photolithograhy and etching will be discussed with reference to FIGS. 23A to 23F.

Figure 23A:
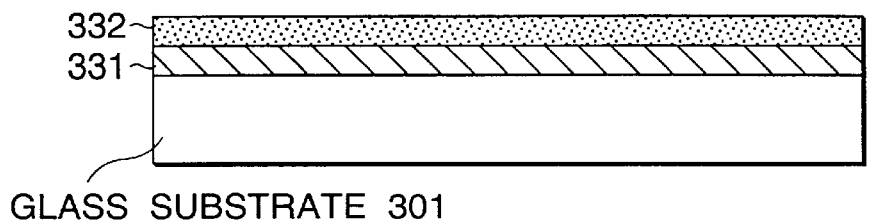
FIGS. 23A to 23F are sectional views of the main part to describe an example of a process to formation of the light modulation element.

First, as shown in FIG. 23A, a resist film as a sacrificial layer 331 is formed by application on a transparent substrate 301, a substrate transparent for modulated light, such as glass. In addition to the resist, metal such as aluminum can also be used depending on the material of the needles.

Next, a shield-property conductive film 332 is formed on the top of the sacrificial layer 331. As a preferred example of the shield-property conductive film 332, an evaporation film comprising evaporated metal, such as aluminum or chromium, a film formed of conductive macromolecule, or the like is named.

Although not shown, the resist is developed and removed only in the parts of the supports of needles 308 by patterning the sacrificial layer 331.

Figure 23B:
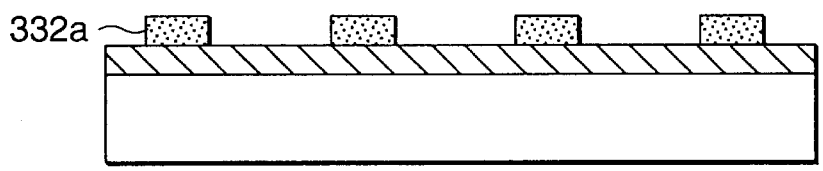

As shown in FIG. 23B, the shield-property conductive film 332 is patterned by photolithography and etching, thereby forming shield-property electric conductors 332a like a belt. The shapes of the needles are determined by the patterning.

Figure 23C:
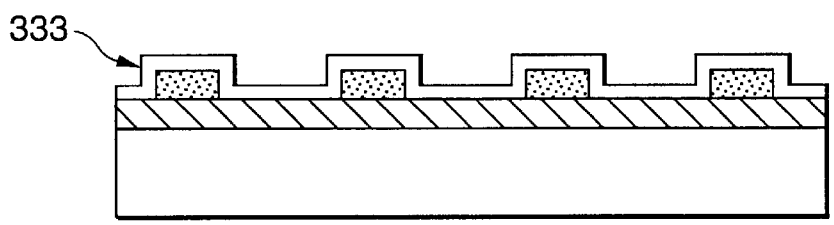

Further, as shown in FIG. 23C, an insulation film 333 is formed on the patterned shield-property electric conductors 332a. As the insulation film 333, silicon oxide, nitride oxide, polyimide, acrylic resin, epoxy resin, etc., is named as a preferred example.

Figure 23D:
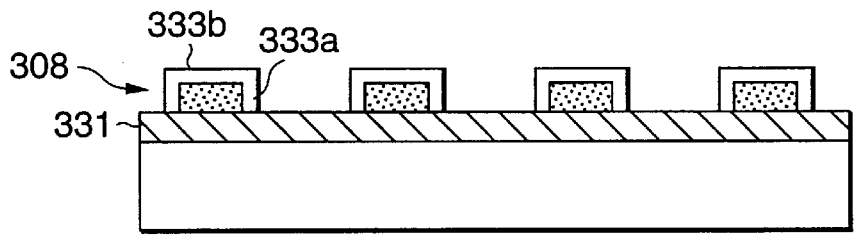

After this, photoresist is patterned and the insulation film is etched so as to leave an insulation film 333a on the side of each shield-property electric conductors 332a forming a part of a needle, whereby the needles 308 each formed on the side 333a and an upper face 333b with an insulation film are provided on the sacrificial layer 331, as shown in FIG. 23D.

The insulation film 333 is formed of photosensitive resin, such as photosensitive polyimide, whereby the above-mentioned photoresist can be omitted. For the etching, an appropriate method is used depending on the material; anisotropic dry etching of RIE, etc., is particularly preferred for improving dimension accuracy.

Figure 23E:
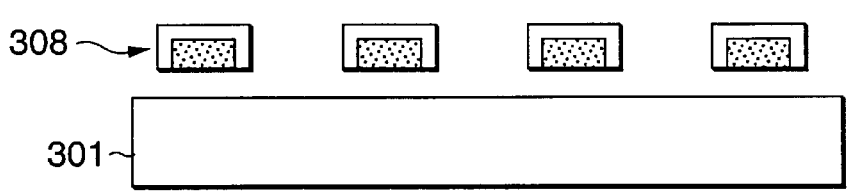

The sacrificial layer 331 is removed as shown in FIG. 23E. As a removing method, any of various etching methods is selected preferably depending on the material of the sacrificial layer 331 and the materials forming the needle 8. For example, the sacrificial layer 331 is removed by wet etching with a solvent of acetone, etc., an alkalifamily solvent, an acid, an alkali water solution, etc., or ashing with plasma.

Figure 23F:
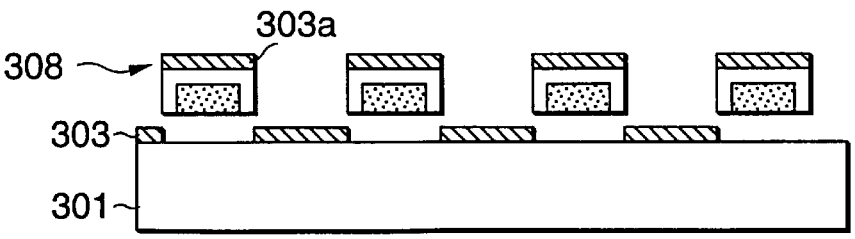

Last, shield films 303 as second shield portions are formed by evaporating, etc., for example, metal such as aluminum or chromium or an insulating black pigment, etc., almost on the whole of the transparent substrate 1, as shown in FIG. 23F. Thus, each shield film 303 is formed on the transparent substrate 301 between the adjacent needles 308, the shield-property conductive film 315 is formed on each needle 308, the gap between the needle 308 and the shield film 303 at the neutral position is almost eliminated, and the shield film allowing very little leakage light can be formed, so that highly accurate exposure alignment becomes unnecessary.

In the composition shown in FIG. 23F, the shield-property conductive film 332 may be formed of a simple conductive film.

The above-described process is strictly an example and any other method may be adopted. The configuration of the light modulation element is not limited to the above-described configuration; any configuration may be adopted if it is a configuration wherein an electrostatic force is generated between the needles having a shield property and electric conductivity and the light transmission factor of the light modulation element changes as the needles move.

As described above, the light modulation element of the embodiment comprises the belt-like needles 308 placed roughly in parallel, so that the area contributing to electrostatic induction can be provided largely; resultantly, the electromechanical operation of the needles 308 can be performed by a sufficient electrostatic attraction force and the high-speed and stable operation is enabled.

Since the needles 308 move in parallel only at a distance until the adjacent needles 308 come in contact with each other for executing light modulation, the displacement amount of each needle 308 lessens and therefore the response can be furthermore speeded up.

Further, partition formation for generating plasma for each pixel as with plasma display and producing ultrahigh vacuum as with the FED become unnecessary, thus reduction in weight and providing a large area are facilitated because of a simple structure and the manufacturing costs can be reduced.

Figure 24A:
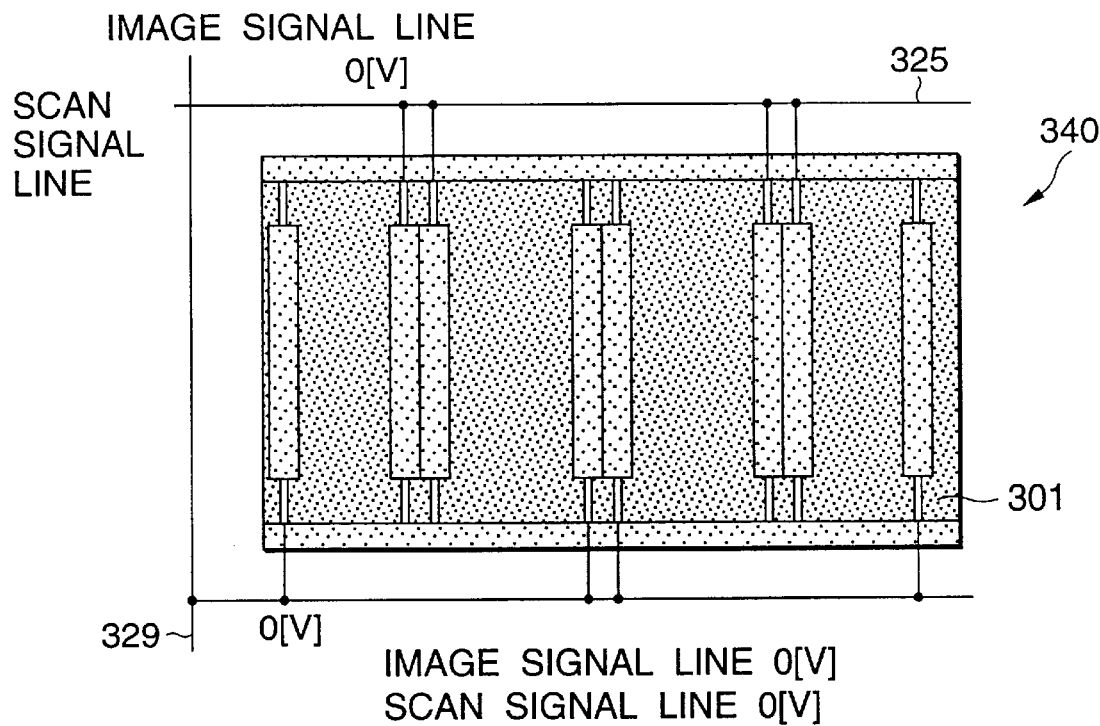
FIGS. 24A and 24B are plan views to show the configuration of a light modulation element of a second embodiment of the invention and the connection state of scan signal and image signal lines of the light modulation element.
Figure 24B:
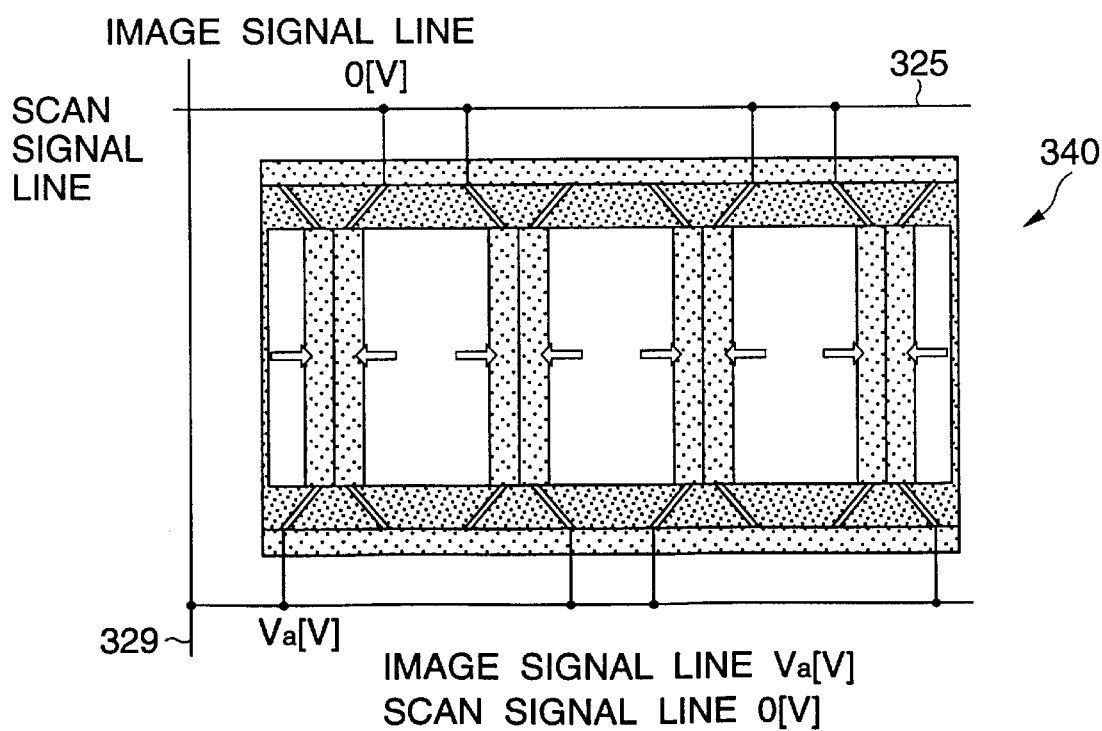

Next, a ninth embodiment of the invention to show another configuration of light modulation element will be discussed. FIGS. 24A and 24B show the configuration of a light modulation element 340 of the embodiment and a wiring state to each electrode.

As shown in FIG. 24A, in the light modulation element 340, as in the first embodiment, electrodes 325 and 329 and needles 308 are connected so as to form each pair of a needle connected to a scan signal line and a needle connected to an image signal line; each pair forms one light modulation portion.

In the light modulation element 340 in the embodiment, the placement spacing between the adjacent needles connected to the same line (electrode) is narrowed, namely, the adjacent needles and the light modulation areas corresponding to the needles are placed close to each other, whereby the numerical aperture at the light modulation time shown in FIG. 24B is more increased. Thus, the light transmission amount of the light modulation element 340 per unit area can be increased and the space efficiency of the light modulation element can be enhanced.

Figure 25A:
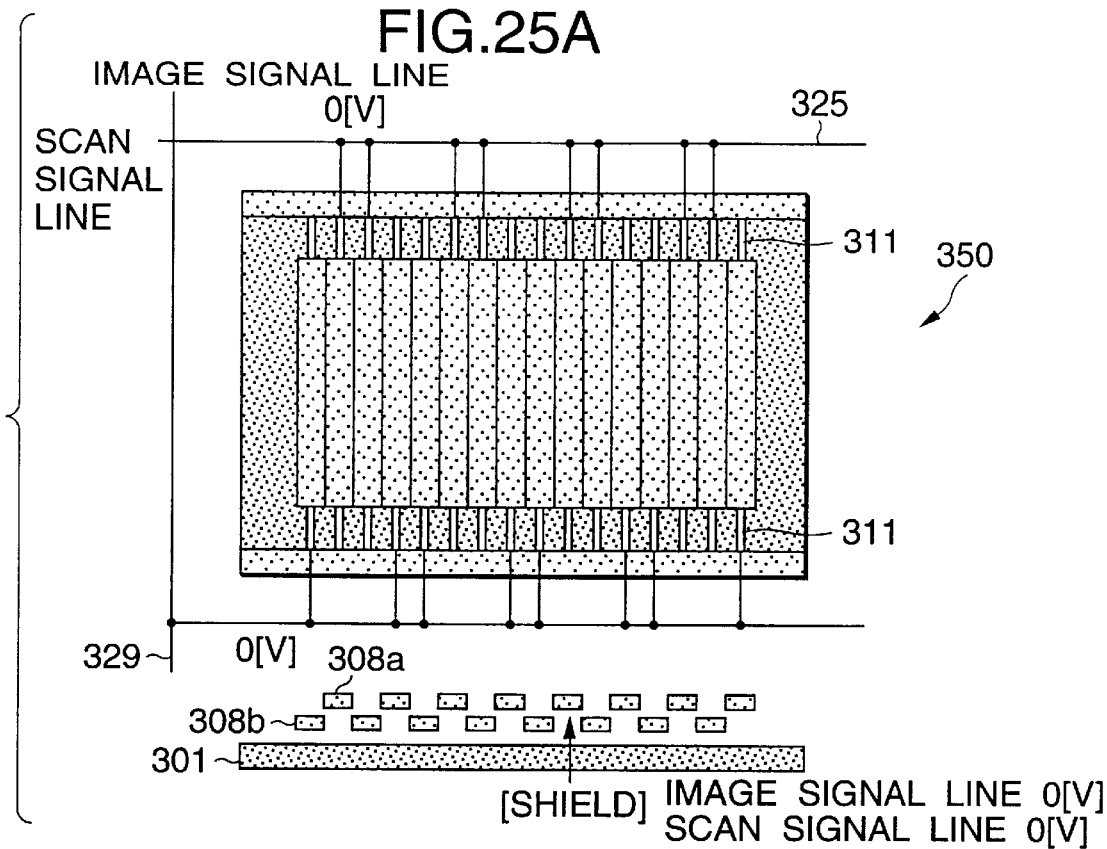
FIGS. 25A and 25B are plan views to show the configuration of a light modulation element of a third embodiment of the invention and the connection state of scan signal and image signal lines of the light modulation element.
Figure 25B:
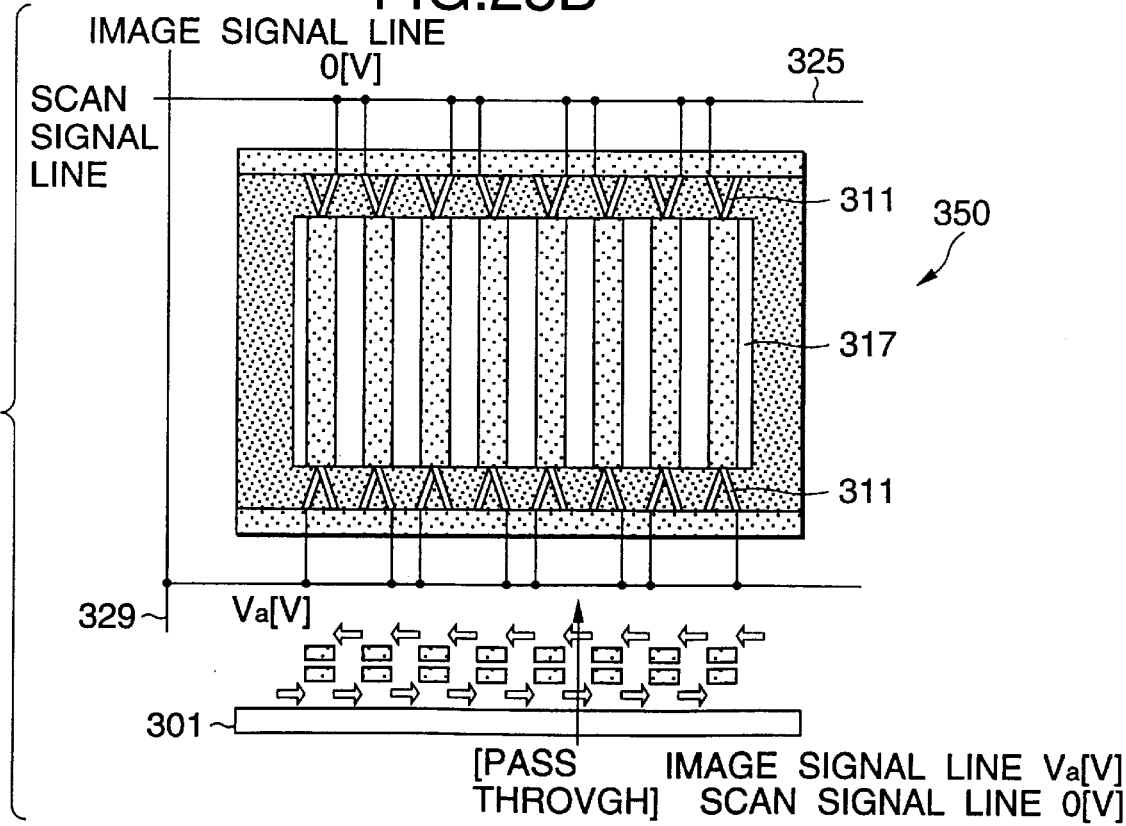
Figure 26A:
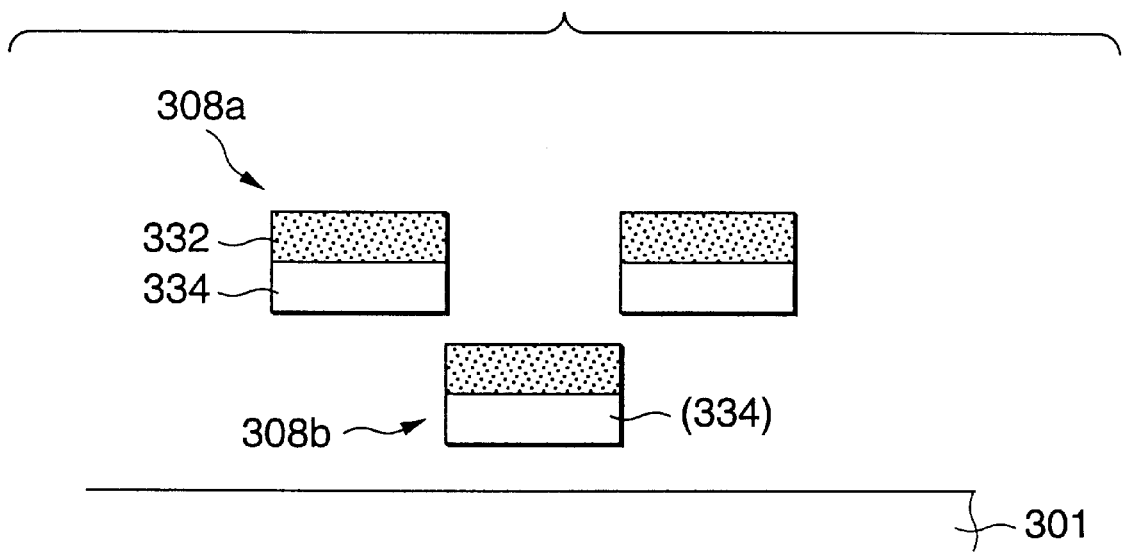
FIGS. 26A and 26B are sectional views of the main part of the light modulation element of the third embodiment of the invention.
Figure 26B:
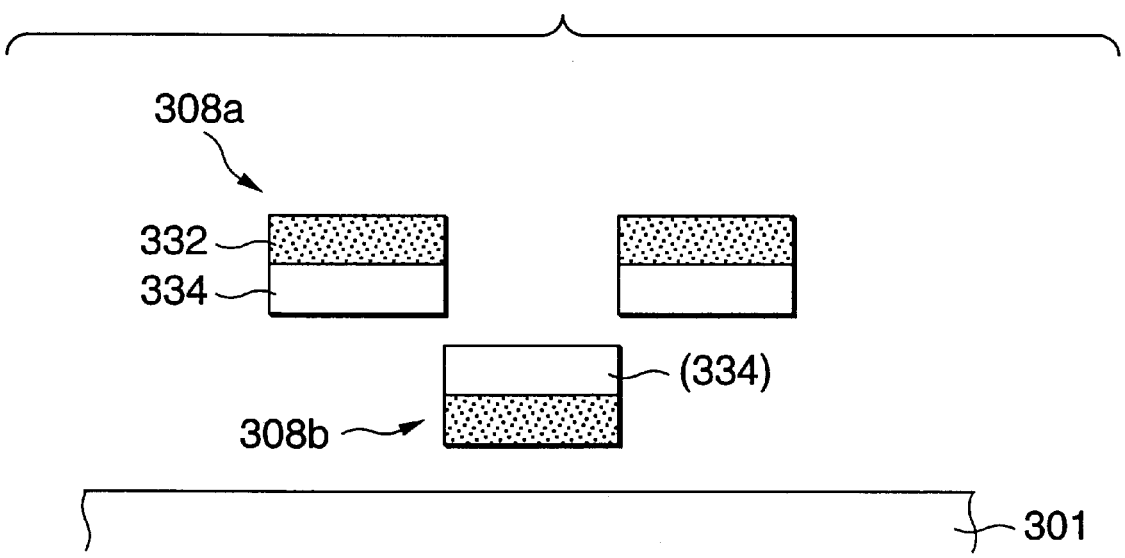

Next, a tenth embodiment of the invention to show another configuration of light modulation element will be discussed. FIGS. 25A and 25B show the configuration of a light modulation element 350 of the embodiment and a wiring state to each electrode. FIGS. 26A and 26B are enlarged sectional views of needles.

As shown in FIG. 25A, the light modulation element 350 comprises two stages of upper needles 308a and lower needles 8b, and electrodes 325 and 329 and the needles 308a and 308b are connected so as to form each pair of a needle connected to a scan signal line and a needle connected to an image signal line and that either of the lower-stage needles 308b adjacent to one upper-stage needle 308a is connected to the same electrode as the upper-stage needle 8a; each pair forms one light modulation portion.

In the light modulation element 350, if 0 [V] is applied to the scan signal electrode and Va [V] is applied to the image signal electrode at the light modulation time shown in FIG. 25B, an electrostatic force acts on each pair of the needles and the needles are attracted to each other. Then, as shown in the figure, the needles 308a and 308b move in the horizontal direction to a transparent substrate 301 and overlap each other, and light is emitted through a light modulation area 317 opened as the needles overlap.

In this case, narrow parts 311 are formed so as to displace in the horizontal direction more easily than in the vertical direction by adjusting geometrical moment of inertia such as formation of the cross section like a rectangle with the vertical direction as the length direction, using an anisotropic elastic substance, or the like.

As the structure of the needle 308a, 308b, as shown in FIG. 26A, an insulating layer 334 may be formed at least on the face of a conductive film 332 of the needle 308a on the transparent substrate 301 side, or as shown in FIG. 26B, an insulating layer 334 may be formed at least on the face of either of the sides where the upper-stage needle 308a and the lower-stage needle 308b face each other. If the upper-stage needle 308a and the lower-stage needle 308b do not come in contact with each other, the insulating layer 334 may not be provided.

According to the light modulation element 350, the numerical aperture at the light modulation time is increased, thus the light transmission amount per unit area can be increased, the space efficiency of the light modulation element can be enhanced, the area contributing to electrostatic attraction grows, and the stabler light modulation operation is enabled.

Next, a eleventh embodiment of the invention using the above-described light modulation elements to form a flat-panel display unit will be discussed.

FIG. 27 is a sectional view of a flat-panel display unit 360 according to the invention. The light modulation elements 320 of the first embodiment are used as light modulation elements of the eighth embodiment as an example.

In the flat-panel display unit 360 of the embodiment, an ultraviolet surface light source 361 as an ultraviolet output section is disposed on the lower faces of the transparent substrates 301 of the light modulation elements 320. A front panel 362 is placed above the light modulation elements 320 and phosphors 363a, 363b, . . . are placed on the face of the front panel 362 on the light modulation element 320 side in a one-to-one correspondence with the light modulation elements 320. A black matrix 365 is provided between the phosphors, enhancing the display image contrast.

According to the configuration of the flat-panel display unit 360, light from the ultraviolet surface light source 361 enters the transparent substrate 301 and in the light passing-through mode of the light modulation elements 320, the light is guided into the top face of the transparent 301 in FIG. 27. The light through the light modulation elements 320 is applied to the corresponding phosphors 363a and 363b, which then are excited for emitting light for forming any desired image.

As the phosphors, phosphors of three primary colors (for example, R, G, and B) may be placed in order for making it possible to display a color image or only single-color phosphors may be used for displaying a monochrome image.

For the light modulation elements 320 of the flat-panel display unit 60, the space between the transparent substrate 301 and the front panel 362 is deaerated, then rare gas is poured for sealing the whole, thereby preventing the effect of disturbance for stabilization. The light modulation elements 340 or 350 in the second or third embodiment can also be applied to the flat-panel display unit 360 in a similar manner.

Next, the operation of the described flat-panel display unit 360 is as follows:

When the scan signal electrode 325 and the image signal electrode 329 are at the same potential, the needle 308 overlaps the light modulation area 317 thereabove and light from the surface light source 361 is blocked by the needle 308 and the shield conductive film 303 and does not pass through to the top face of the transparent substrate 301.

If a sufficient voltage is applied between the image signal electrode 329 and the scan signal electrode 325 at the scanning time, all needles 308 in one pixel area are moved in union in the direction in which they attract each other by an electrostatic attraction force. Resultantly, the light is not shielded by the needles 308 and the light passing through the transparent substrate 301 is emitted through the light modulation area 313. The emitted light excites the phosphor 363a, 363b for displaying an image based on the image information.

If the light modulation elements undergo binary control, full-color display is enabled by a drive method wherein the field period for displaying one screen is divided into subfields and binary control is performed separately in the subfields for providing continuous tone. According to an active matrix method, light modulation of various continuous tones can be executed and full-color display is enabled.

Thus, according to the above-described flat-panel display unit 360, light emitted through the transparent substrate 301 is applied directly to the phosphor 363a, 363b for exciting the phosphor 363a, 363b, so that the light use efficiency can be enhanced. Since the phosphor emits scattered light, the viewing angle can be widened as compared with a liquid crystal display for allowing light to pass through based on the orientation of liquid crystal molecules. Further, since the light modulation elements are easily put into an array, the manufacturing costs can be reduced. A low elastic material, for example, macromolecule of polyimide, etc., is used as the material of the needles 308 or the shape is optimized, whereby the drive voltage can be sufficiently lowered as compared with a plasma display, etc.

Next, a twelfth embodiment of the invention using the above-described light modulation elements to form a flat-panel display unit will be discussed.

Figure 28:
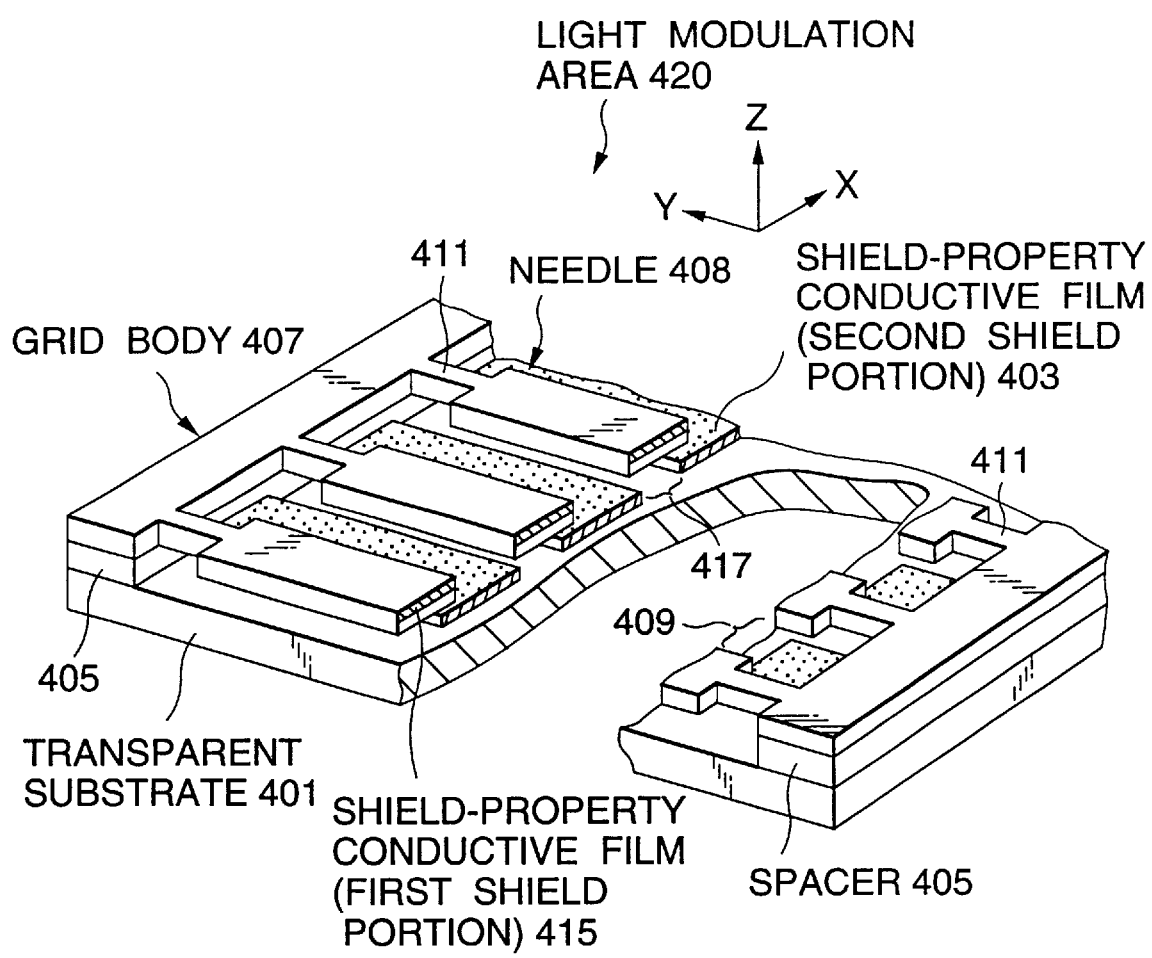
FIG. 28 is a partially cutaway view in perspective of a light modulation element according to the invention.
Figure 29:
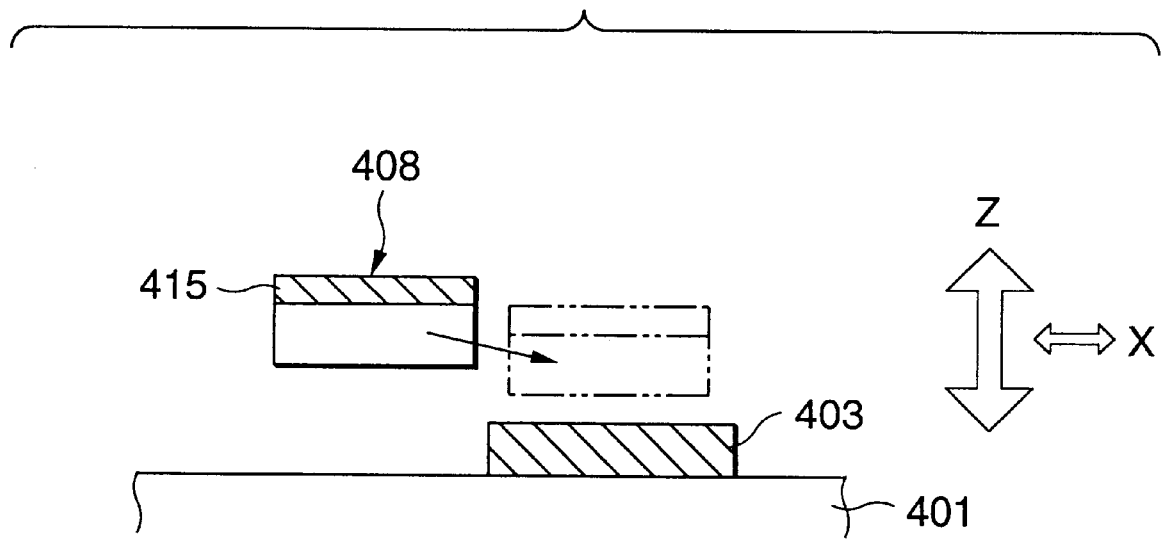
FIG. 29 is a sectional view in X direction in FIG. 28 to show the move direction of a needle.

FIG. 28 is a partially cutaway view in perspective of a light modulation element according to the invention. FIG. 29 is a sectional view of the main part to show the basic operation of the light modulation element shown in FIG. 28.

As shown in FIG. 34, a plurality of shield films 403 (second shield portions) are formed with a given spacing on a transparent substrate 401 having insulation and being transparent for light to be modulated. The shield films 403 shield light introduced from below the transparent substrate and blocks light emission to the top.

A pair of parallel belt-like spacers 405 is formed on the transparent substrate 401 and a flexible thin-film grid body 407 is formed on the tops of the spacers 405. The grid body 407 is formed with a plurality of belt-like needles 408 placed between adjacent shield films 403 above the transparent substrate 401 and both ends of the needles 408 in the length direction thereof are supported on the frame of the grid body 407, thereby forming slits 409. Thus, the transparent substrate 401 and the needles 408 are placed facing each other spaced from each other with a gap as thick as the thickness of the spacer 405.

Each needle 408 is formed with a narrow part 411 lessening in sectional area in the part which becomes the joint part to the transparent substrate 401 at both ends of the needle 408 in the length direction thereof. The narrow parts 411 become weak parts and become deformed, whereby the needle 408 can be moved in a roughly parallel direction with the transparent substrate 401.

The narrow part 411 is formed so as to have a smaller elastic constant only in a given deformation direction than that in another direction. In the example, as shown in FIG. 29, rigidity is large in a direction perpendicular to the transparent substrate 401 (Z direction) and is small in a direction parallel to the transparent substrate 401 (X direction). Therefore, if a force in the direction in which the needle 408 is attracted to the transparent substrate 401 side acts on the needle 408, the narrow part 411 is mainly displaced in the X direction and the needle 408 moves roughly in parallel with the transparent substrate 401 and moves to the position indicated by the phantom line in FIG. 29.

The narrow part 411 can be provided with such elastic anisotropy easily based on the cross-sectional shape of the narrow part 411, for example. That is, the dimension of the narrow part 411 in the Z direction is made large and the dimension in the X direction is made small, whereby the narrow part 411 having the elastic anisotropy with large rigidity in the Z direction and small rigidity in the X direction can be formed.

The narrow part 411 can be provided with elastic anisotropy based on the deposition structure of the narrow part 411. That is, a low elastic film and a rigid film are deposited alternately, whereby the narrow part 411 with rigidity lessened in the deposition direction and rigidity enlarged in a direction orthogonal to the deposition direction can be formed.

Further, the narrow part 411 may be provided with elastic anisotropy by structural means. That is, the narrow part 411 is made up of a slider (not shown) and a slope part coming in contact with the slider by low friction. Thus, the slider is moved along the slope part, whereby the narrow part 411 having anisotropy in the deformation direction can be provided.

In addition to the above-described means, the narrow part 411 may be provided with elastic anisotropy using an anisotropic elastic material having anisotropy in an elastic constant.

The needle 408 is rectangular in cross section in the X direction and is formed by placing a shield-property conductive film having a shield property and electric conductivity (first shield portion) 415; the configuration is not limited to the shield-property conductive film 415 and a shield film and a conductive film may be formed separately. For example, the shield-property conductive film 415 can use metal, a metal compound, a high-impurity-doped semiconductor, conductive macromolecule, etc. The needle 408 may be formed of a shield-property insulator and be surrounded by a conductive film.

The shield film 403 is formed as wide as or wider than the slit 409. A light modulation area 417 in which the shield film 403 is not formed is formed between the adjacent shield films 403. Therefore, the light introduced from below the transparent substrate 401 in FIG. 28 is blocked by the shield film 403 at the position corresponding to the slit 409 and is blocked by the shield-property conductive film 415 of the needle 408 at the position corresponding to the light modulation area 417; after all, the light is not allowed to pass through to the top of the light modulation element 420.

Figure 30:
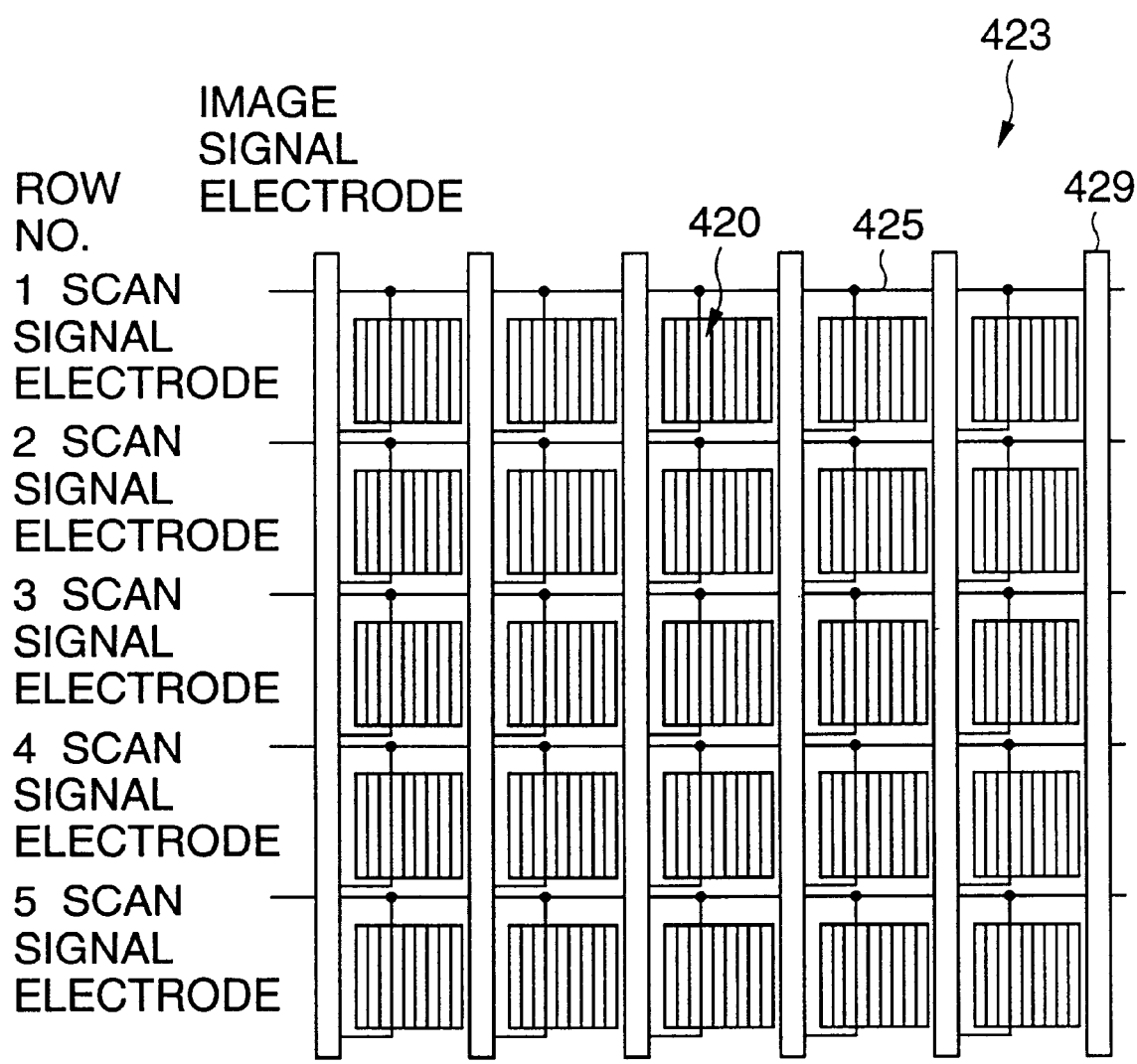
FIG. 30 is a plan view of an array-type light modulation element comprising the light modulation elements in FIG. 28 arranged as a simple matrix.

The described light modulation elements 420 can form an array-type light modulation element 423 of a simple matrix structure shown as an example in FIG. 30.

The array-type light modulation element 423 comprises a plurality of scan signal electrodes 425 arranged in parallel and a plurality of image signal electrodes 429 arranged in parallel, orthogonal to the scan signal electrodes 425. Of course, the array-type light modulation element 423 is not limited to the example, and may be an array-type light modulation element comprising light modulation elements arranged in one dimension.

A controller (not shown) for controlling the scan signal electrodes 425, the image signal electrodes 429, and signals output to the electrodes 425 and 429 corresponds to needle move means.

Figure 31:
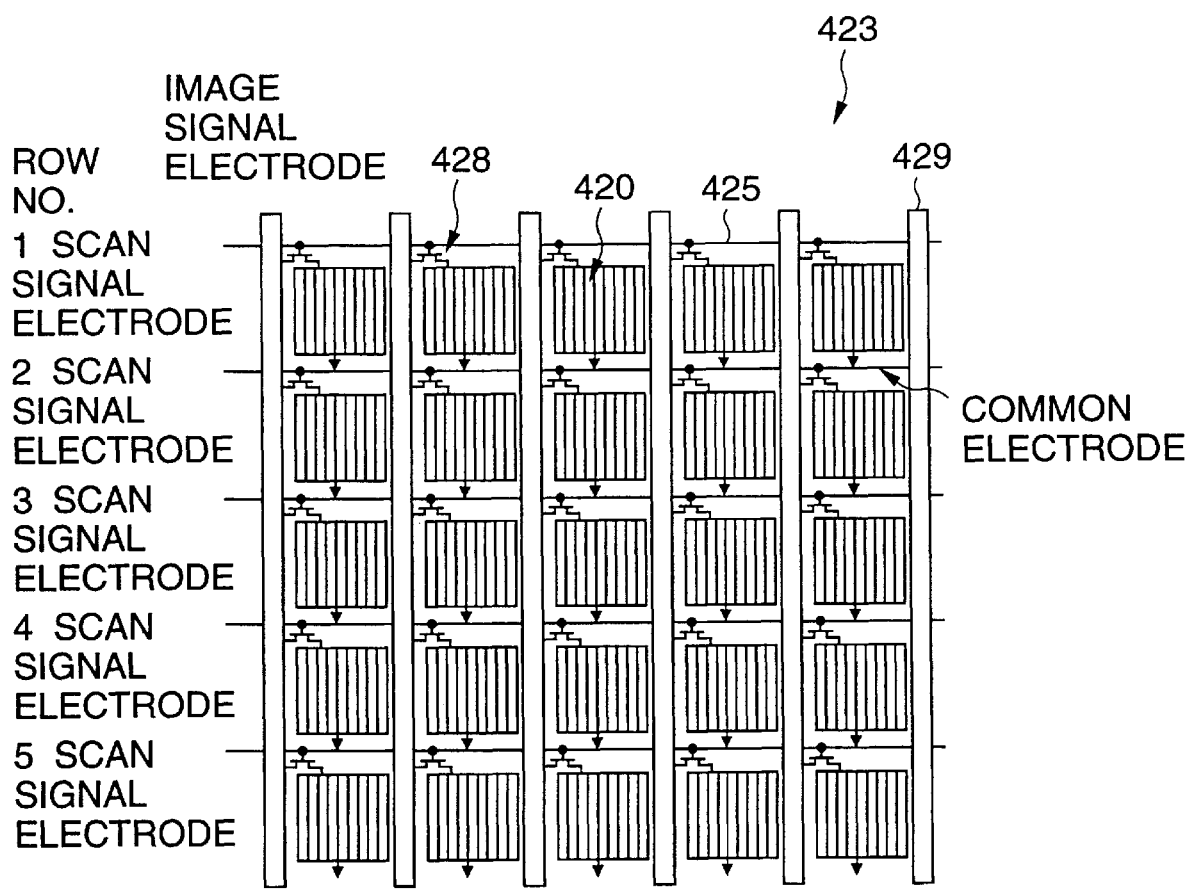
FIG. 31 is a plan view of an array-type light modulation element comprising the light modulation elements in FIG. 28 arranged as an active matrix.

Here, FIG. 30 shows a simple matrix, but an active matrix comprising semiconductor switches 328 such as TFTs provided in a one-to-one correspondence with pixels as shown in FIG. 31 may be adopted or although not shown, an active matrix comprising electromechanical switches operated by the electrostatic operation of flexible thin film having contacts, provided in a one-to-one correspondence with pixels may be adopted. Such an active matrix structure enables element control to be simplified and display image contrast to be enhanced.

Here, a pixel section in the simple matrix will be discussed.

Figure 32A:
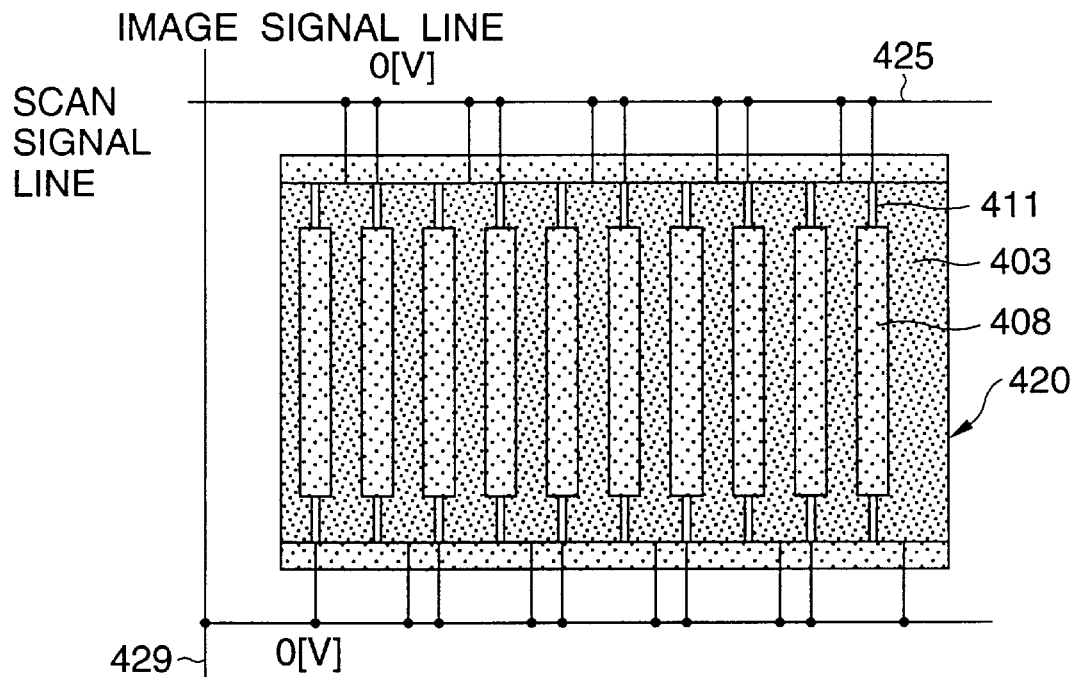
FIGS. 32A and 32B are connection diagrams each to show the connection state of scan signal and image signal lines of the light modulation element.
Figure 32B:
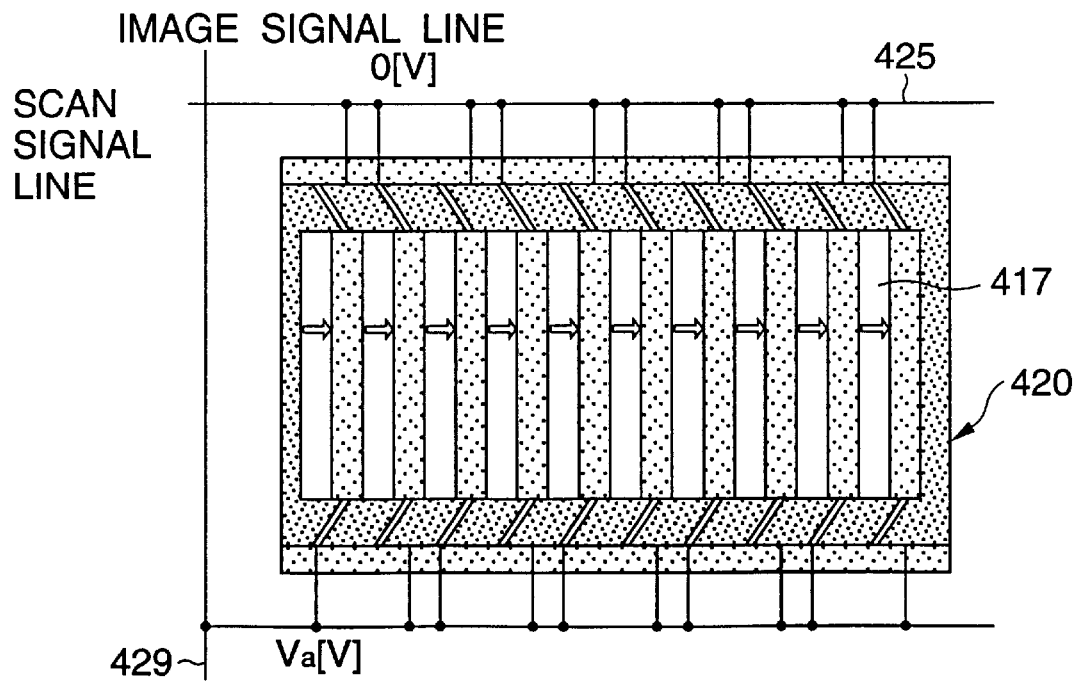

The light modulation elements 320 are placed at the intersections of the scan signal electrodes 425 and the image signal electrodes 429. FIGS. 32A and 32B show wiring for each light modulation elements 420 in the array-type light modulation element 423.

According to FIGS. 32A and 32B, the shield-property conductive films 403 and 415 are connected so as to form each pair of the shield-property conductive film 415 of the needle 408 connected to either the scan signal line 425 or the image signal line 429 and the shieldproperty conductive film 403 on the transparent substrate 401 adjacent to the needle 408 and connected to the other signal line; each pair forms one light modulation portion.

According to the element configuration and electrode connection, when the voltages of the scan signal electrode 425 and the image signal electrode 429 are 0 [V], the needle 408 enters the neutral state (shield state) as shown in FIG. 32A; when the voltage of either electrode is drive voltage Va [V], the needle 408 is moved by an electrostatic force and enters a light passing-through state as shown in FIG. 32B.

Figure 33A:
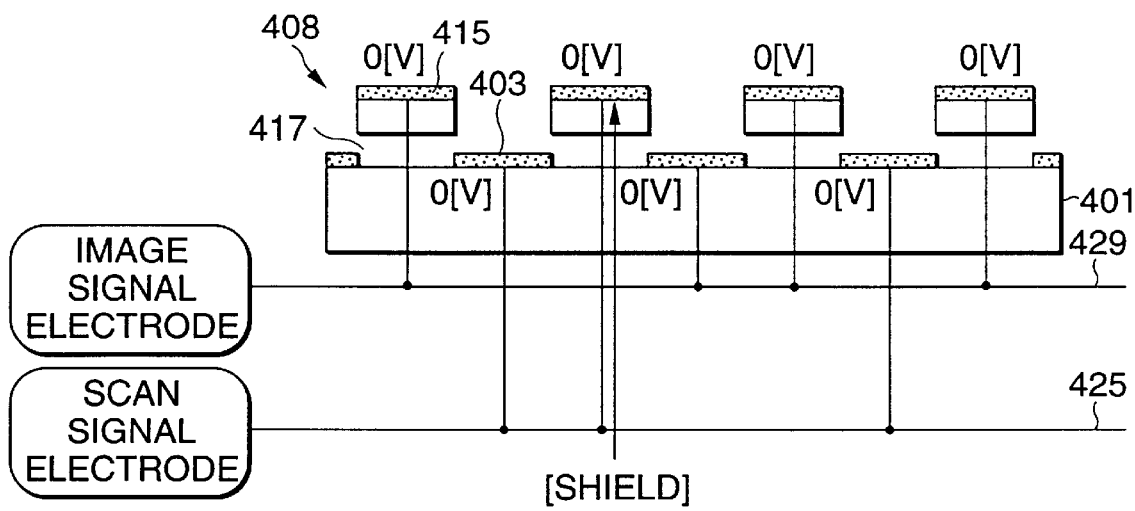
FIGS. 33A and 33B are sectional views of the main part to describe each operation state of light modulation element.

Next, a specific drive method of the light modulation element 420 and the array-type light modulation element 423 described will be discussed. As shown in FIG. 33A, when the scan signal electrode 425 and the image signal electrode 429 are at the same potential (0 [V]), the needle 408 overlaps the top of the light modulation area 417 and blocks emission of light passing through the light modulation area 417 to the top of the light modulation element 420.

Figure 33B:
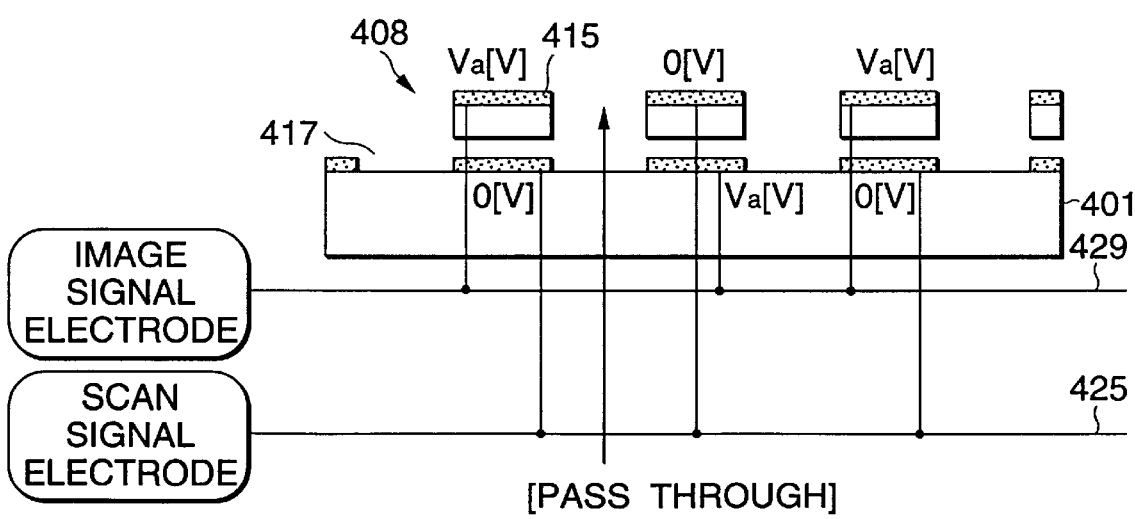

On the other hand, if an image signal voltage Va is applied to the image signal electrode 429 and a voltage of 0 [V] is applied to the scan signal electrode 425 at the canning time as shown in FIG. 33B, the needle 408 and the shield-property conductive film 415 connected to different electrodes are mutually attracted by an electrostatic attraction force and are moved in parallel with the transparent substrate 401 as indicated by the arrows in the figure.

Resultantly, the needle 408 does not shield light in the light modulation area 417 and the light passing through the transparent substrate 401 is emitted through light modulation area 417, namely, binary light modulation is enabled.

According to the basic principle, two-dimensional light modulation array can be driven in the simple matrix structure shown in FIG. 30. In the example, the fact that the relationship between the voltages of the scan signal electrode 425 and the image signal electrode 429 and displacement of the needle 408 based on the voltages has a hysteresis characteristic is used and appropriate voltages are applied to the electrodes 425 and 429 in response to the characteristic.

In the twelfth embodiment, if the neutral position where the needles are not displaced is set to the shield position shown in FIG. 33A and binary control is performed between the shield position shown in FIG. 33A and the light passing-through position shown in FIG. 33B, the shield areas of the transparent substrate 401 and the needles 408 can be formed at a time by self-alignment.

Next, the light modulation element formation method by the self-alignment will be discussed specifically.

The light modulation element in FIG. 28 can be formed by various thin-film processes or thick-film processes such as patterning based mainly on photolithography, etching, selective plating, printing, and transfer. According to the formation processes, the light modulation portions can be arranged at high density. Then, as an example of the light modulation element formation method, a method using photolithography and etching will be discussed with reference to FIGS. 34A to 34D.

Figure 34A:
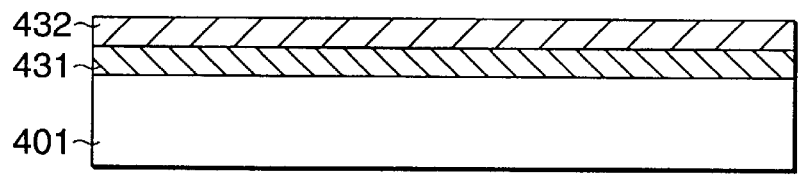
FIGS. 34A to 34D are sectional views of the main part to describe an example of a process to formation of the light modulation element.

First, as shown in FIG. 34A, a resist film as a sacrificial layer 431 is formed by application on a transparent substrate 401, a substrate transparent for modulated light, such as glass. In addition to the resist, metal such as aluminum can also be used depending on the material of the needles.

The sacrificial layer 431 is used later as a file for separating the transparent substrate 401 and the needles 408 and is also used as the spacers 403 for supporting the needles 408 and the transparent substrate 401 as shown in FIG. 28. Particularly, to use macromolecule of polyimide, etc., comparatively resistant to acid and alkali as the insulating film of the needle 408, metal such as aluminum can also be used as the sacrificial layer 431.

An insulating film 432 which becomes the main constituent of each needle 408, for example, macromolecule of polyimide, etc., is formed on the sacrificial layer 431. Particularly, photosensitive macromolecule is preferred as the macromolecule.

Figure 34B:
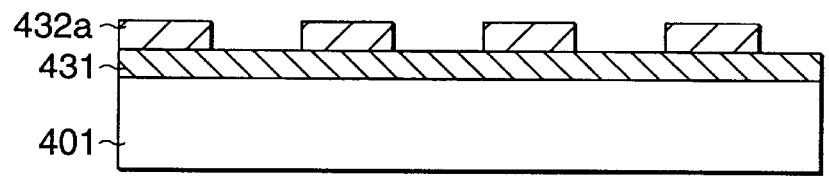

The insulating film is patterned, whereby insulators 432a which become the needles 408 are formed as shown in FIG. 34B. As the patterning method, normal photolitho development is used if the insulating film 432 is photosensitive macromolecule; a process of etching the insulating film after pattern formation by photolitho is used depending on the insulating film material. Specifically, wet etching with acid or alkali solution, dry etching with plasma, anisotropic dry etching of RIE, etc., is used preferably; any process is selected appropriately depending on the component material.

Figure 34C:
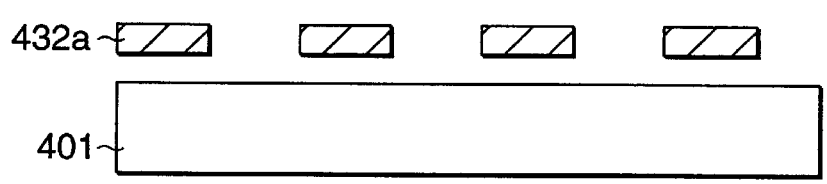

Next, the sacrificial layer 431 is removed as shown in FIG. 34C. At this time, an etching methods is selected preferably depending on the material of the sacrificial layer 431 and the materials forming the needle 408. The sacrificial layer 431 is removed by wet etching with a solvent of acetone, etc., an alkali-family solvent, an acid, an alkali water solution, etc., or ashing with plasma, etc. However, the etching treatment time is controlled optimally so that the spacers 405 for supporting the needles 408 and the transparent substrate 401 are left.

Figure 34D:
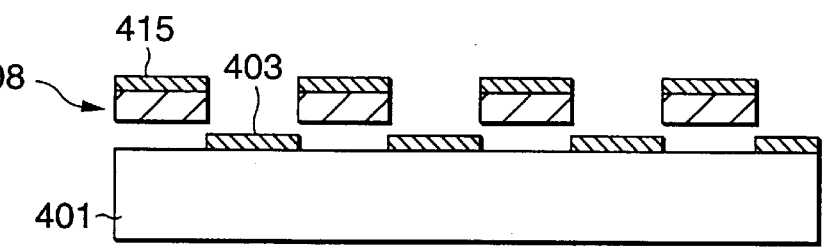

Last, conductive shield films 415 as first shield portions and conductive shield films 403 as second shield portions are formed by a method of evaporating, etc., for example, metal such as aluminum or chromium or a metal compound, etc., as shown in FIG. 34D. After this, conductive shield films in areas other than the needles are patterned to form electrodes, whereby each shield film 403 is formed on the transparent substrate 401 between the adjacent needles 408, the conductive shield film 415 is formed on each needle 408, the gap between the needle 408 and the shield film 403 at the neutral position is almost eliminated, and the shield film allowing very little leakage light can be formed, so that highly accurate exposure alignment becomes unnecessary.

The above-described process is an example and any other method may be adopted. The configuration of the light modulation element is not limited to the above-given examples. That is, any configuration may be adopted if it is a configuration wherein an electrostatic force is generated between the needle 408 having a shield property and the shield film on the transparent substrate 401 and change in the light transmission factor of the light modulation element as the needles 408 move is used.

As described above, in the light modulation element of the embodiment, each needle 408 moves in parallel at a distance until the needle 408 overlaps the adjacent light modulation area 417 for executing light modulation, thus the displacement amount of each needle 408 lessens and the response can be furthermore speeded up.

Further, partition formation for generating plasma for each pixel as with plasma display and producing ultrahigh vacuum as with the FED become unnecessary, thus reduction in weight and providing a large area are facilitated because of a simple structure and the manufacturing costs can be reduced.

Next, a thirteenth embodiment of the invention using the above-described light modulation elements to form a flat-panel display unit will be discussed.

FIG. 35 is a sectional view of a flat-panel display unit 440 according to the invention. The light modulation elements 420 of the first embodiment are used as light modulation elements of the twelfth embodiment as an example.

In the flat-panel display unit 440 of the embodiment, an ultraviolet surface light source 441 as an ultraviolet output section is disposed on the lower faces of the transparent substrates 401 of the light modulation elements 420. A front panel 442 is placed above the light modulation elements 420 and phosphors 443a, 443b, . . . are placed on the face of the front panel 442 on the light modulation element 420 side in a one-to-one correspondence with the light modulation elements 420. A black matrix 445 is provided between the phosphors, enhancing the display image contrast.

According to the configuration of the flat-panel display unit 440, light from the ultraviolet surface light source 441 enters the transparent substrate 401 and in the light passing-through mode of the light modulation elements 420, the light is guided into the top face of the transparent 401 in FIG. 35. The light through the light modulation elements 420 is applied to the corresponding phosphors 443a and 43b, which then are excited for emitting light for forming any desired image.

As the phosphors, phosphors of three primary colors (for example, R, G, and B) may be placed in order for making it possible to display a color image or only single-color phosphors may be used for displaying a monochrome image.

For the light modulation elements 420 of the flat-panel display unit 440, the space between the transparent substrate 401 and the front panel 442 is deaerated, then rare gas is poured for sealing the whole, thereby preventing the effect of disturbance for stabilization.

Next, the operation of the described flat-panel display unit 440 is as follows:

When the scan signal electrode 425 and the image signal electrode 429 are at the same potential, the needle 408 overlaps the light modulation area 417 thereabove and light from the surface light source 441 is blocked by the needle 408 and the shield conductive film 403 and does not pass through to the top face of the transparent substrate 1.

If a sufficient voltage is applied between the image signal electrode 429 and the scan signal electrode 425 at the scanning time, all needles 408 in one pixel area are attracted to the shield-property conductive films 403 on the transparent substrate 401 by an electrostatic attraction force and are moved in union. Resultantly, the light is not shielded by the needles 408 and the light passing through the transparent substrate 401 is emitted through the light modulation area 413. The emitted light excites the phosphor 443a, 443b for displaying an image based on the image information.

If the light modulation elements undergo binary control, full-color display is enabled by a drive method wherein the field period for displaying one screen is divided into subfields and binary control is performed separately in the subfields for providing continuous tone. According to an active matrix method, light modulation of various continuous tones can be executed and full-color display is enabled.

Thus, according to the above-described flat-panel display unit 440, light emitted through the transparent substrate 401 is applied directly to the phosphor 443a, 443b for exciting the phosphor 443a, 443b, so that the light use efficiency can be enhanced. Since the phosphor emits scattered light, the viewing angle can be widened as compared with a liquid crystal display for allowing light to pass through based on the orientation of liquid crystal molecules. Further, since the light modulation elements are easily put into an array, the manufacturing costs can be reduced. A low elastic material, for example, macromolecule of polyimide, etc., is used as the material of the needles 408 or the shape is optimized, whereby the drive voltage can be sufficiently lowered as compared with a plasma display, etc.

As described above in detail, according to the light module element according to the invention, each needle is displaced in roughly parallel to the transparent substrate by the action of static electricity and the relative position of each needle to the corresponding light modulation area on the transparent substrate is changed, whereby the light introduced into the transparent substrate is modulated. Therefore, the displacement amount of the needle required for light modulation can be lessened, excellent high-speed responsivity can be provided, the drive voltage can be lowered, and the drive power can be reduced. Since light modulation can be executed based on the simple principle of electrostatically attracting the needles to the second shield films on the transparent substrate, the configuration of the light modulation element can be simplified and the manufacturing process of the light modulation element can be facilitated and therefore the costs can be reduced.

The array-type light modulation element according to the invention comprises the light modulation elements arranged like a one-dimensional or two-dimensional matrix, so that one-dimensional or two-dimensional light modulation can be executed easily.

In the flat-panel display unit according to the invention, light emitted from the transparent substrate excites the phosphor directly, so that high-brightness display with no viewing angle dependency can be produced while reduction in the light use efficiency is deterred.

Further, partition formation for generating plasma for each pixel as with plasma display and producing ultrahigh vacuum as with the FED become unnecessary, thus reduction in weight and providing a large area are facilitated and the manufacturing costs can also be reduced.

What is claimed is:

1. A light modulation element comprising:
    a transparent substrate transparent for modulated light;
    a moving grid comprising a plurality of slits formed by arranging a plurality of grid plates each having a shield property and spaced from each other, said moving grid having at least a part having electrical conductivity;
    elastic support members for placing said moving grid with a predetermined spacing on said transparent substrate and supporting said moving grid movably in an arrangement direction of the grid plates;
    shield films formed at positions of said transparent substrate overlapping the slit positions of said moving grid; and
    moving grid move means for moving said moving grid in the arrangement direction of the grid plates by an electrostatic force generated by applying predetermined drive voltages to fixed electrodes placed on said transparent substrate and said moving grid, characterized in that
        as the moving grid is moved, a transmission factor of light passing through the slits is changed for executing light modulation.

2. The light modulation element as claimed in claim 1 wherein said moving grid move means comprises the fixed electrodes placed on both sides in the move direction of said moving grid.

3. The light modulation element as claimed in claim 2 wherein the fixed electrode sides of said moving grid and the moving grid sides of the fixed electrodes are shaped like comb teeth.

4. The light modulation element as claimed in claim 2 wherein said moving grid move means provides an electrostatic linear actuator made up of end parts of the grid plates and electrodes forming projections placed sandwiching said moving grid in a direction perpendicular to the move direction of said moving grid and projecting to the sides of said moving grid corresponding to the arrangement pitch of the grid plates.

5. The light modulation element as claimed in any one of claims 1 to 3 wherein said elastic support members comprise a pair of support members formed in the move direction of said moving grid or in a direction perpendicular to the move direction on said transparent substrate and an elastic member for joining the support members and said moving grid.

6. The light modulation element as claimed in claim 1 wherein said moving grid is formed on surfaces of the grid plates with shield films.

7. An array-type light modulation element comprising light modulation elements as claimed in claim 1 placed like a one-dimensional or two-dimensional matrix.

8. A flat-panel display unit comprising:
    an array-type light modulation element as claimed in claim 7;
    a surface light source placed facing said array-type light modulation element; and
    phosphors being placed on an opposite side to said surface light source with said array-type light modulation element between, characterized in that
        said phosphors are caused to emit light by applying light passing through said array-type light modulation element.

9. The flat-panel display unit as claimed in claim 8 wherein said surface light source uses a transparent substrate of said array-type light modulation element as a light guide plate and light is introduced from a side end part of the transparent substrate.

10. The flat-panel display unit as claimed in claim 8 wherein light emitted from said surface light source is ultraviolet light.

11. A light modulation element comprising:
a transparent substrate transparent for modulated light;
a fixed wall being placed upright on said transparent substrate and having electrical conductivity;
a shield film being placed with an opening as a light modulation area left outside the area where said fixed wall is placed upright on said transparent substrate;
a needle being supported movably in a roughly horizontal direction above the opening and having a shield property and electrical conductivity; and
needle move means for applying a voltage to a space between said fixed wall and said needle, thereby moving said needle by an electrostatic force for changing the shield area covering the opening, characterized in that
as said needle is moved, a transmission factor of light passing through the light modulation area is changed for executing light modulation.

12. The light modulation element as claimed in claim 11 wherein a plurality of said fixed walls are placed upright in roughly parallel with a predetermined spacing and said shield film and said needle are placed between said fixed walls.

13. The light modulation element as claimed in claim 12 wherein said shield film is placed between said two adjacent fixed walls so as to touch the side of one of said two adjacent fixed walls and form the opening on the side of the other and wherein said needle is placed on the side of the other so as to cover the opening.

14. The light modulation element as claimed in any one of claims 11 to 13 wherein said fixed wall has a shield property.

15. The light modulation element as claimed in claim 11 wherein said needle comprises an electrical conduction part and a shield part formed roughly vertically to said transparent substrate.

16. The light modulation element as claimed in claim 11 wherein said needle comprises an electrical conduction part formed roughly vertically to said transparent substrate and a shield part formed roughly horizontally to said transparent substrate.

17. The light modulation element as claimed in claim 11 wherein when each needle does not operate, said needle move means makes said needle and said fixed wall match in potential and when each needle is operated, said needle move means applies different potentials to said fixed wall to which said needle is to be moved and said needle.

18. The light modulation element as claimed in claim 17 wherein said needle move means connects one of fixed walls adjacent to said needle to an image signal electrode and the other to a scan signal electrode and connects said needle to the same electrode as said fixed wall close to said needle.

19. The light modulation element as claimed in claim 17 wherein said needle move means connects either the scan signal electrode or the image signal electrode to said fixed wall and connects the other to said needle.

20. An array-type light modulation element comprising light modulation elements as claimed in claim 11 placed like a one-dimensional or two-dimensional matrix.

21. A flat-panel display unit comprising:
an array-type light modulation element as claimed in claim 20;
a surface light source placed facing said array-type light modulation element; and
phosphors being placed on an opposite side to said surface light source with said array-type light modulation element between, characterized in that
said phosphors are caused to emit light by applying light passing through said array-type light modulation element.

22. The flat-panel display unit as claimed in claim 21 wherein said surface light source uses a transparent substrate of said array-type light modulation element as a light guide plate and light from said surface light source is introduced into the transparent substrate.

23. The flat-panel display unit as claimed in claim 21 wherein light emitted from said surface light source is ultraviolet light.

24. A light modulation element comprising:
a transparent substrate transparent for modulated light;
a plurality of needles having electric conductivity being placed with a predetermined spacing on a plane opposed to said transparent substrate, parts of said needles being supported on said transparent substrate;
first shield portions each being provided for each of said needles;
second shield portions being placed with openings left in light modulation areas over-lapping said needles above said transparent substrate; and
needle move means for applying voltage to said needles, thereby attracting and moving said adjacent needles by an electrostatic force, characterized in that
as said needles are moved, a transmission factor of light passing through the light modulation area is changed for executing light modulation.

25. The light modulation element as claimed in claim 24 wherein each of said first shield portions is formed on a face of said needle on the opposite side to said transparent substrate.

26. The light modulation element as claimed in claim 24 wherein each of said needles are formed of a shield-property conductive film.

27. The light modulation element as claimed in any one of claims 24 to 26 wherein each of said needles and each of the light modulation areas are placed so that the light modulation area corresponding to said needle is made close to the light modulation area corresponding to the needle on the opposite side to the move direction of said needle.

28. The light modulation element as claimed in any one of claims 24 to 26 wherein said second shield portions are lower-stage needles being formed between said needles and said transparent substrate, some of the lower-stage needles being supported on said transparent substrate and movable roughly in a horizontal direction, and upper-stage needles of said needles and the lower-stage needles are electrostatically attracted for executing light modulation.

29. The light modulation element as claimed in claim 24 wherein said needle move means applies voltage so as to lower the potential difference between said needles so that said needles are not displaced when each needle does not operate, and so as to raise the potential difference between said needles so that said needles are displaced when each needle is operated.

30. The light modulation element as claimed in claim 29 wherein said needle move means connects one of needles adjacent to said needle connected to an image signal electrode to a scan signal electrode and the other to image signal electrode.

31. An array-type light modulation element comprising light modulation elements as claimed in claim 24 placed like a one-dimensional or two-dimensional matrix.

32. A flat-panel display unit comprising:
an array-type light modulation element as claimed in claim 31;
a surface light source placed facing said array-type light modulation element; and
phosphors being placed on an opposite side to said surface light source with said array-type light modulation element between, characterized in that
said phosphors are caused to emit light by applying light passing through said array-type light modulation element.

33. The flat-panel display unit as claimed in claim 32 wherein light emitted from said surface light source is ultraviolet light.

34. A light modulation element comprising:
a transparent substrate transparent for modulated light;
a plurality of needles having electric conductivity being placed with a predetermined spacing on a plane opposed to said transparent substrate, parts of said needles being supported on said transparent substrate;
first shield portions each being provided for each of said needles;
second shield portions having electric conductivity being placed with openings left in light modulation areas overlapping said needles above said transparent substrate; and
needle move means for applying voltage to said needles and said second shield portions, thereby moving said needles to positions overlapping said second shield portions roughly in parallel with said transparent substrate by an electrostatic force, characterized in that as said needles are moved, a transmission factor of light passing through the light modulation area is changed for executing light modulation.

35. The light modulation element as claimed in claim 34 wherein each of said needles has elastic anisotropy providing smaller rigidity only in a constant deformation direction than that in another direction in a joint part to the transparent substrate.

36. The light modulation element as claimed in claim 35 wherein the joint part is formed so that the cross-sectional shape in the move direction of said needle is made short in the move direction and is made long in a direction orthogonal to the move direction.

37. The light modulation element as claimed in claim 35 wherein the joint part is formed of a material having elastic anisotropy so as to fit a direction in which an elastic constant is small with respect to the move direction of said needle and a direction in which an elastic constant is large with respect to a direction orthogonal to the move direction.

38. The light modulation element as claimed in any one of claims 34 to 37 wherein said needle move means applies voltage so as to cause all potentials of said needles and said second shield portions to match when each needle does not operate, and so as to place said needles and said second shield portions in different potentials when each needle is operated.

39. The light modulation element as claimed in claim 38 wherein said needle move means connects one of second shield portions adjacent to said needle connected to an image signal electrode to a scan signal electrode and the other to image signal electrode.

40. An array-type light modulation element comprising light modulation elements as claimed in claim 34 placed like a one-dimensional or two-dimensional matrix.

41. A flat-panel display unit comprising:
an array-type light modulation element as claimed in claim 40;
a surface light source placed facing said array-type light modulation element; and
phosphors being placed on an opposite side to said surface light source with said array-type light modulation element between, characterized in that
said phosphors are caused to emit light by applying light passing through said array-type light modulation element.

42. The flat-panel display unit as claimed in claim 41 wherein light emitted from said surface light source is ultraviolet light.

43. The light modulation element of claim 24, wherein each of said plurality of needles has a belt shape.

44. The light modulation element of claim 34, wherein each of said plurality of needles has a belt shape.

45. A light modulation element comprising:
a transparent substrate transparent for modulated light;
a moving grid comprising a plurality of slits formed by arranging a plurality of grid plates, each having a shield property and spaced from each other, said moving grid having at least a part having electrical conductivity;
support members that movably support said moving grid over said transparent substrate in an arrangement direction of said grid plates;
shield film strips formed on said transparent substrate;
electrodes electrically connected to said moving grid; and
an actuator that moves said moving grid in the arrangement direction of the grid plates by an electrostatic force generated by applying drive voltages to said electrodes; and wherein as said moving grid is moved, a transmission factor of light passing through said slits is changed for executing light modulation.

46. A light modulation element comprising:
a transparent substrate transparent for modulated light;
a plurality of needles having electric conductivity arranged to be spaced apart from each other in a plane opposed to said transparent substrate, and movable in an arrangement direction of said needles;
first shield portions, one provided for each of said needles;
second shield portions arranged to be spaced apart from each other in a plane substantially parallel to the plane in which said needles are arranged; and wherein a relative movement between said first shield portions and second shield portions in an arrangement direction of said needles changes a transmission factor of light passing through said light modulation element; and
an actuator that moves said needles in the arrangement direction of said needles by an electrostatic force generated by applying voltages to said needles.

47. The light modulation element according to claim 46, wherein said actuator is adapted to move said needles in the arrangement direction of said needles so each of said first shield portions overlaps one of said second shield portions.

* * * * *